United States Patent
Bettle, III

(10) Patent No.: US 10,647,600 B2
(45) Date of Patent: May 12, 2020

(54) SYSTEMS AND METHODS FOR FORMATION OF BIOLOGICALLY ACTIVE GRANULES AND BIOLOGICALLY ACTIVE GRANULES

(71) Applicant: BLUE FROG TECHNOLOGIES LLC, Roscoe, IL (US)

(72) Inventor: Griscom Bettle, III, Sarasota, FL (US)

(73) Assignee: BLUE FROG TECHNOLOGIES LLC, Roscoe, IL (US)

(\*) Notice: Subject to any disclaimer, the term of this patent is extended or adjusted under 35 U.S.C. 154(b) by 0 days.

(21) Appl. No.: 15/808,280

(22) Filed: Nov. 9, 2017

(65) Prior Publication Data
US 2018/0127292 A1    May 10, 2018

Related U.S. Application Data

(60) Provisional application No. 62/419,735, filed on Nov. 9, 2016.

(51) Int. Cl.
| | |
|---|---|
| C02F 3/30 | (2006.01) |
| C02F 3/32 | (2006.01) |
| C02F 3/16 | (2006.01) |
| C02F 3/12 | (2006.01) |

(52) U.S. Cl.
CPC .......... *C02F 3/1284* (2013.01); *C02F 3/301* (2013.01); *C02F 3/302* (2013.01); *C02F 3/308* (2013.01); *C02F 3/322* (2013.01); *C02F 3/1215* (2013.01); *C02F 3/1278* (2013.01); *C02F 3/16* (2013.01); *C02F 2203/006* (2013.01); *C02F 2301/08* (2013.01); *Y02W 10/15* (2015.05); *Y02W 10/37* (2015.05)

(58) Field of Classification Search
CPC .......... B01F 13/0049; C02F 7/00; C02F 3/02; C02F 3/1284; C02F 3/301; C02F 3/302; C02F 3/308; C02F 3/322
USPC .................... 210/620, 602, 747.5
See application file for complete search history.

(56) References Cited

U.S. PATENT DOCUMENTS

| | | | | |
|---|---|---|---|---|
| 7,329,351 B2* | 2/2008 | Roberts | ............... | B01F 3/04609 210/150 |
| 2012/0036767 A1* | 2/2012 | Larach | .................. | C12M 21/02 44/388 |
| 2014/0319054 A1* | 10/2014 | Bettle, III | ............... | C02F 3/104 210/610 |

\* cited by examiner

*Primary Examiner* — Claire A Norris
(74) *Attorney, Agent, or Firm* — Scully, Scott, Murphy & Presser, P.C.

(57) ABSTRACT

In one embodiment, a method of reducing at least one of nitrogen, carbon and phosphorous in a lagoon that includes at least three cells.

56 Claims, 71 Drawing Sheets

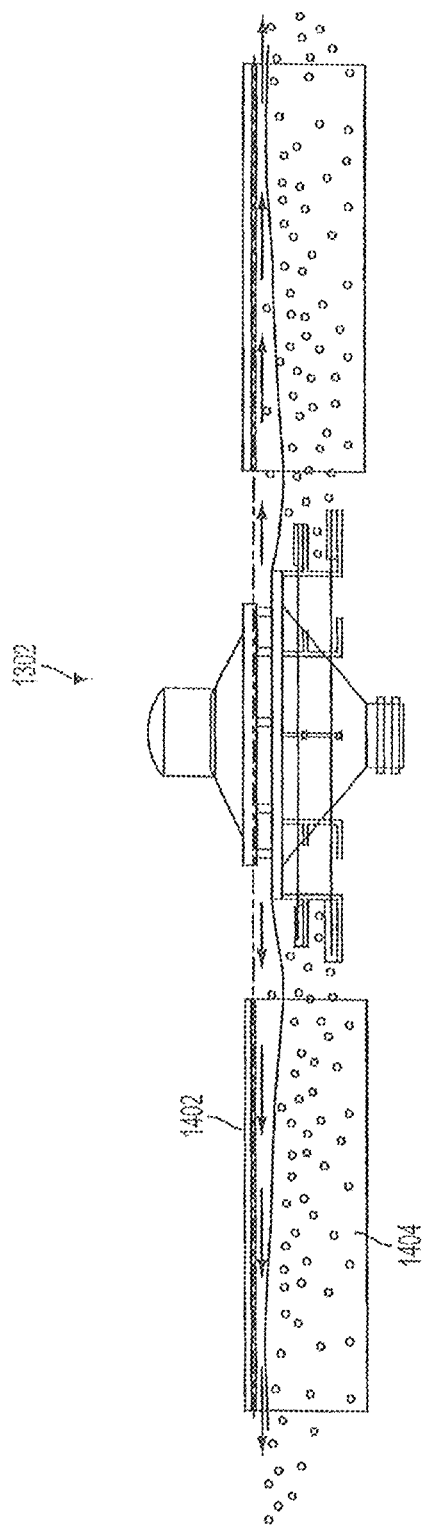
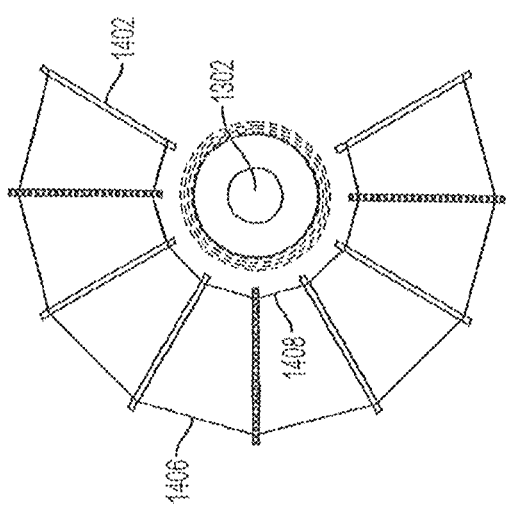
FIG. 3B
FIG. 3C 5 pack cluster BF/CSTR

BF/CSTR

A side of impeller is low pressure side
B side of impeller is high pressure side

SYSTEMS AND METHODS FOR FORMATION OF BIOLOGICALLY ACTIVE GRANULES AND BIOLOGICALLY ACTIVE GRANULES

CROSS-REFERENCE TO RELATED APPLICATIONS

The present applications claims priority of U.S. application Ser. No. 62/419,735, filed on Nov. 9, 2016, the contents of which are incorporated by reference.

FIELD OF THE DISCLOSURE

The present disclosure relates generally to systems and methods of waste treatment. In one, embodiment, the present disclosure relates to systems and methods for treating wastewater.

Other embodiments relate to systems and methods for formation of biologically active granules and biologically active granules useful for treating waste.

BACKGROUND OF THE DISCLOSURE

Wastewater remediation is a broadly studied art with many innovations. Waste is treated aerobically, anaerobically or both. In waste water, especially from industrial waste, there is an accumulation of biomass, called biosolids or sludge. It is costly and difficult to treat biosolids because the contents are virtually unknown and unknowable. Therefore, much of the biosolids are concentrated, digested, composted, land applied or entombed in landfills and the like.

Aerobic systems for treating waste products, including sludge, are well known. They usually involve oxygen-addition, return activated sludge (RAS) as a source of active aerobic bacteria, a mixing step and a clarification step. Some of the clarified solids are returned as RAS or are wasted (WAS).

Anaerobic systems for treating waste products, including sludge, are also well known. A common reactor design is the Up-flow Anaerobic Sludge Bed (UASB). Wastewater is pumped into a granular sludge bed to fluidize the granules. Fluid flow allows the gas to escape and the granules return to the fluidized bed. The granules self-form or can be introduced from an outside source.

The biochemistry of biofilms on minerals is well known. A solid mineral is formed (or introduced as a seed crystal). Bacteria colonize onto the surface of these seed crystals. The first colonizers die as they make a sacrificial glue to bind the biofilm to the surface. More colonizers form a synergistic organized collection of bacteria. Bacteria secrete a biopolymer that can bind small mineral crystals to the surface, building up a granule.

Attached growth surfaces are well known. In creeks, for example, slime grows on rocks as flooded aerated water flows by generally in one direction (downhill). In trickling filters, wastewater trickles down over rocks while air is bubbled up from below. Trickling filters are not flooded. An entire ecosystem grows in the thin, aerated film that grazes on the dead and dying attached bacteria. The grazing keeps the trickling filter from fouling.

More recently Kania et al., U.S. Pat. No. 8,372,277 (Kania '277), disclosed a floating streamed of a permeable matrix flooded by flow from a circulator, with or without added air and intended to de-stratify the water column.

Kania '277 teaches flow through the permeable matrix. However, a periphyton layer grows over the surface, requiring periodic cleaning.

Circulators are well known (Roberts et al., U.S. Pat. Nos. 8,298,411 and 7,329,351). Impingement aeration to make fine bubbles is also known (Bettle U.S. Pat. No. 5,772,886). The contents of the art cited in this paragraph are incorporated by reference.

Other circulators are described in PCT Publication No. WO 2014/176388, the contents of which are incorporated by reference.

Granules are common in up-flow anaerobic reactors but are not common in ponds as there are no seeds to start the process. The present disclosure provides a means of generating these granules in a controlled location in a higher concentration and as a result, provides a more effective method for removing the sludge in the waste water.

Other investigators have found that calcium level affects granule formation. For example, intermediate levels of calcium form granules that reduce COD faster. However, additional calcium cements in the granules and reduces COD removal.

Still other investigators have suggested that the definition of granules is related to the Sludge Volume Index (SVI), a standardized test that quantifies the settling rate of wastewater flocs, such as mixed liquor suspended solids (MLSS) and anaerobic granules in a UASB.

More recently, investigators have studied biofilms in wastewater treatment systems. They report that bacteria use quorum sensing (QS) and quorum quenching (QQ) to control biofilm development. The subject is very complex, but can generally be explained as:

1) Planktonic bacteria colonize a surface
2) Bacteria produce a polymeric glue that attaches bacteria to the surface
3) A structured biofilm is formed on the surface when QS chemicals signal that there are sufficient bacteria available to form the biofilm.
4) QS chemicals signal bacteria to build the biofilm; QQ chemicals signal bacteria to stop building the biofilm. Hence QS encourages biofilm growth; QQ discourages biofilm growth.
5) QS chemicals are affected by pH. At mildly basic pH, the ring structures can be enzymatically opened, reducing QS chemicals. At slightly acidic pH, the ring structures can be reconstituted, increasing QS chemicals. Thus a slight acidification will help build a biofilm. At highly basic or highly acidic conditions, QS chemicals are inactivated. In aerobic systems, biofilms are generally undesirable because they tend to plug the pores in, for example, a membrane bioreactor.

Granules have to be defined because they vary. Some researchers have defined granules as having a size greater than 100 microns and an SVI of less than 50 mg/l. Others have added the concentration of calcium. But the practical reality is that granules are a subset of an active biofilm. Sometimes granules are structured as gels and not as minerals. This can occur in the same pond over time as ancient (legacy sludge) is digested and formerly entombed calcium is lost in the effluent.

A more comprehensive definition of an anaerobic granule includes:

1) An SVI of less than 50 mg/l (to capture the rapid settling nature of the biofilm).
2) A pH>6.2 and <7.2 (to capture the need to select for QS chemicals).

3) Conductivity greater than 800 Siemens/m (to capture that the active biofilm exists in a high electrolyte brine)
4) Oxidation Reduction Potential (ORP) is more negative than −200 mV (to capture that the granule is an anaerobic granule).

Another important concept is advection. In physics, engineering, and earth sciences, advection is the transport of a substance. The properties of that substance are carried with it. Most generally the advected substance is a fluid. An example of advection is the transport of pollutants or silt in a river by bulk water flow downstream. When wastewater flows over an active biofilm granule bed, some of the QS and QQ chemicals are carried in the advected fluid. If the advected fluid returns directly to the bed/supernatant interface, then the QS and QQ fluids are not lost.

SUMMARY OF THE DISCLOSURE

The area of the lagoon outside the baffle is quiescent and forms layers based on density differences. The top layer is aerobic; the bottom layer is anaerobic; the middle layer is facultative. Gas-producing granules settle at the facultative/anaerobic interface. Once the granules have propagated over the flat portion of the lagoon, gas is visible across the water surface above the flat. At the aerobic/facultative interface, bubbles cavitate violently as surface tension changes more than 20%. Intact cells precipitate through the aerobic zone. Cavitating bubbles chemically and physically lyse the intact cells as they pass through the interface. Internal cell fluids are released. COD ("Chemical Oxygen Demand") increases ten-fold in the facultative zone versus the aerobic zone.

In an embodiment, the water in the lagoon in fluid communication with the spokes travels in a perimeter flow path in relation to the circulator the spoke is attached to. Spokes refer to the supports that radiate from the circulator and maintain the attached growth matrix submerged in the lagoon. In this embodiment the circulators are placed in a linear line from about 20 ft to about 75 ft apart, in another embodiment about 48 ft apart. There is no downstream baffle. Parallel hydraulic walls are formed that force surface water to flow in plug flow downstream. Plug flow refers to the movement of a fluid as it would flow through a pipe, with the velocity of the fluid assumed to be constant across its cross-section. Returning perimeter flow is in the anoxic facultative middle layer of the pond.

In another embodiment, the disclosure is directed to methods and apparatus for an additional circulator to be placed downstream of the number of water circulators that is configured to modify total suspended solids (TSS) level in the lagoon. There is a downstream partial-depth baffle that surrounds the outlet means. Aerated surface water (DO ("dissolved oxygen")>1 mg/l) flows to the baffle where it is redirected to the bottom of the water column and then returns to the swirling circulator inlet. The sludge/supernatant surface has DO>0 mg/l, enough to encourage worm growth. Worms commingle non-digestible ash with any residual biological solids into castings. The castings are entrained into returning perimeter flow and exit as increased TSS in the effluent. This embodiment uses perimeter flow to remove non-digestible ash and lower BOD ("Biological Oxygen Demand") to <20 mg/l and TSS<20 mg/l. Perimeter flow unexpectedly creates two aerobic zones in the water column: Aerobic top; anaerobic bottom, facultative middle and aerobic at the facultative/anaerobic interface.

There are three indicators of perimeter flow: unrestricted swirl into the circulator inlet (brings low pressure point to the base of the water column); impeller rotational speed<500 revolutions/minute; and at least one baffle (berm, hydraulic wall or physical baffle) (to redirect flow)

BRIEF DESCRIPTION OF THE DRAWINGS

These and other features, aspects, and advantages of the present invention will become better understood with regard to the following description, appended claims, and accompanying drawings (which are not drawn to scale) wherein:

FIGS. 3A-3C illustrate schematic representations of an aerator apparatus used in the present disclosure;

FIGS. 14A-14C illustrate schematic plan views of various arrangements of water circulators according to embodiments of the present disclosure;

DETAILED DESCRIPTION OF DISCLOSURE

Figure 1A:
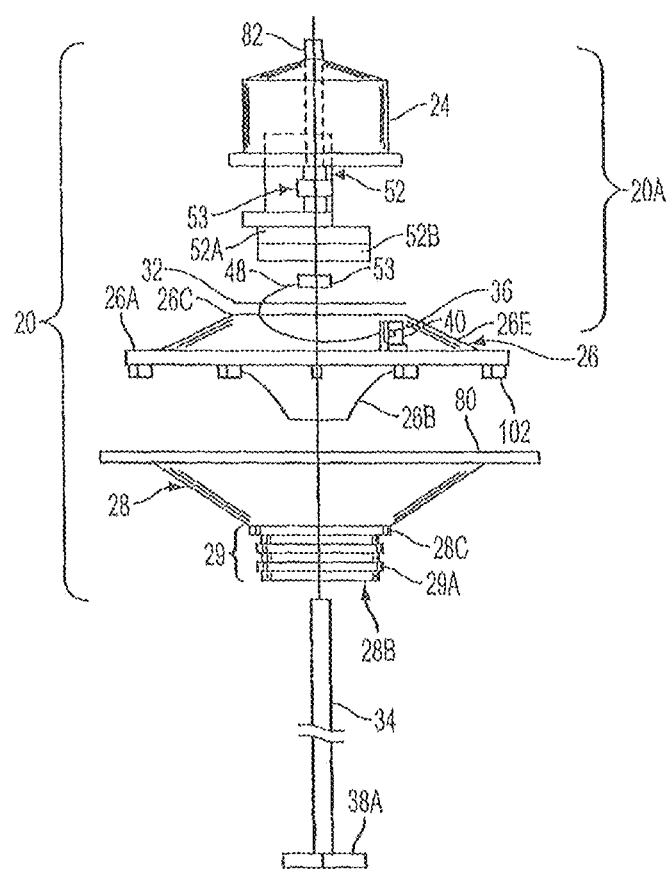
FIG. 1A illustrates an exploded schematic view of an example water circulator used in the present disclosure (in one specific example, such a water circulator may be a Blue Frog™ circulator)

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either be completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc. In yet another illustration, reference herein to a range of from "5 to 10" includes whole numbers of 5, 6, 7, 8, 9, and 10, and fractional numbers 5.1, 5.2, 5.3, 5.4, 5.5, 5.6, 5.7, 58, 5.9, etc.

For the purposes of describing and claiming the present invention, the term "lagoon" is intended to refer to an artificial or naturally occurring body of water for the treatment of influent and/or effluent and/or for accommodating surface water that overflows drains during precipitation. In various examples, such a lagoon may contain salt water or fresh water. In other examples, such a lagoon may be a tank, a pool, a pond or a lake, including natural lake. In yet another example, such a lagoon may be an equalization tank (EQ) for treating influent (such EQ tanks are designed to equalize high/low flows, etc.). As defined, a lagoon does not have any natural current or flow to a larger body of water, such as a river, lake or ocean, but rather is a body of water contained in boundaries that may be natural, such as bordered by land or bordered by man-made structures. The lagoon, in an embodiment, is at least 3 feet deep and may be as deep as 1000 feet or more, for example about 7 feet to about 40 feet. In this disclosure, the terms tank, pool, pond or lake or EQ are being used interchangeably.

The term continuous flow stirred-tank reactor (CSTR), also known as vat- or back mix reactor, typically means a common ideal reactor type as used in chemical engineering. A CSTR often refers to a model used to estimate the key unit operation variables when using a continuous agitated-tank reactor to reach a specified output. The mathematical model works for all fluids: liquids, gases, and slurries. The behavior of a CSTR is often approximated or modeled after a Continuous Ideally Stirred-Tank Reactor (CISTR). All calculations performed with CISTRs assume perfect mixing. In a perfectly mixed reactor, the output composition is identical to the composition of the material mixed inside the reactor, which is a function of residence time and rate of reaction. If the residence time is 5-10 times the mixing time, this approximation is typically valid for engineering purposes. The CISTR model is often used to simplify engineering calculations and can be used to describe research reactors. In practice it can only be approached in particular in industrial size reactors.

As used herein, the term BF/CSTR includes the volume enclosed by a circumferential baffle around a central circulator or circulators.

As used herein, when the term "from" is used before a numerical range, it includes the endpoints. For example, the term" from 6.5 to 7.5, includes the numerals in between 6.5 and 7.5, as well as the endpoints 6.5 and 7.5. In addition, when the term "between" is used prior to a numerical range, as used herein, it is synonymous to the term "from" prior to a numerical range.

In an embodiment, a cluster (or single circulator) such as described herein is not a CSTR, but approximates a CSTR (i.e., the cluster (or single circulator) has outflow but does not have complete recirculation; also the material inside the baffle is not homogeneous).

As defined herein, when it is indicated that the initial pH of the water in the lagoon is about 7.5 or greater, it is understood that the pH is basic or neutral or slightly less than neutral. Thus, for example, if the pH is less than 5.0, which is acidic, then the lagoon is treated so that the pH of the water therein initially prior to operating the system herein is made more basic, i.e., until the pH of the lagoon is at least 7.5. In an embodiment, the initial pH of the lagoon may be as high as 10. In an embodiment, the initial pH of the water may range from 7.5 to 10.

As defined herein, the pH in different regions of the lagoon may be the same or different. For instance, the pH at the top of the lagoon may be different relative to the pH at the bottom of the lagoon. For example, the pH at the top of a lagoon (e.g., in a CSTR) may be 7.4, but at the bottom of the lagoon (e.g., in a CSTR) the pH may be 6.5. When pH is referred to, the pH could be the top, the bottom, anywhere in between or a combination thereof.

The present disclosure provides a system for the treatment of sludge in a lagoon having a bottom thereof and containing water that promotes the formation of biologically active granules that digest sludge in the lagoon and remove the sludge therein, especially carbon, nitrogen, and phosphorus compounds present in the sludge. The system is comprised of four zones, a granule selection zone (also referred to as "granule formation zone"), a quiescent stratified zone (also referred to as "quiescent zone"), a nitrogen removal zone and a clarification zone. The zones are arranged in a specific order. The granule selection zone is the first zone for treatment of the sludge; downstream thereof and the second zone of treatment is the quiescent stratified zone; the third zone for treatment of the sludge is the nitrogen removal zone, which is downstream of both the granule selection and the quiescent stratified zone; and the fourth zone of treatment of the sludge is the clarification zone, which is downstream of the granule selection zone, quiescent stratified zone, and nitrogen removal zone.

Each of the zones has a function. Both the granule selection zone and the quiescent stratified zone remove primarily the carbon compounds from the sludge. The nitrogen removal zone removes primarily nitrogen compounds, such as ammonia from the sludge and the clarification zone primarily removes phosphorus compounds from the sludge.

Circulators are used in each of the zones. The ability for the zones to achieve their objective relates to the arrangement of the circulators in the lagoon. Various circulators may be used. An example of a circulating apparatus (see, e.g., U.S. Patent Application Publication No. 2014/0319054, the contents of which are incorporated by reference) comprises an upper float chassis with a wider lower base thereof being equipped with an annular water outflow lip at essentially the surface level of the water; motor-driven means being mounted on the upper float chassis for drawing water into a water intake at a lower open end of the circulating apparatus for effectuating a flow of the water over the water outflow lip; a first set of concentric air hoses disposed at a first position between the water outflow lip and the water intake, the first set of concentric air hoses being in fluid communication with an air inlet disposed at a position on the upper float chassis above the surface level of the water; and a second set of concentric air hoses disposed at a second position between the water first set of concentric air hoses and the water intake, the second set of concentric air hoses being in fluid communication with the air inlet, the second set of concentric air hoses being horizontally offset from the first set of concentric air hoses such that air bubbles emitted by the second set of concentric air hoses rise to the surface level of the water between adjacent centric air hoses of the first set of concentric air hoses, wherein the first set of concentric air hoses and the second set of concentric air hoses emit jets of air bubbles into the water column between the water intake and the water outflow lip.

A further example of a circulator that can be used includes a circulating apparatus (see again, U.S. Patent Application Publication No. 2014/0319054) comprising an upper float chassis with a wider lower base thereof being equipped with an annular water outflow lip at essentially the surface level of the water; motor-driven means being mounted on the upper float chassis for drawing water into a water intake at a lower open end of the circulating apparatus for effectuating a flow of the water over the water outflow lip; and an air injector disposed between the surface level of the water and the water intake, the air injector comprising a pair of venturis configured with respective outflows directed to impinge on each other, the air injector being configured to emit a high volume of air bubbles more than 500 standard cubic feet per hour mixed with water.

Various circulators are illustrated herein.

FIG. 1A provides an exploded view of circulator 20, which is exemplary of the circulator that may be used in the present disclosure, illustrating most of the unit's components and their interaction. FIG. 1A illustrates a Blue Frog™ Circulator (such a circulator may be referred to herein as a "BF" circulator), described in U.S. Patent Application Publication No. 2014/0319054. Diverter 28, the lower portion of the unit, includes an inverted frusto-conical shell of substantially circular cross section and substantially straight sides. It has a protruding edge around its upper periphery, outflow lip 80, which serves to guide water discharged from circulator 20 into laminar flow along the water surface. The lower, narrowest portion of the diverter has a collar 28C, below which is located a substantially cylindrical standard connection fitting 29, including concentric ridges 29A. Diverter intake 28B is located inside connection fitting 29. These components are discussed in detail below. Drive shaft 34 extends through diverter intake 28B and mounts at its lower end an impeller hub mount 38A to which is removably attached the impeller and a plurality of blades (not shown here). In one example, drive shaft 34 is made of stainless steel or a similar strong, corrosion-resistant alloy, and is 1½ inches in diameter in a present embodiment. Optionally, the impeller can be a helical screw. In another example, the impeller may be an air fan.

Mounted above the diverter 28 is the circulator upper assembly 20A, with a float chassis 26, first including an upper frusto-conical shell 26E connected to a flat circumferential rim 26A, and mounting plate 32 mechanically attached to top surface 26C of float chassis 26 for use in mounting internal components discussed below. The float chassis 26 has a wider lower base portion formed by the base of the frusto-conical shell 26E and flat circumferential rim 26A. This wider base provides stability of the circulator in the water as well as accommodating the shape of the sectional diverter 26B attached to the lower portion of float chassis 26.

When the lower base portion has a diameter less than the upper outflow lip 80, the water profile is, in one embodiment, triangular. By the time the flow reaches the end of the upper outflow lip, there is a substantial horizontal vector and flow is radial away from the circulator centerline (that is, the outflow has a horizontal velocity vector that insures radial surface outflow).

The sectional diverter 26B resembles an inverted frustum of a cone with substantially parabolically curved sides inside and out. The upper edge of sectional diverter 26B connects to the bottom of float chassis rim 26A A plurality of supports 102 are integrally attached to the bottom of rim 26A to separate it from the outflow lip 80 when the float chassis 26 and diverter 28 are joined with mechanical connectors.

When assembled, the circulator 20 includes a motor cover 24 to protect the electric motor and other components, this cover being removably attached mechanically to the top of float-chassis 26. A lifting rod 82 is attached to the unit to facilitate moving the assembled unit. In one example, lubrication for the rotating parts is provided by a Petromatic™ grease cup 40 held by grease cup holder 36 fastened atop the rim 26A of float chassis 26, with a grease line 48 directing grease to bearing 53. An electric motor 52 is mounted on motor mounts 52B and connects to gear reducer 52A to drive the impeller attached to the impeller hub 38A at a suitable speed via drive shaft 34.

Figure 1B:
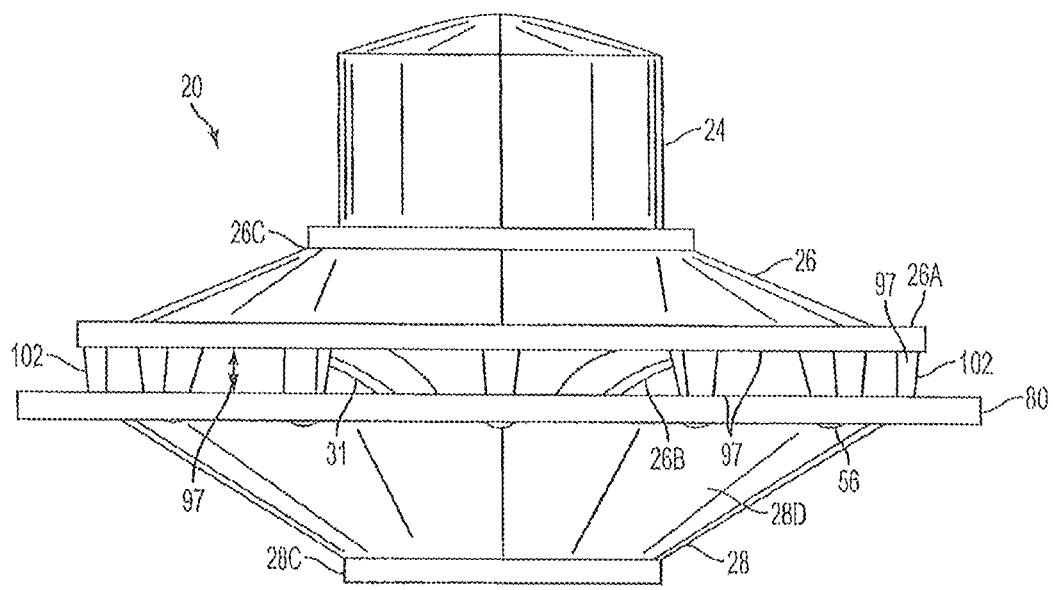
FIG. 1B illustrates an assembled view of the embodiment shown in FIG. 1A.

FIG. 1B provides a detailed view of the assembled circulator 20, including motor cover 24, float chassis 26 and diverter 28. Cover 24 is removably mechanically connected to the upper surface 26C of float chassis 26. Supports 102 are, in one example, molded as integral parts of the underside of rim 26A of float chassis 26, but can optionally be fabricated separately and attached by any suitable mechanical means. Float chassis 26 and diverter 28 are mechanically connected by bolts 56 or other suitable mechanical connectors passing through bolt holes from the underside of outflow lip 80 into the undersides of supports 102. Supports 102 are of a height appropriate to optimize the flow of water discharged through the outflow spaces 97 between the underside of rim 26A of float chassis 26 and outflow lip 80 of diverter 28, and are streamlined. In one embodiment, outflow lip 80 is six inches wide (that is, in this example, outflow lip 80 extends six inches beyond rim 26A).

The diverter intake 28B, within which the impeller operates, takes up water substantially vertically from below into a progressively expanding annular passage defined by the conical interior of diverter 28 and the parabolically curved exterior of the sectional diverter 26B. The intake water then emerges through outflow spaces 97 onto outflow lip 80 to flow in omni-directional laminar flow fashion onto the surface of the water in which the unit floats. The buoyancy of the circulator is designed so that it floats at a level such that water surface is above outflow lip 80, with water covering at least a portion of outflow spaces 97, and the water surface lying at the level of the underside of rim 26A or lower. This produces a laminar flow of water initially having a height of the height of outflow spaces 97.

The width of outflow lip 80 can be varied in different models to optimize the production of laminar flow for various volumes and rates of discharge. For example, a four-inch outflow space and six-inch outflow lip (that is, which extends six inches beyond rim 26A) are effective in producing laminar flow for a discharge of 7 million gallons/day (MGD) using three horsepower in "mix mode" (e.g., when the impeller runs counterclockwise). When the unit is operating in "aeration mode" (i.e., the impeller runs in the opposite direction (e.g., clockwise) from mix mode), the multiple plane surfaces of diverter 28 (28D) and the sectional diverter 26B (31), forming polygonal cross sections, are helpful in producing some bubbles in the water, which contribute to better mixing and aeration. In aeration mode the flow is 2MGD ("Million Gallons per Day"). In other words, if non-cavitating water flow is produced by counterclockwise impeller rotation, then cavitating water flow is produced by clockwise impeller rotation (and vice versa).

Connection fitting 29 below diverter collar 28C at the bottom of diverter 28 includes concentric ridges 29A and diverter inner surface inside (not shown in FIG. 1). Water can be taken up directly through diverter intake 28B or through an intake tube (not shown). Fitting 29 is designed to mate with a fitting for an externally corrugated/internally smooth intake tube.

Figure 3A:
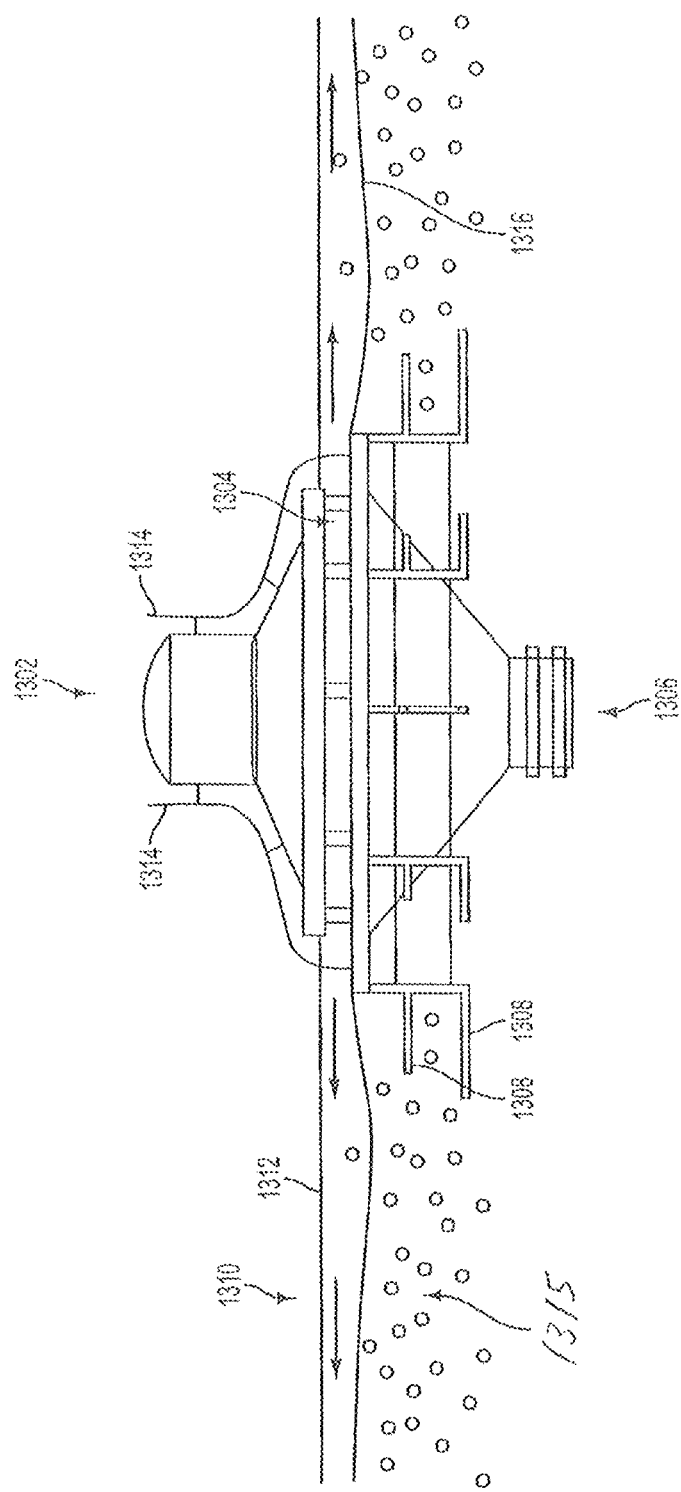

Another water circulator, identified as 1302, is illustrated in FIGS. 3A-3C. Circulator 1302 may be a Yellow Frog™ Circulator (or "YF" circulator), which may be used as a circulator in the disclosure herein. These figures illustrate an apparatus for making vertical-rising bubbles move horizontally. Bubble escape velocity is proportional to bubble radius until the bubble is greater than 1 mm. Thereafter the escape velocity is constant. The internal components of the circulator 1302 (which is sometimes referred to herein as "YF 1302") are similar to those shown in FIGS. 1A and 1B, thus only distinguishing features will be described hereinbelow.

Aerators are historically designed to maximize droplet macro surface area (number of drops×area/droplet) in air, or make air bubbles small (greater macro surface area) and deep (more detention time for oxygen transfer). These strategies consume large amounts of energy by throwing water up into the air or pushing gas deep into the water column. Many inventions have been made to increase the oxygen transfer rate (OTR). OTR is a helpful way to measure efficiency in aerobic systems (lbs $O_2$/hp×hr).

OTR is an inelegant measure in hybrid systems wherein air is added, but much of the remediation takes place in anaerobic granules. OTR explicitly assumes that 100% of remediation is aerobic. For example if half the BOD were removed aerobically and half anaerobically, the reported OTR of the aerators would double.

It is well known that when bubbles rise to the surface, the elevation of the gas/liquid mixture rises and fluid flows radially away from the bubble. If bubbles are added in a line, e.g. from an aerator hose, the flow is left and right from the axis of the hose.

If droplets are thrown radially from a splasher aerator, the drops have a horizontal and vertical vector. The horizontal vector makes the fluid flow away from the splasher.

The YF 1302 is an improved aerator that decouples bubble formation and fluid flow. YF 1302 is a circulator with radial surface outflow 1304, a water intake 1306, air intake 1314, and two sets of four concentric rings of aeration hose 1308 connected to the air intake 1314.

The concentric rings 1308 are positioned at sufficient position apart below the surface of the water for the emission of microbubbles to rise between the aeration hoses of the upper set of concentric rings. In an embodiment, the concentric rings are positioned at 9 inches and 18" below the surface, respectively. Additionally, the lower (second) set of concentric rings 1308 are staggered with respect to the upper (first) set of concentric rings 1308, such that micro-bubbles emitted by the lower set of concentric rings 1308 rise between the aeration hoses of the upper set of concentric rings 1308. The above positioning of the concentric rings 1308 is intended for illustrative purposes. The upper concentric ring is positioned more than 2 times deeper in the water column than the depth of the water discharge from the radial surface outflow 1304 with respect to the surface of the water. At twice the depth, the air bubbles emitted by the upper set of concentric rings 1308 are below the wave/no wave interface created by the water discharge.

In an embodiment, each of the two sets of con centric rings 1308 is connected to a respective air intake 1314, such that the flow between the upper set of concentric rings 1308 and the lower set of concentric rings 1308 is equalized. Since there is a minimum 6 inch gap between the upper set of concentric rings 1308 and the lower set of concentric rings 1308, higher air pressure is needed to push air to the lower set of concentric rings 1308. The depth of the vertical inlet 28B sets the maximum spacing.

The bubbles are externally produced at an intermediate elevation between the aerator inlet and outlet. If the bubbles are produced below the inlet, the bubbles are sucked into the inlet and coalesce. If the bubbles are produced above the outflow, the bubbles escape and do not flow horizontally.

As shown in FIG. 3A, the water exiting from radial surface outflow 1304 is introduced below the water surface 1310. Additionally, the introduction of micro air bubbles into the water column creates a region of low viscosity 1315 in comparison to the surrounding water. Thus a boundary 1316 is created between the typical, high viscosity water 1312 and lower viscosity aerated water 1315. This boundary 1316 acts to dampen the rate of rise of the micro air bubbles. As a consequence the micro air bubbles are directed horizontally for an extended distance before reaching the water surface 1310.

Radially outflowing, well-mixed, water hydraulically redirects rising bubbles horizontally, i.e. redirection is not with machines or steering means. Bubbles less than 1 mm radius are re-entrained in the diverging surface flow lines. The diverging flow lines separate individual bubbles one from another to prevent coalescing and consequent loss of macro surface area.

The radial, well-mixed, substantially gas-free, outflow is non linear and eddies are formed that continuously re-entrain bubbles of less than 1 mm radius. When small bubbles are re-entrained, detention time is increased sufficiently for oxygen to transfer to the water.

In an embodiment of the YF aerator 1302, only one set of concentric rings 1308 is provided. In another embodiment more than two sets of concentric rings 1308 are provided, each disposed at different vertical positions.

Additionally, an embodiment of the YF aerator 1302, as shown in FIGS. 3B and 3C, is in fluid communication with radial, vertical, semi-permeable, attached growth surfaces 1404 disposed from radially extending spokes 1402. For clarity of the structure, FIG. 3B only shows two spokes 1402 and growth surfaces 1404 attached to the floating spoke and hanging vertically down, with a weighted pipe at the lower edge of the growth surfaces 1404 that keeps the growth surface substantially vertical. However, in actuality, the YF 1302 of the present invention has a plurality of spokes 1402, as shown in FIG. 3C, extending radially from the central axis of the YF 1302 and spaced at intervals about the circumference of the YB 1302. With the growth surfaces 1404 disposed as shown in FIG. 3B, large radius bubbles, greater than 1 mm radius, are obstructed from reaching the water surface for a period of time sufficient to discharge their oxygen to the attached growth surface. The attached growth has a DO greater than mg/l for a spoke length of 10 feet. The spokes 1402 and growth surfaces 1404 are optionally equipped on the YF 1302 when a specific waste treatment project would benefit from the additional vertical growth surfaces as discussed above, for example if carbon and or nitrogen reduction is desired. Thus, the YF 1302 discussed in this disclosure encompasses both embodiments with and without the spokes 1402 and growth surfaces 1404. The term "DO" refers to dissolved oxygen (mg/l). This is the concentration of $O_2$ in the water.

As shown in FIG. 3C, the spokes 1402 are not mechanically connected to the YF 1302, but rather float freely and substantially encircle the YF 1302. In the embodiment shown in FIG. 3C a large opening is provided at one side of the arrangement of spokes 1402 to allow easy access to and removal of the YF 1302. However, the spokes 1402 may, in an embodiment, form a completed circle around the YF 1302. Each of the spokes 1402 are connected to adjacent spokes 1402 by connecting members 1406 and 1408. Long connecting members 1406 are disposed on the outside perimeter of the arrangement, while shorter connecting members 1408 are disposed on the inside perimeter. This arrangement of connecting members 1406 and 1408 forces the spokes into a radial configuration. The length of the long connecting members 1406 and short connecting members 1408 are determined by the length of the spokes 1402 and the desired angle formed between adjacent spokes 1402.

It was determined experimentally that aerobic conditions do not exist beyond spoke lengths of 15 feet when the aerator and spokes are deployed in high BOD environments. The anaerobic section grows thick slime, for example, 8 to 12 inches thick, e.g., 10 inches thick, that sinks the tip of the spoke. The spokes are intentionally shortened to insure that the entire growth surface is sufficiently aerated that the shavers and grazers have sufficient oxygen to thrive. For example, spokes may be 10 ft long, with a growth surface of 27" deep and 2" thick.

The aerobic matrix, i.e. the growth surface 1404, is self-cleaning as long as it is aerobic. The natural color of the matrix is black. The in-use color is tan.

The matrix total volume is populated with sludge worms, insect larvae and nematodes (round worms). The worms graze on the colonizing bacteria and eat the bacteria. The grazers keep the matrix clean (self-cleaning), if the DO is greater than 1 mg/l. In an embodiment, the YF circulator, as illustrated in FIGS. 3A-3C pumps 7 MGD of water through an annular space 4 inches high with a diameter of 7 ft (7.33 ft$^2$). The exit velocity is less than 2 ft/sec. Turbulent flow in clean water is typically established at velocities greater than or equal to approximately 7 ft/sec. Substantially non-turbulent flow leaves the YF flowing radially and horizontally away from the centerline of the YF. However, the impeller turns slowly enough, such as at about 150 rpm, to impart a slight counterclockwise curvilinear flow pattern with a distinct cross vector that moves water right-to-left as well as out from the centerline.

As water flows out from the YF 1302, coarse and fine bubbles rise vertically into the horizontal gas-free, non-turbulent water flow. The coarse and fine bubbles are entrained in the outflowing eddies to a diameter of about 50 ft. Non-turbulent flow minimizes bubble coalescing. The bubbles remain in the water column much longer so there is sufficient detention time to transfer bubble-interior oxygen to the water. This results in a 5-fold increase in oxygen transfer efficiency to 3 lbs $O_2$/hp×hr.

Figure 4:
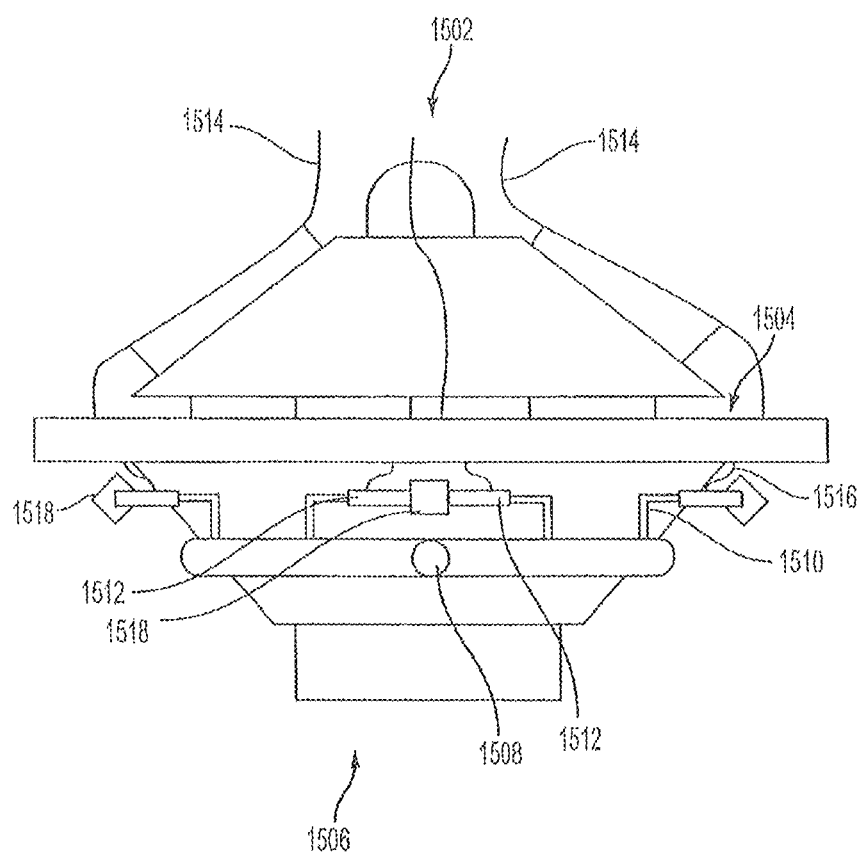
FIG. 4 illustrates a schematic representation of an aerator apparatus used in the present disclosure.

Another water circulator, identified as 1502, is illustrated in FIG. 4. Circulator 1502 may be a Gold Frog™ Circulator (or "GF circulator"), which may be used as a circulator in the disclosure herein. The circulator 1502 (which is sometimes referred to herein as "GF 1502") is an aerator with one or more air jets 1518 for injecting an external source of air bubbles at a vertical position between the water inlet 1506 and water outlet 1504. The injected air bubbles rise under the well-mixed radially outflowing water ejected from the water outlet 1504. The rising air bubbles elevate the outflowing water above the mean elevation of the surrounding water such that gassy water flows left and right. The internal components of the GF circulator are similar to those shown in FIGS. 1A and 1B, thus only distinguishing features are shown in FIG. 4.

In an embodiment, two impinging venturis 1512, are disposed within the air jets 1518 in order to generate a high volume of micro air bubbles in a jet of water emitted through the air jet 1518. Water is drawn into the venturi s 1512 through a water inlet 1508 and piping 1510. Additionally, air intake hoses 1514 are provided above the water surface which feed air to the venturis 1512 by way of respective air hoses 1516. Each of the impinging venturis 1512 directs jets of micro air bubbles at one another at a closing velocity of approximately 7 ft/sec and a downward angle of about 15°. The closing velocity can be as great as 10 ft/sec. The closing velocity may range from about 7 ft/sec to about 10 ft/sec. Downward angles may range from about 3° to about 30°. Circulator flow rates between about 2MGD and about 7MGD will work. Skilled artisans can adjust the downward angle to maximize detention time in the water column without deviating from the present invention. The impingement fractures small bubbles into micron-sized bubbles; the downward angle maximizes the time the bubbles are in the water column.

The shear from impinging venturis 1512, wherein each venturi 1512 has turbulent flow, will hydrolyze triglycerides into fatty acid and glycerin. The fatty acid (soap) in turn lowers the surface tension of the water. Lower surface tension ("wetter water") is particularly advantageous with land application of wastewater from manure ponds and municipal waste.

In an embodiment, the GF was used with a circumferential baffle just prior to land applying lagoon effluent. Prior to the GF, the mean of 10 monitoring wells for nitrate was 6 mg/l and rising steadily (5 years). After the GF, the same mean was 4 mg/l, a 33% reduction. When the lagoon turned over seasonally, the screen protecting the land application pump was fouled with dislocated worms. Surface tension was reduced −17.5%. BOD was 10 mg/l.

Without wishing to be bound, it is believed that the impingement cavitation ruptured algae and hydrolyzed algal fat into soap, lowering surface tension. Lower surface tension helps water soak into the soil, extract soluble nutrients and then helps the root absorb the nutritious water. Dissolved oxygen was redirected down 14 ft to the bottom of the water column, allowing worms to commingle biosolids and non-digestible ash into castings. When the lagoon turned over, worms were entrained in the flow and caught on the screen.

This aerator eliminates hoses inside the chassis that transfer gassy water present in certain conventional devices. The impingement T (or T pipe) is rotated horizontal to an elevation intermediate between the inlet and the outlet of the circulator. For example, the impingement T exit is angled at about −15° from the horizontal such that each pair of venturis discharges microbubbles down-then-up such that the net flow is horizontal and under the outflowing laminar gas-free water. In one example, with a given pair of venturis, the combined collision velocity inside the T exit is ≥7 ft/sec.

Microbubbles generated by the GF 1502 rise up into the outflowing laminar flow and are entrained and made to move horizontally without any one stream intersecting with the adjacent stream, doubling the efficiency over certain conventional devices.

Thus like the YF embodiment, the GF embodiment discharges gas at an intermediate elevation between the pump inlet and outlet where externally-generated bubbles rise vertically into horizontal outflowing laminar flow with a flow vector aligned with the centerline of the circulator and a flow vector at right angles to the centerline flow vector.

An embodiment of the GF 1502 removes the transfer line and the flow resistance and redirects the impingement T so that the discharge from the air jet 1518 ranges from about 10 to about 20 degrees below the horizontal, such as about −15° below the horizontal, from about 2 to about 10 inches, e.g., about 4 inches below the water surface. For instance, it was found that the combination of eliminating back pressure and directing free flowing gassy fluid at an angle of 15 degrees below the horizontal and 4 inches below the water surface increased oxygen transfer efficiency by 400%.

Operating at low backpressure is well known. What is unexpected is combining low backpressure venturi operation with horizontal radial outflowing gas-free water after impingement mixing below horizontally outflowing gas-free water to detain bubbles in the water column for a time sufficient to extract about 20% of the oxygen.

In one example, the venturi-equipped GF 1502 pulls 2,023 lbs $O_2$/day through the sum of the venturis. The measured oxygen transfer rate (OTR) is ~4× (max OTR=6.5 lbs $O_2$/hp×hr) the high backpressure prior design of 0.24 lbs $O_2$/hp×hr.

In the world of mechanical aerators, this is a low efficiency aerator. However, the GF 1502 provides additional advantages. The GF 1502 adds oxygen, lowers surface tension, lowers *E. coli*, and lowers total suspended solids (TSS). In combination with a circumferential baffle and a YF, very low suspended solids are achievable. Without wishing to be bound, the cavitation at the point of impingement shears flagella from slow-settling flagella-bearing bacteria. Thus the cavitation increases the rate of settling.

The GF has another unexpected effect on effluent quality. It is well known that nitrifying bacteria are temperature dependent and are less active at cold temperature (less than or equal to 15° C.). Algae growth continues at low temperature but is slower than at warm temperatures. Permit requirements increasingly require low ammonia in the effluent. This is hard to achieve in water temperatures less than or equal to 15° C. When the GF is in fluid communication with the BF clusters in cavitation mode, the upstream water has very low TSS because TSS ("Total Suspended Solids")~BOD and (TSS-BOD) tends towards zero.

Attached growth surface will reduce ammonia, but not enough to meet winter discharge requirements. The GF cavitation at the impingement T ruptures about half the algae. TSS goes down, but ammonia goes up as it is released from algal proteins. When temperatures are greater than 15° C., algae bloom, increasing TSS. Bacterial nitrifiers are also very active, reducing ammonia. In winter, bacterial nitrifiers are relatively inactive, increasing ammonia. Algae growth slows, reducing TSS.

The GF is used during warm water and not used during cold water. In other words, when TSS is naturally low in winter, inactivate the GF so that algae will consume ammonia to make algal protein and be discharged, lowering ammonia by converting it into algal protein without increasing TSS to the point of exceeding the permit. Conversely in summer, activate the GF to rupture half the algae (to reduce TSS), releasing ammonia that in turn is consumed by now-active bacterial nitrifiers. Thus the TSS: ammonia balance can be manipulated seasonally by using GF cavitation to destroy or save algae.

Using the circulators, as described hereinabove; they are arranged as described herein.

For example, in the granule selection zone and the stratified quiescent zone, the water circulators are arranged as described in copending application, U.S. Ser. No. 15/803,539, the contents of which are incorporated by reference.

An embodiment of the present disclosure is directed to, inter alia, a system for the treatment of sludge in a lagoon containing water that promotes the formation of biologically active granules that digest sludge in the lagoon, the lagoon including a bottom thereof, the water of the lagoon having a surface layer, the system comprising: X number of water circulators having an impeller disposed in the lagoon in a cluster, wherein X is greater than three, e.g., 3, 4, 5, 6, 7, 8, 9, or 10; at least one of said X number of water circulators being configured to: (a) cavitate water taken from the lagoon; and (b) expel the water after cavitation, wherein the water is expelled from said impeller at constant impeller rotational speed at a cyclically varying flow rate radially across the surface from the centerline of each circulator such that at least some of the expelled water travels away from the water circulator in a path essentially parallel to the surface layer of the lagoon water; when said at least one water circulator is a number of water circulators less than X, the remainder of said X number of water circulators, other than said at least one water circulator, being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: each water circulator is located essentially on a circumference of a circle defined by a predetermined radial distance from a center point of the circle each water circulator is located essentially equidistant, along the circumference of the circle, from each adjacent one of the other water circulators; (e) a respective hydraulic wall formed from at least some of the water expelled from each of a given pair of adjacent water circulators, where horizontal flow vectors of the expelled water are substantially equal and opposite between adjacent circulators, said hydraulic wall redirecting the expelled water downward towards the bottom of the lagoon, thereby creating the conditions for the formation of the biologically active granules; and a quiescent area in fluid communication and downstream from the water circulator that cavitated the water, and located in the path of the redirected expelled water towards the bottom of the lagoon, whereby the expelled water forms a water column in said quiescent area to stratify the granules into a plurality of layers according to their density (the water in the lagoon when said X water circulators are disposed in the lagoon having an initial pH sufficient to form biologically active granules, such as at a pH of 7.5 or greater.

In one aspect of the present disclosure, X number of water circulators are disposed in the lagoon. X is greater than or equal to 3, in an embodiment, X is 3, 4, 5, 6, 7, 8, 9, or 10. At least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, the remainder of said X number of water circulators, other than said at least one water circulator, being configured to expel water taken from the lagoon, wherein the water is expelled (from the remaining water circulator(s)) substantially without cavitation and wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: (c) each water circulator is located essentially on a circumference of a circle defined by a predetermined radial distance from a center point of the circle; (d) each water circulator is located essentially equidistant, along the circumference of the circle, from each adjacent one of the other water circulators; (e) at least some of the water expelled from each of a given pair of adjacent water circulators forms a respective hydraulic wall.

As described above, each water circulator is located essentially on a circumference of a circle defined by a predetermined radial distance from a center point of the circle; each water circulator is located essentially equidistant, along the circumference of the circle, from each adjacent one of the other water circulators; (e) at least some of the water expelled from each of a given pair of adjacent water circulators forms a respective hydraulic wall. In an embodiment, each of the hydraulic walls intersects essentially at the center point. Moreover, in an embodiment, each of a given pair of adjacent hydraulic walls forms a respective hydraulic corner where the given pair of hydraulic walls intersect essentially at the center point. In this embodiment, the hydraulic walls direct water expelled from each of the water circulators into the hydraulic corners; and (the hydraulic corners force at least some of the water directed therein by the hydraulic walls downward, towards the bottom of the lagoon, thereby creating the conditions for the formation of the biologically active granules, the water in the lagoon when said X circulators are disposed in the lagoon having an initial pH of at least 7.5, after which the pH may range from 6.2 to 10.

Without wishing to be bound, in all of the embodiments described herein, the circulators create an upper aerated zone (DO>1 mg/l), a lower anaerobic zone (ORP ("oxidation reduction potential") more negative than −200 mV) and an intermediate facultative quiescent zone. The flow pattern is "perimeter flow", that is radially out from the centerline of the circulator to the said hydraulic wall (or baffle) and then down over a porous bed of lagoon granules and then back to the circulator inlet.

When the added oxygen is intentionally curtailed such that the quiescent zone has an ORP more negative than −200 mV, i.e. that the aerobes consumed all DO in the aerobic zone, then the perimeter flow brings anaerobic substrate to the porous bed of lagoon granules.

The distance from the circulator to the baffle and/or hydraulic wall is so designed to allow a sufficient detention time that the entire DO is consumed. In an embodiment, the linear distance between two adjacent circulators ranges from about 25 to about 75 feet, while in another embodiment, it is about 30 feet to about 60 feet, while in another embodiment, is about 40 feet to about 55 feet, while in another embodiment, it is about 46 feet to about 52 feet, while in a further embodiment, the distance is about 48 feet. This corresponds to a radius of the imaginary circle ranging from about 12.5 feet to about 37.5 feet; in one embodiment, while in another embodiment, the radius ranges from about 20 feet to about 27.5 feet, while in a third embodiment, it ranges from about 23 feet to about 26 feet and in a further embodiment, it is about 24 feet. In an embodiment, water circulator configuration parameters, such as spacing distance, may be determined by measuring the ORP of the quiescent zone and then expanding the radius until the ORP is more negative than −200 mV. Skilled artisans will recognize that the ideal radius can change if the water has more or less BOD (oxygen consumers). For example, at the lagoon inlet, the radius of the circle is reduced because the high concentration of BOD will consume all DO before the hydraulic wall. This is typically done at a test site and then reapplied in other applications.

In an embodiment, the X circulators are arranged in a lagoon essentially along the circumference of a circle. The circulators are essentially equidistant from the center of the circle. In an embodiment, the radius of the circle ranges in the distances as described above. As described above, there is a minimum of 3 circulators arranged in this circle. In an embodiment, 3 circulators are used, while in another embodiment, 4 circulators are used, while in still another embodiment, 5 circulators are utilized. Any number of circulators may be used, and arranged essentially around the circumference of a circle. The circulators, in an embodiment are arranged symmetrically. When an even number of circulators are utilized, in an embodiment, a line that connects opposing circulators passes through the center of this circle and is substantially equal in length to the diameter of this circle.

Figure 13A:
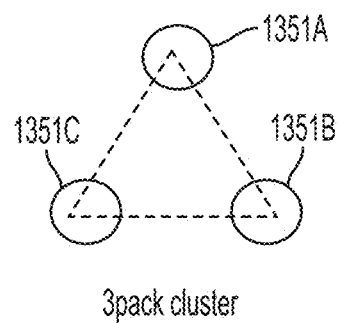
FIGS. 13A-13D illustrate schematic plan views of various arrangements of water circulators according to embodiments of the present disclosure.

In an embodiment comprising a large olive processing wastewater reservoir (40 ft deep), the embodiment had 3 circulators (FIG. 13A). In another embodiment for the same reservoir (lagoon), there were 5 circulators (FIG. 14C). Surface chloride concentration and surface BOD increased linearly with 3 circulators. Chloride declined linearly with 5 circulators; surface BOD was flat. In this embodiment, there were 3 hydraulic walls with 3 circulators (FIG. 14C) but 8 hydraulic walls with 5 circulators. Without wishing to be bound, the 167% increase in the number of hydraulic walls changed the biochemistry of the pond. The 5-circulator embodiment selected for bacteria that settle faster than the 3-circulator embodiment. Each produced cell incorporated some of the electrolytes, like chloride, and chloride level declined linearly as the cells sank. When the cells sank, surface BOD was flat.

In an embodiment, all of the circulators cavitate water from the lagoon and expel the water after cavitation. In another embodiment, at least 1 less than X circulators cavitate water from the lagoon and expel the water after cavitation. In an embodiment, at least 50% of the circulators cavitate water and expel the water after cavitation.

When the water is expelled from the water circulators arranged substantially around the circumference of a circle, at least some of the water expelled travels away from the water circulator in a path essentially parallel to the surface layer of the lagoon water.

Figure 5:
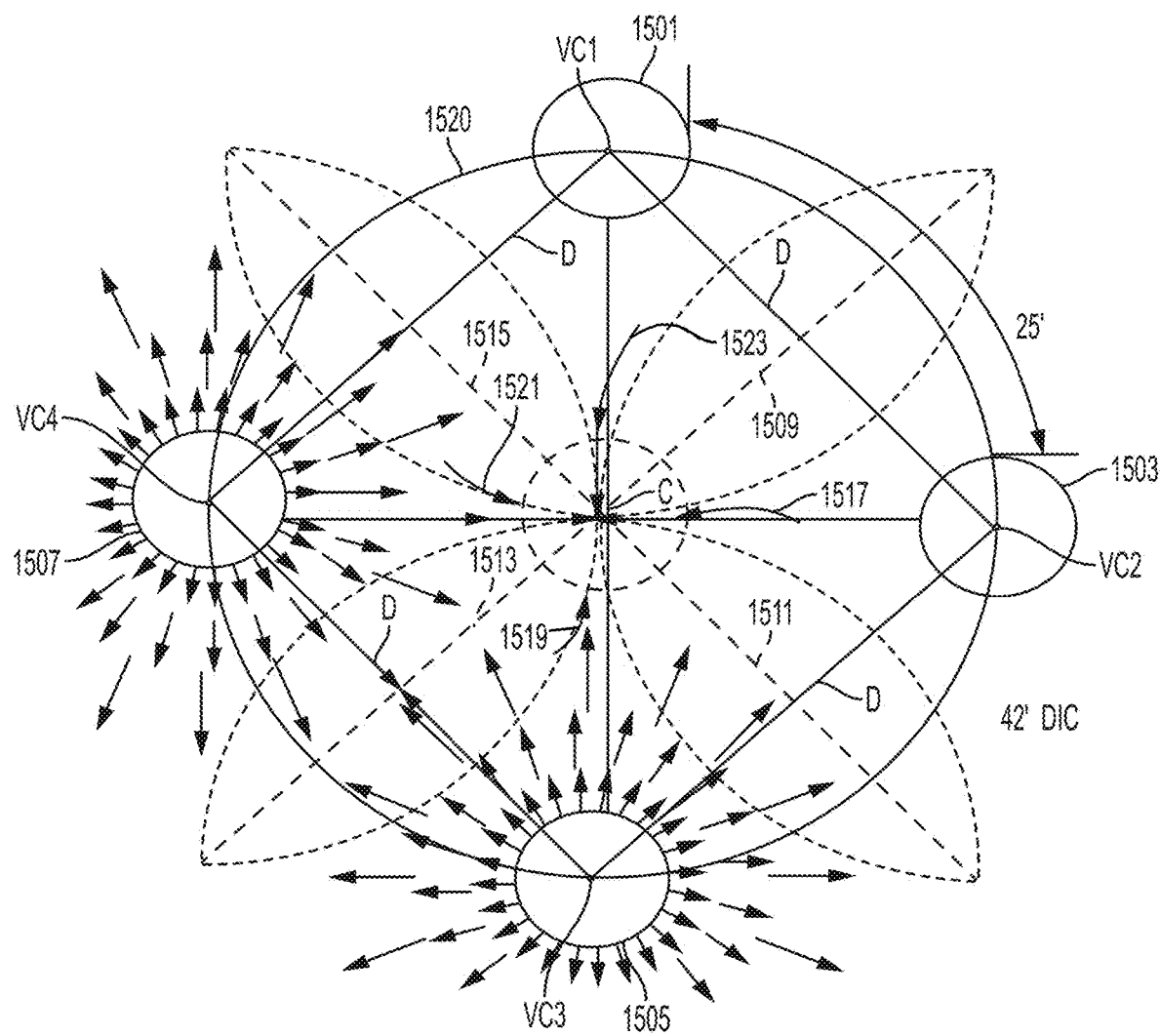
FIG. 5 illustrates a schematic plan view of a number of water circulators according to an embodiment of the present disclosure.

Referring now to FIG. 5 (showing a schematic plan view of a number of water circulators 1501, 1503, 1505, 1507 disposed in a lagoon), a system according to an embodiment of the present disclosure will be described. More particularly, this system is for formation of biologically active granules that digest sludge in a lagoon containing water, the lagoon including a bottom thereof, the water of the lagoon having a surface layer, the water of the lagoon having an initial pH of at least 7.5, after which the pH may range from about 6.2 to about 10. Further, X number of water circulators are disposed in the lagoon in a cluster, wherein X is an integer greater than 2 and less than 11 (in the example of this FIG. 5, X equals 4).

At least one of said X number of water circulators is configured to: cavitate water taken from the lagoon; and expel the water after cavitation, wherein the water is expelled such that at least some of the expelled water travels away from the water circulator in a path essentially parallel to the surface layer of the lagoon water (in this example, water circulators 1501 and 1505 comprise the at least one water circulator), and some is expelled downward in swirling flow. The cavitation may be carried out via a reciprocating flow of water, as described in more detail below.

Further, when said at least one water circulator is a number of water circulators less than X, a remainder of said X number of water circulators other than said at least one water circulator is configured to expel water taken from the lagoon, wherein the water is expelled such that at least some of the expelled water travels away from the water circulator in a path essentially parallel to the surface layer of the lagoon water (in this example, water circulators 1503 and 1507 comprise the remainder of water circulators). The remainder of the water circulators may operate in a non-reciprocating flow manner.

Further still, said X number of water circulators are disposed in the lagoon in a configuration such that: each water circulator is located essentially on a circumference of a circle (see call out number 1520) defined by a predetermined radial distance from a center point (see "C") of the circle and each water circulator is located essentially equidistant, along the circumference of the circle, from each adjacent one of the other water circulators.

Moreover, at least some of the water expelled from each of a given pair of adjacent water circulators (see 1501-1503; 1503-1505: 1505-1507; and 1507-1501) forms a respective hydraulic wall (see the dashed lines at 1509; 1511; 1513; 1515), each of the hydraulic walls (see 1509; 1511; 1513; 1515) intersect essentially at the center point (see "C"), and each of a given pair of adjacent hydraulic walls (see 1509-1511; 1511-1513; 1513-1515; and 1515-1509) forms a respective hydraulic corner (see 1517; 1519; 1521; and 1523) where the given pair of hydraulic walls intersect essentially at the center point (see "C"). The hydraulic walls are formed where horizontal outflow vectors from adjacent water circulators are equal and opposite (see, e.g. FIG. 5 showing hydraulic wall 1509 between water circulators 1501/1503, hydraulic wall 1511 between water circulators 1503/1505, hydraulic wall 1513 between water circulators 1505/1507, and hydraulic wall 1515 between water circulators 1507/1501.

In an embodiment, each hydraulic wall in a 4 pack cluster is the hypotenuse of a right triangle (having the radius from the center of the circle to the centerline of the water circulator as each of the two shorter sides). That is, in an embodiment, the square of the length of each hydraulic wall in a 4 pack cluster is equal to the sum of the squares of the lengths of the other two sides. Further, in an embodiment, a 4 pack cluster will have each water circulator provide 25% of its outflow to a given hydraulic wall.

In addition, the hydraulic walls (see 1509; 1511; 1513; 1515) direct water expelled from each of the water circulators into the hydraulic corners (see 1517; 1519; 1521; and 1523) and the hydraulic corners force at least some of the water directed therein by the hydraulic walls downward, towards the bottom of the lagoon (for example, in the area in FIG. 15 marked by the dashed circle around the center point "C"), thereby creating the conditions for the formation of the biologically active granules.

Other circulators that intentionally cavitate and/or have air injected could be used. The hydraulic wall is formed when the horizontal outflow vectors between any two adjacent circulators are equal and opposite. The opposing flows well up along the collision line until the gravity head is sufficient to redirect the horizontal outflow vertical and down. The water ricochets off the bottom but is pulled towards the swirling influent of the circulator inlet (see e.g., "H" of FIG. 15). The net result is perimeter flow as described herein. The flow alternates between aerobic (upper zone—see, e.g., "C" of FIG. 15 associated with zone 1) and anaerobic (lower zone—see, e.g., FIG. "C'" of FIG. 15 associated with lower zone 3). Without wishing to be bound, it is believed that soluble BOD created by anaerobes is converted to biosolids in the aerobic zone and settles in the lagoon granule bed for conversion to gas.

In this embodiment, when there are a plurality of hydraulic corners, flow is concentrated at the center "C". Water flows down each hydraulic corner to the bottom of the lagoon where it ricochets off the bottom and follows a curvilinear pathway back to the water circulator inlets.

During the flow ricochet process, dense seeds (e.g., biofilm coated calcium carbonate and enzymes formed by the cavitation and heavy hydrolytic brine) do not ricochet but settle at the bottom in the vicinity of "C". The high concentration in the vicinity of "C" promotes excess lagoon granule initiation. Thus a plurality of hydraulic corners in combination with reciprocating flow initiates more lagoon granules. More lagoon granules digest sludge faster. The lagoon granules form a porous bed below the circulation area.

Still referring to FIG. 5, it is noted that in one example, the cavitation of water by the at least one water circulator results from a reciprocating flow of water in the at least one water circulator (discussed in more detail below). Further, it is noted that while the example of this FIG. 5 provides for circulators 1501 and 1505 cavitating the water (via reciprocating flow) and circulators 1503 and 1507 being the remainder of the water circulators and not using reciprocating flow, any other desired number of water circulators may be the reciprocating flow or remainder water circulators. In addition, the reciprocating flow and remainder water circulators may be located at any desired locations on the circumference of the circle. In one specific example, there may be an even number of water circulators and at least two water circulators that are located opposite each other (that is, located a maximum distance apart across the circle) may be the reciprocating flow water circulators (wherein at least some water circulators are remainder water circulators without reciprocating flow).

In an embodiment, the reciprocating flow is adjusted so that the change in direction of the flow of water occurs at a time interval ranging from 0.1 sec to 8 seconds, and in another embodiment, from 0.15 seconds to 6 seconds, and in still another embodiment, from 0.17 sec to 5.5 seconds.

Still referring to FIG. 5, it is noted that in one example: each water circulator has associated therewith a respective vertical centerline (see VC1, VC2, VC3, VC4); a distance D between the vertical centerlines of each of a given pair of water circulators is in a range from about 25 to about 75 feet, and in another embodiment, from about 30 feet to about 60 feet, and still another embodiment, from about 40 feet to about 55 feet, and in still another embodiment, from about 46 feet to about 52 feet, while in another embodiment, about 48 feted is essentially equal for all pairs of water circulators. In one specific example, the diameter of circle 1520 is 42 feet, each water circulator has a diameter (in plan view at the waterline) of 8 feet, an outer edge of each water circulator is located along the circumference of the circle 1520 20 feet from an outer edge of each adjacent water circulator, and D (the straight line distance between vertical centerlines of adjacent water circulators) is 48 feet.

Still referring to FIG. 5, it is noted that each hydraulic corner (see 1517; 1519; 1521; and 1523) has an interior angle defined by a respective pair of hydraulic walls intersecting at the center point to form the hydraulic corner. That is: the interior angle of hydraulic corner 1517 is formed by hydraulic walls 1509 and 1511 and faces towards water circulator 1503; the interior angle of hydraulic corner 1519 is formed by hydraulic walls 1511 and 1513 and faces towards water circulator 1505; the interior angle of hydraulic corner 1521 is formed by hydraulic walls 1513 and 1515 and faces towards water circulator 1507; and the interior angle of hydraulic corner 1523 is formed by hydraulic walls 1515 and 1509 and faces towards water circulator 1501. Further, each interior angle may be essentially 360/X degrees (X being the number of water circulators). In an embodiment, the interior angles range from 120° to 36°.

As described hereinabove, the angle of the hydraulic corners is 360°/X. where X is as defined herein. When X is 3, for example, the angle of the hydraulic corner is 120°, and when X is 4, the angle of the hydraulic corner is 90°, and when X is 5, the angle of the hydraulic corner is 72°, and when X is 6, the angle of the hydraulic corner is 60°. In an embodiment, an angle of the hydraulic corners is 90° (e.g., when there are four water circulators in the configuration). In this embodiment 90°=360°/4 water circulators.

Still referring to FIG. 5, it is noted that in one embodiment, the water is expelled from each water circulator such that at least some of the expelled water travels away from the water circulator in a path along the surface layer of the lagoon water. Regarding the path of the expelled water see, for example, the radial arrows shown around water circulators 1505 and 1507 (of course, the water may be radially expelled from all of the water circulators even though only two sets of radial arrows are shown in this FIG. 5).

Of further note, while FIG. 5 provides an example where X equals 4, other configurations in which X is (for example) an integer greater than 2 and less than 11 may be provided.

Figure 6:
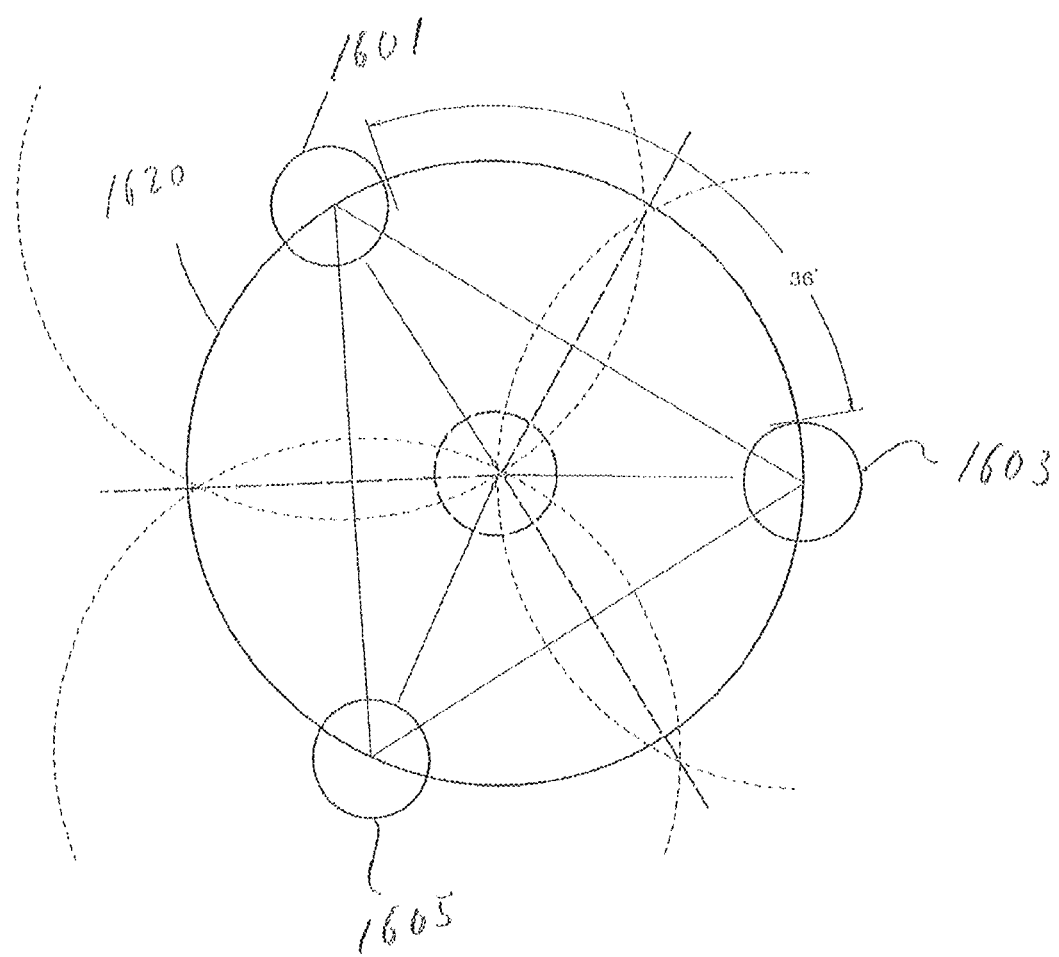
FIG. 6 illustrates a schematic plan view of a number of water circulators according to an embodiment of the present disclosure.

In this regard see, for example, FIG. 6 showing a schematic plan view of three water circulators disposed in a lagoon. More particularly, water circulators 1601, 1603 and 1605 are disposed on circle 1620 to produce hydraulic walls and hydraulic corners in a manner similar to FIG. 5. The three-pack shown here may be particularly advantageous when used in a cylindrical sludge holding tank. For example, a 50 foot diameter×20 foot deep tank can be used to make lagoon granules that are initiated in the central black dashed circle in FIG. 6.

Figure 7:
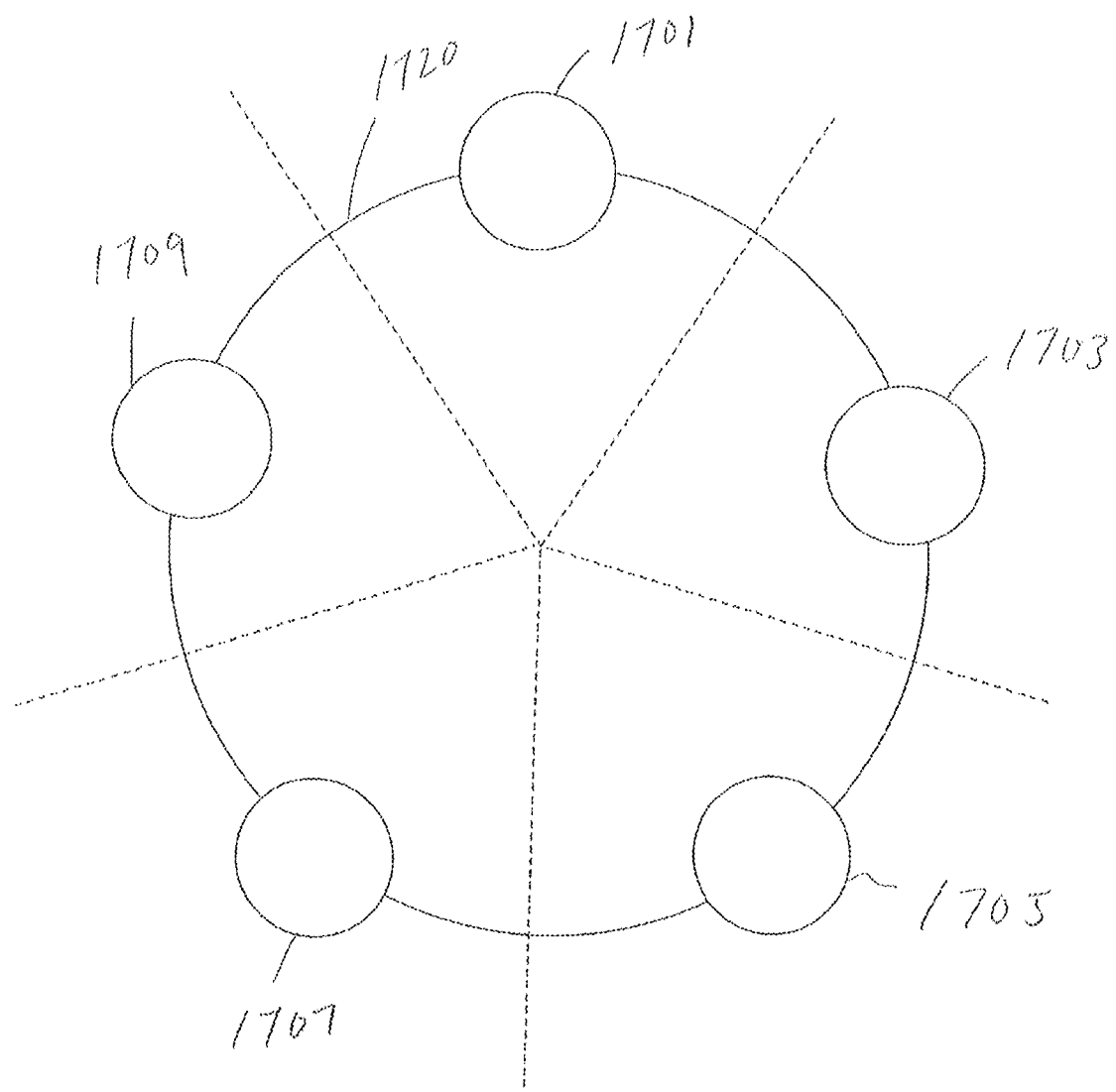
FIG. 7 illustrates a schematic plan view of a number of water circulators according to an embodiment of the present disclosure.

See also, for example, FIG. 7 showing a schematic plan view of five water circulators disposed in a lagoon. More particularly, water circulators 1701, 1703, 1705, 1707 and 1709 are disposed on circle 1720 to produce hydraulic walls and hydraulic corners in a manner similar to FIG. 5.

In yet another embodiment, the present disclosure includes the lagoon containing 2 or more clusters comprised of X circulators as above, wherein each of the clusters are comprised of X circulators located essentially on the circumference of a circle. The number of circulators in each of the clusters may be the same or different. In addition, the circumference of the circles with respect to each of the clusters may be the same or different. In other words, the radius of one of these clusters may be the same or different from the radius of another one of these clusters, but the radii of each of the clusters are in the range described hereinabove. If there is more than one cluster present, the circles do not overlap; instead the distance apart ranges from about 25 feet to about 75 feet, in one embodiment, while in another embodiment, they range from about 30 feet to about 60 feet, and in still another embodiment, they range from about 40 feet to about 55 feet, while in another embodiment, from about 46 feet to about 52 feet, while in another embodiment, about 48 feet. The lagoon may contain 2 to 20 clusters of these circulators, while in another embodiment, the lagoon may contain from 2 to 6 clusters, while in another embodiment, the lagoon contain from 3 to 4 clusters. Thus the number of clusters is dependent on the size of the lagoon, but these clusters are arranged in the lagoon so that the diameter of each of the clusters ranges, in one embodiment, from about 25 to about 75 feet, and in another embodiment, from about 30 feet to about 60 feet, and in another embodiment from about 40 feet to about 55 feet, while in another embodiment, from about 46 feet to about 52 feet and in a still further embodiment, about 48 feet. Any permutations of these diameters and distance between the clusters are contemplated.

Figure 8:
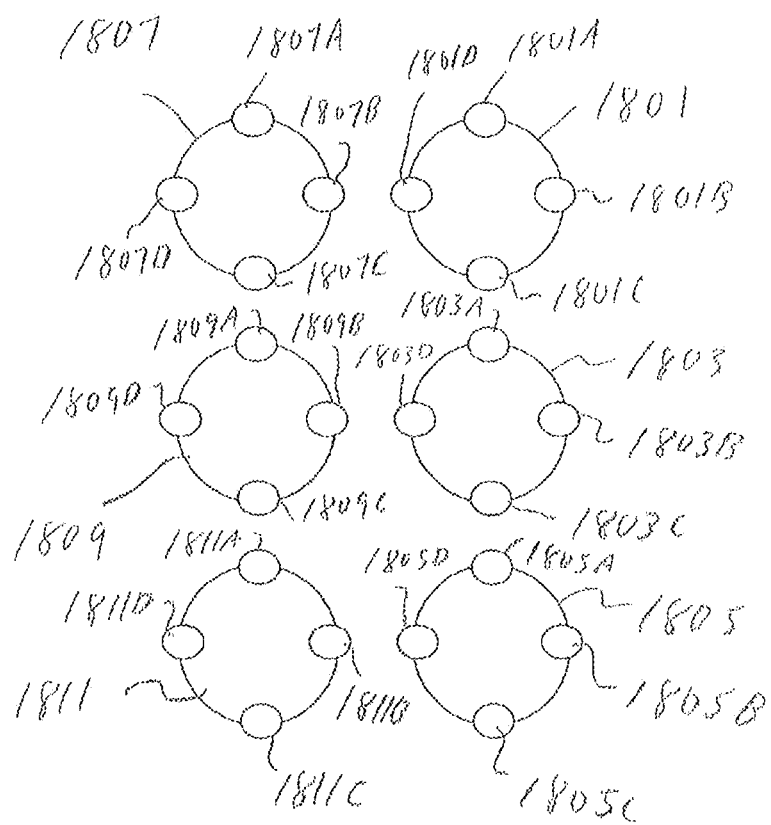
FIG. 8 illustrates a schematic plan view of a number of clusters of water circulators according to an embodiment of the present disclosure.

Further, each of the Y number of clusters of water circulators may comprise a set of water circulators in a configuration such as shown in one of FIG. 5-7 (or any other desired configuration). In one specific example, shown in FIG. 8, six clusters (see 1801, 1803, 1805, 1807, 1809 and 1811) are provided. Further each of these six clusters includes therein four water circulators. More particularly, cluster 1801 includes water circulators 1801A-1801D; cluster 1803 includes water circulators 1803A-1803D; cluster 1805 includes water circulators 1805A-1805D; cluster 1807 includes water circulators 1807A-1807D; cluster 1809 includes water circulators 1809A-18093D; and cluster 1811 includes water circulators 1811A-1811D.

Clusters may be provided in any desired number and may be positioned relative to each other in any desired configuration. In one example, a water circulator in one cluster may expel water that interacts with water expelled by a water circulator in another cluster such as to form one or more hydraulic walls and/or one or more hydraulic corners. In one specific example (with reference to FIG. 8) water circulator 1801C may expel water that interacts with water expelled by water circulator 1803A (of course, any other pairs of water circulators may operate in a similar manner).

In another embodiment, water circulators and/or clusters as described herein may be provided in multiple lagoons at a given location.

Figure 9A:
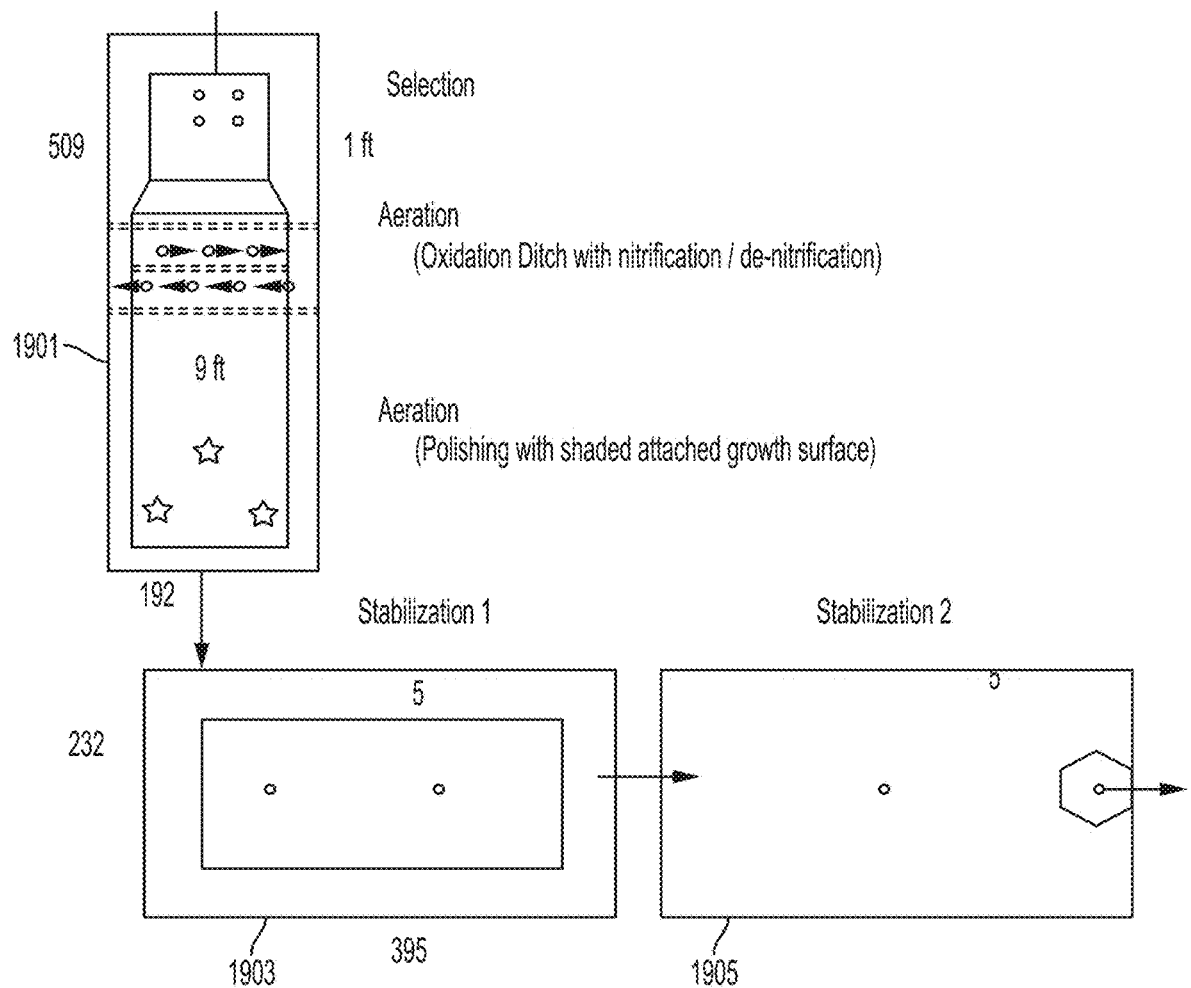
FIGS. 9A-9D illustrate schematic plan views of various lagoon arrangements according to various embodiments of the present disclosure.

For example, with reference to FIG. 9A, water circulators and/or clusters may be located as desired in one or more of multiple lagoons 1901, 1903 and 1905 existing at a particular site.

Figure 9B:
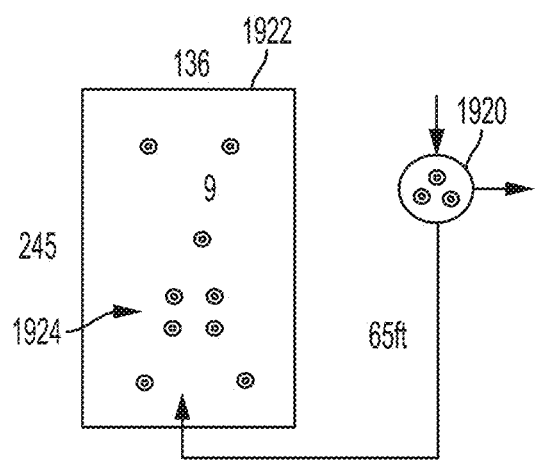

In another example, with reference to FIG. 9B, an open top sludge settling tank 1920 has a three-pack cluster to begin digestion. The tank is settled, for example, for 6 hours per week. Supernatant is returned to the head works; sludge is transferred to a sludge holding pond 1922. The sludge holding pond has a four-pack cluster 1924 and strategically placed mixing circulators to circulate the surface and keep the corners clean.

Figure 9C:
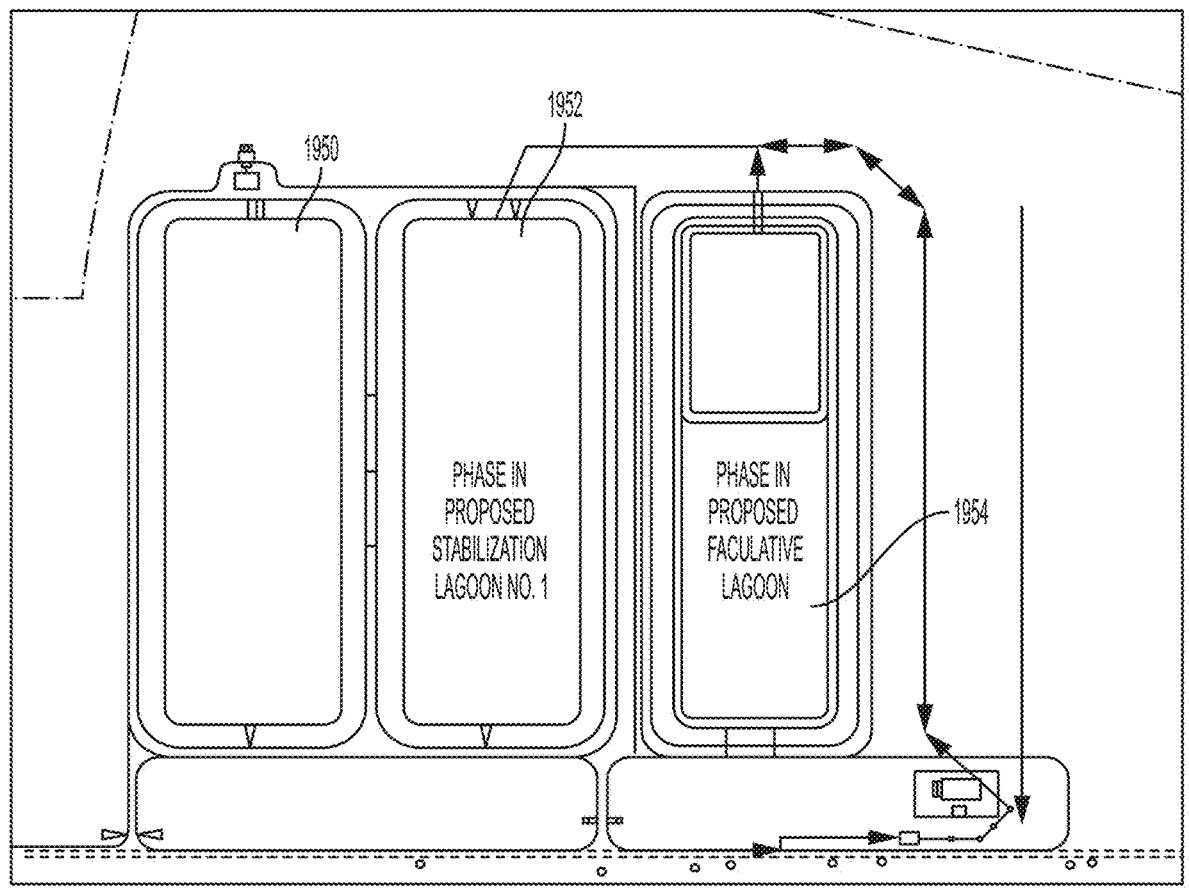

In another example, with reference to FIG. 9C, an example lagoon design (utilizing treatment pond 1950 and stabilization ponds 1952 and 1954) is shown. In connection with this embodiment of FIG. 9C, as with the other embodiments of the present invention, there is permit compliance, odor control and sludge digestion. Further, in connection with this FIG. 9C, the treatment pond may have an anaerobic deep end and an anaerobic shallow end. Further still, in connection with this FIG. 9C, the stabilization pond may be aerobic and shallow.

Figure 9D:
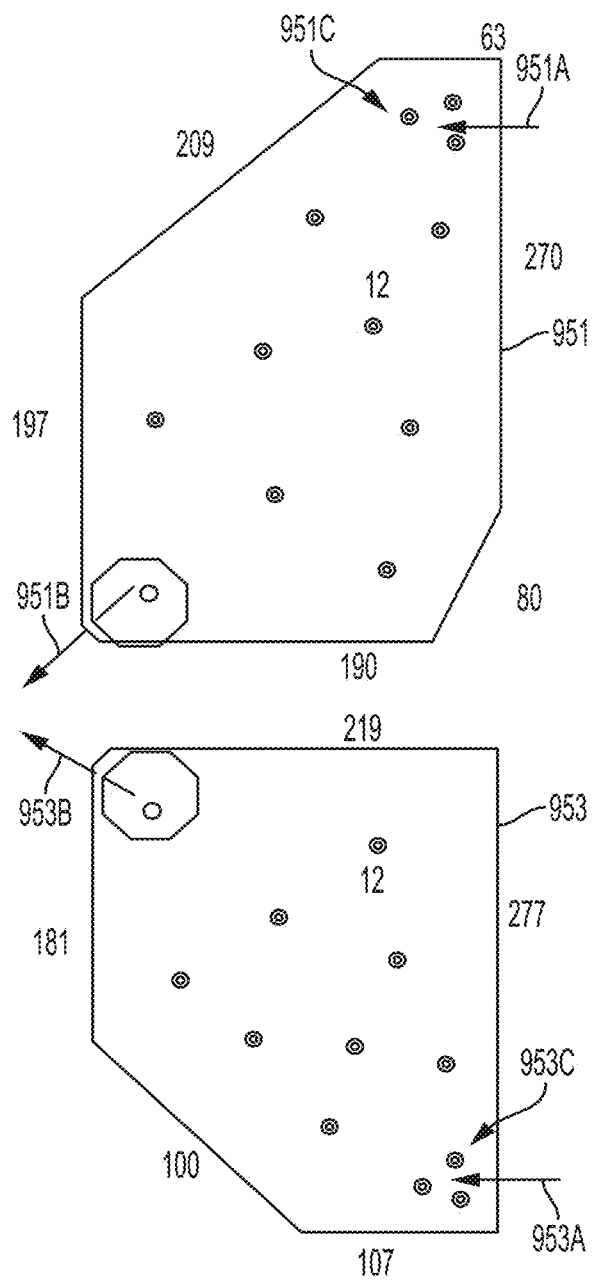

In another example, with reference to FIG. 9D, pond 951 and pond 953 each have a "black water" waste influent (see arrows 951A, 951B) and an effluent (see arrows 951B and 953B). Further, a 3-pack cluster of water circulators 951C is disposed in the corner of pond 951 and a 3-pack cluster of water circulators 953C is disposed in the corner of pond 953. In an embodiment, such a 3-pack cluster configuration may be used to fit into a space where an inlet is triangular.

In an embodiment, the cluster(s) as defined herein, wherein the circulators are arranged essentially on the circumference of a circle, are located such that the hydraulic corners are disposed above a substantially flat, substantially horizontal bottom surface of a lagoon (that is, not over the sloping sidewalls of the lagoon).

Figure 10A:
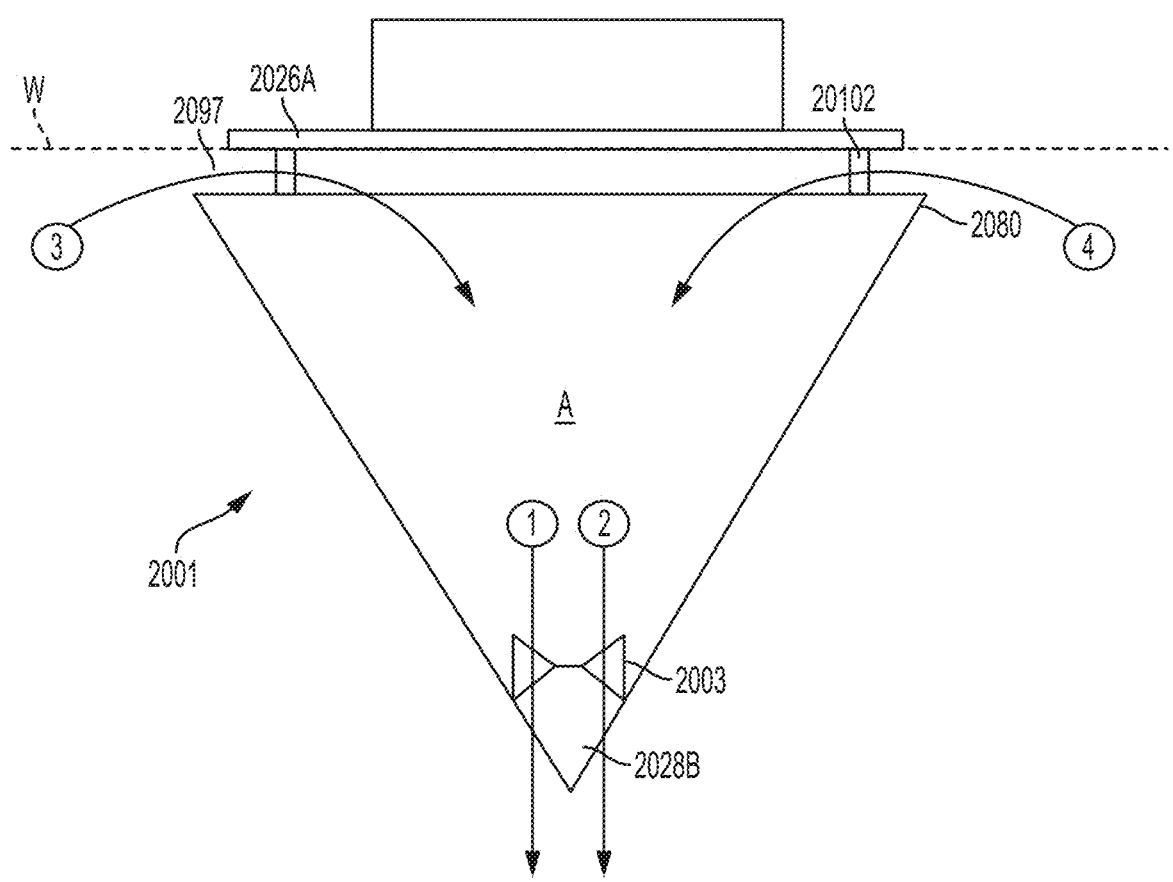
FIGS. 10A-10E illustrate an example of a water circulator operating to provide a reciprocating flow of water and cavitation according to an embodiment of the present disclosure. Schematic side views of the water circulators are provided.

Referring now to FIGS. 10A-10E an example of a water circulator operating to provide a reciprocating flow of water and cavitation is provided. More particularly, as seen in FIG. 10A, water circulator 2001 floats such that waterline W is above outflow lip 2080 (this water circulator 2001 is shown in a simplified schematic form; however, certain components correspond to the water circulator shown in FIGS. 1 and 1A as follows: outflow lip 2080 corresponds to outflow lip 80, supports 20102 correspond to supports 102, rim 2026A corresponds to rim 26A, outflow spaces 2097 correspond to outflow spaces 97, and diverter intake 2028B corresponds to diverter intake 28B).

Still referring to FIG. 10A, the example process begins at time $T_0$. At this time $T_0$, impeller 2003 rotates to pull water from cavity A. The water pulled from cavity A is pushed down and out substantially vertically through diverter intake 2028B (see arrows 1 and 2). In addition, the water pushed down and out through diverter intake 2028B is replaced by water flowing in through outflow spaces 2097 (see arrows 3 and 4).

Figure 10B:
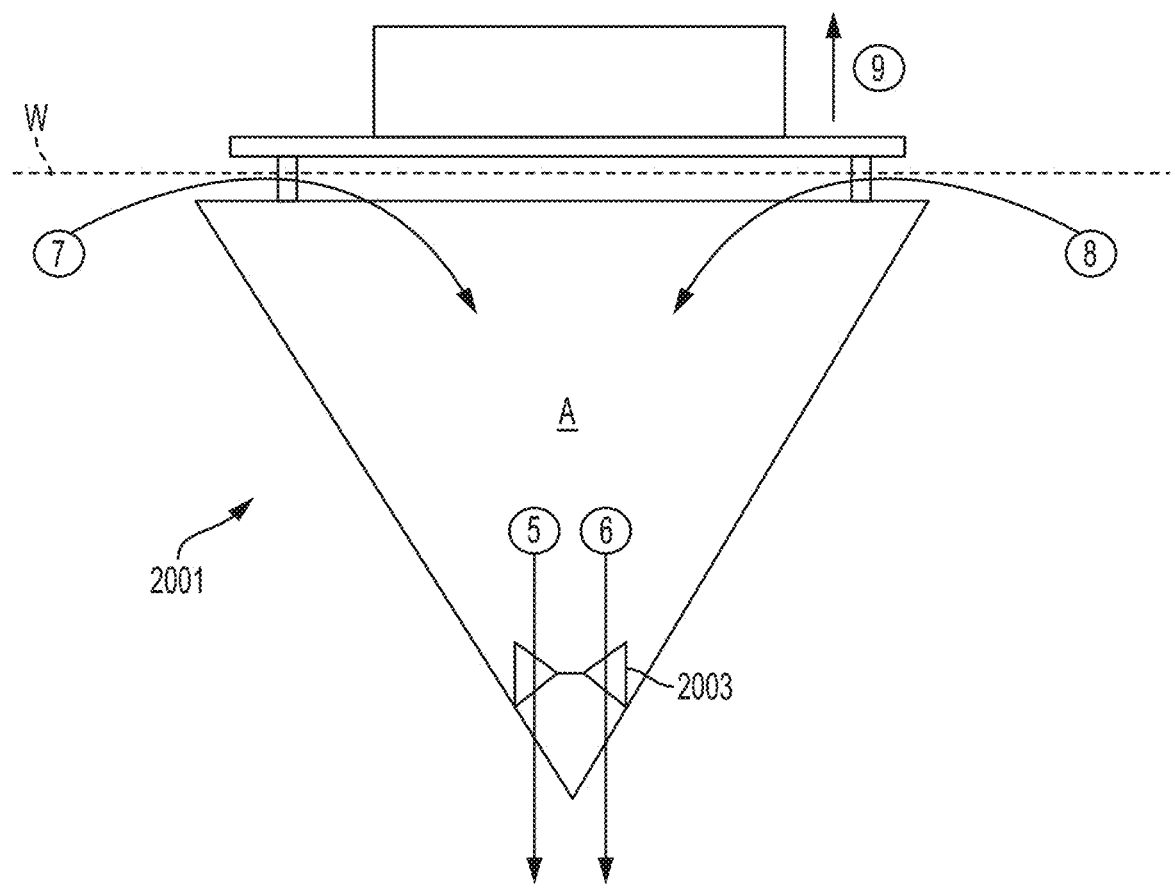

As impeller 2003 rotates, water continues to be pushed down and out through diverter intake 2028B (see arrows 5 and 6 of FIG. 10B). In addition, the water pushed down and out substantially vertically through diverter intake 2028B continues to be replaced in cavity A by water flowing in through outflow spaces 2097 (see arrows 7 and 8 of FIG. 10B). Of note, due to the water being pushed down and out substantially vertically through diverter intake 2028B, the entire water circulator 2001 moves up relative to the waterline W (due to equal and opposite reaction). This movement is seen at arrow 9 of FIG. 10B (as well as in the lowering of the waterline W relative to water circulator 2001).

Figure 10C:
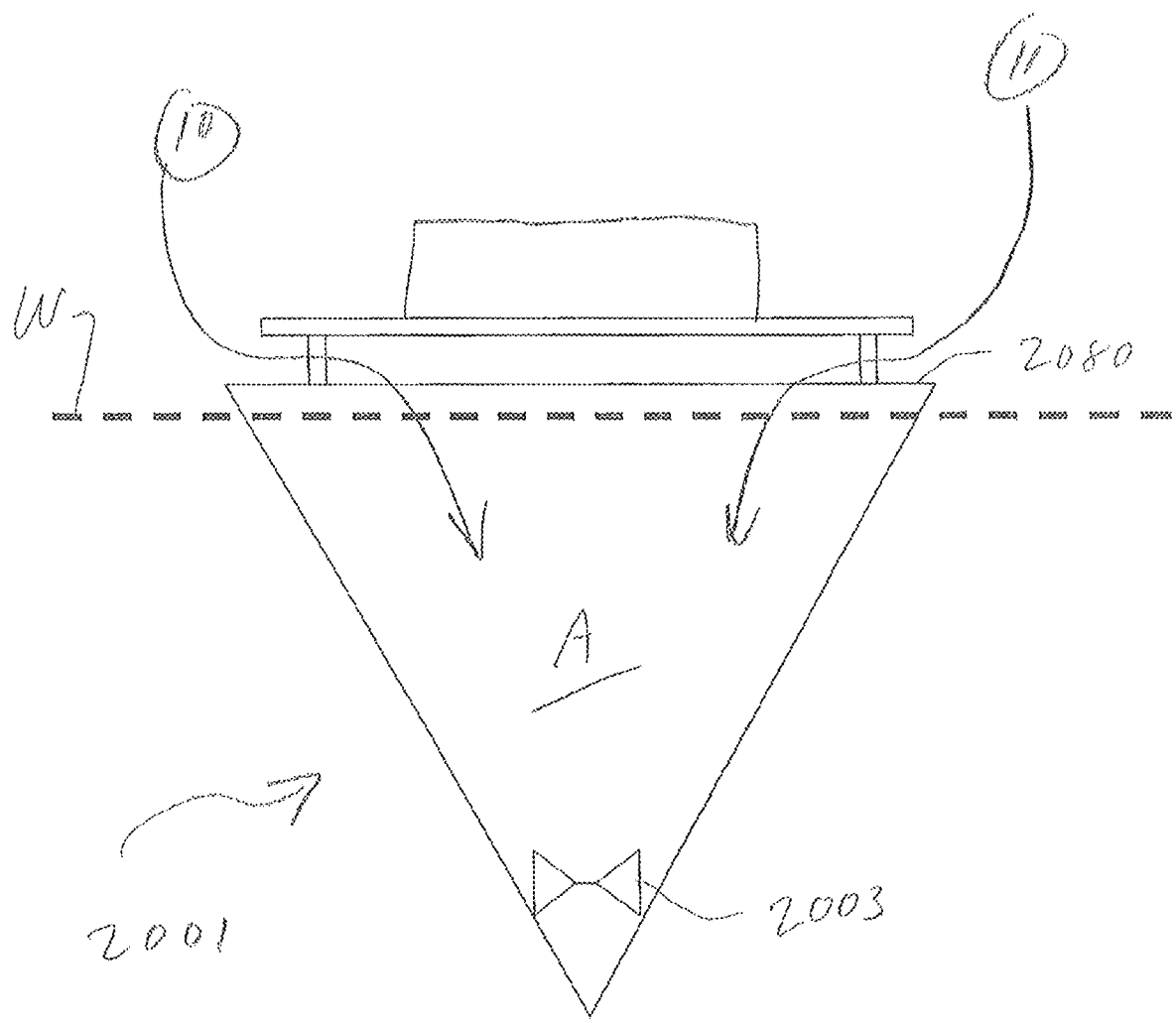
Figure 10D:
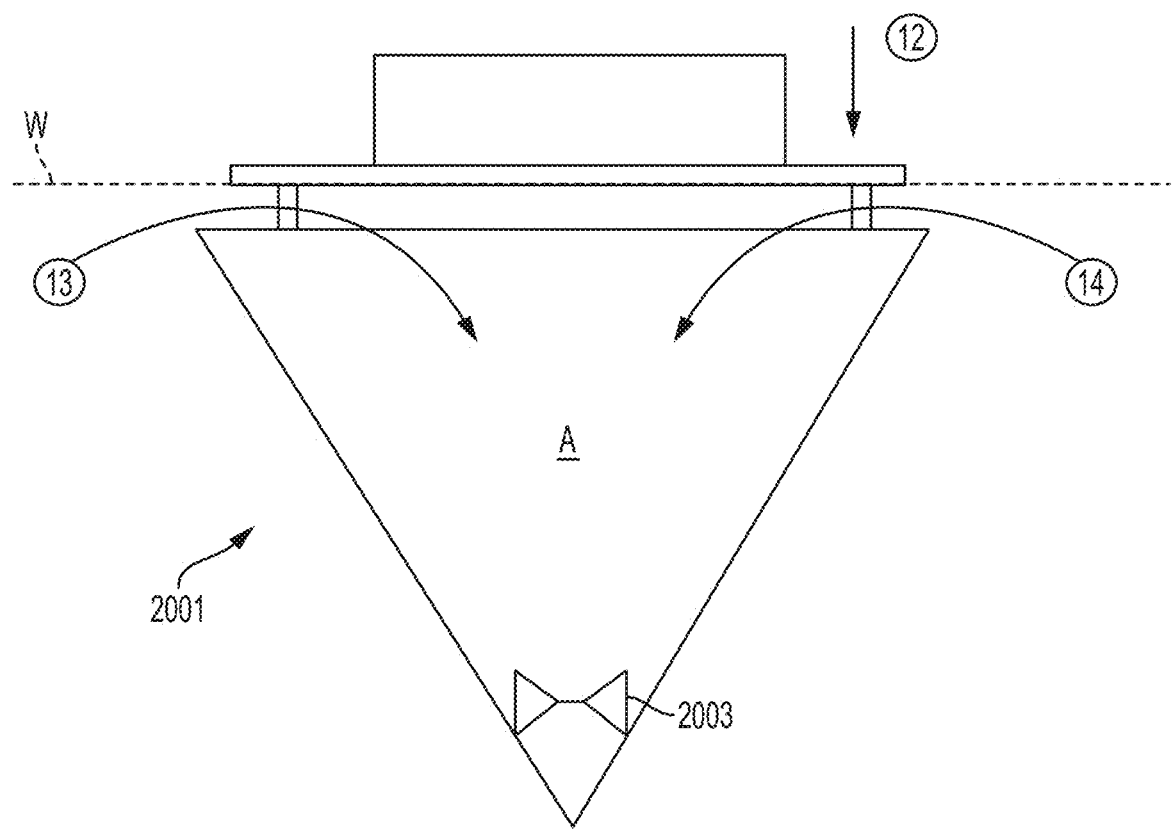

Next, at time $T_1$ (which occurs after time $T_0$) the water circulator 2001 moves up sufficiently high to bring outflow lip 2080 above the waterline W (see FIG. 10C). In one example, the time period between $T_0$ and $T_1$ is 0.15 seconds.

Once time $T_1$ is reached, air is ingested into cavity A (see arrows 10 and 11 of FIG. 10C) and the impeller 2003 loses its prime. A short time thereafter, at time $T_2$, the water circulator 2001 falls back down relative to the waterline W (see arrow 12 of FIG. 10D) and the outflow spaces 2097 ingest water (see arrows 13 and 14 of FIG. 10D). The heel of water and the previously ingested air are then whipped into a froth by the rotating impeller 2003 (which has continued rotating in a single direction (e.g., clockwise) since time $T_0$). In an embodiment, when flow reciprocates, the fill level of the water circulator changes up and down and the lowest level of the water in the water circulator is the heel of water.

Figure 10E:
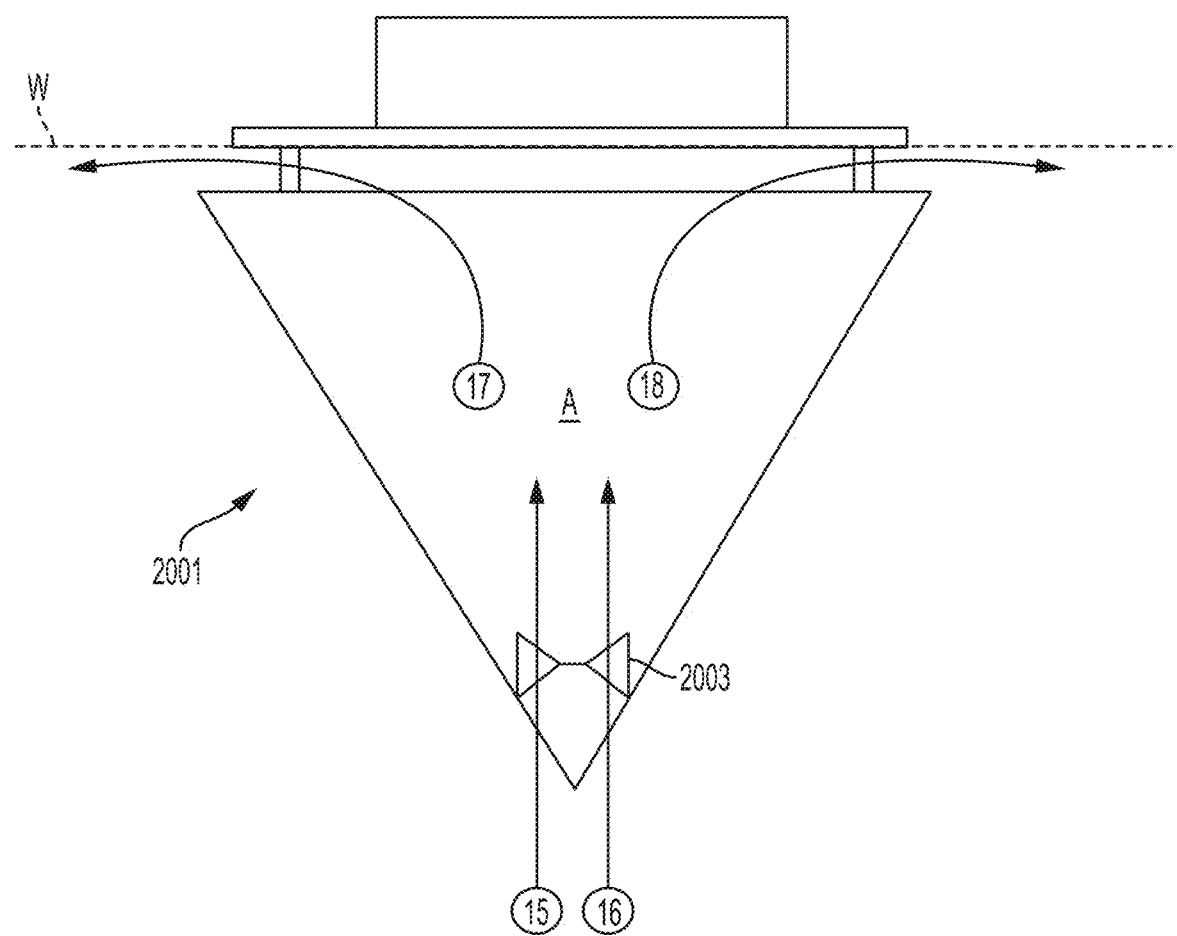

A period of time thereafter, at time $T_3$, the water flow reverses such that higher density water from outside the water circulator 2001 is forced up substantially vertically through the diverter intake 2028B (see arrows 15 and 16 of FIG. 10E), cavity A fills with water, and the water in cavity A then exits via the outflow spaces 2097 (see arrows 17 and 18 of FIG. 10E). The water reverses flow because the water outside the water circulator 2001 is at a relatively higher pressure due to the presence inside the water circulator 2001 of the lower density froth.

Still referring to FIG. 10E, it is noted that the gas-free water (see arrows 15 and 16 of FIG. 10E) flows past the impeller 2003 the "wrong way", causing intense cavitation (and shear) just above the tip of the impeller 2003. Finally, at time $T_4$, the impeller 2003 regains prime and water flow is down and out again (see FIGS. 10A and 10B). The process then repeats (through FIGS. 10C-10E). In one specific example, the process cycles every 6 seconds.

In practice there may be extra cavitating circulators. If VFA odors are perceived, the flow in a circulator may be reversed (to non-cavitating). This reversal of flow is continued in other circulators until the VFA odor is gone (e.g., overnight). For example, in the circumstances where there are initially 4 BFs (cavitating) on the circle, but there are VFA odors. The direction of rotation of the impeller of, for example, one water circulator is reversed and is run in the reverse direction for a day overnight. The next morning, the presence of a VFA odor is monitored. If the odor remains, the direction of rotation of the impeller of, for example, water circulator at the opposite end of the circle is reversed. In almost all circumstances, the VSA odor dissipates. The ideal configuration in this example then is 2 diagonal circulators rotating clockwise and the other two rotating counterclockwise. The hydraulic corners remain at about 90° to insure that the maximum number of granules are produced. Later, the sludge inventory is digested, so there are excess granules. The process may then be then reversed and in an embodiment, optionally one of the non-cavitating circulators can be changed to cavitating to increase enzyme production. This may be accomplished, for example, by a reversing switch on the control panel of each water circulator. Thus, the methodology not only reduces or eliminates waste but also reduces or eliminates odor.

In an embodiment, there can be other circulator(s) not in the disclosed configuration. In an embodiment, there is at least one cluster having the circular configuration.

Figure 11:
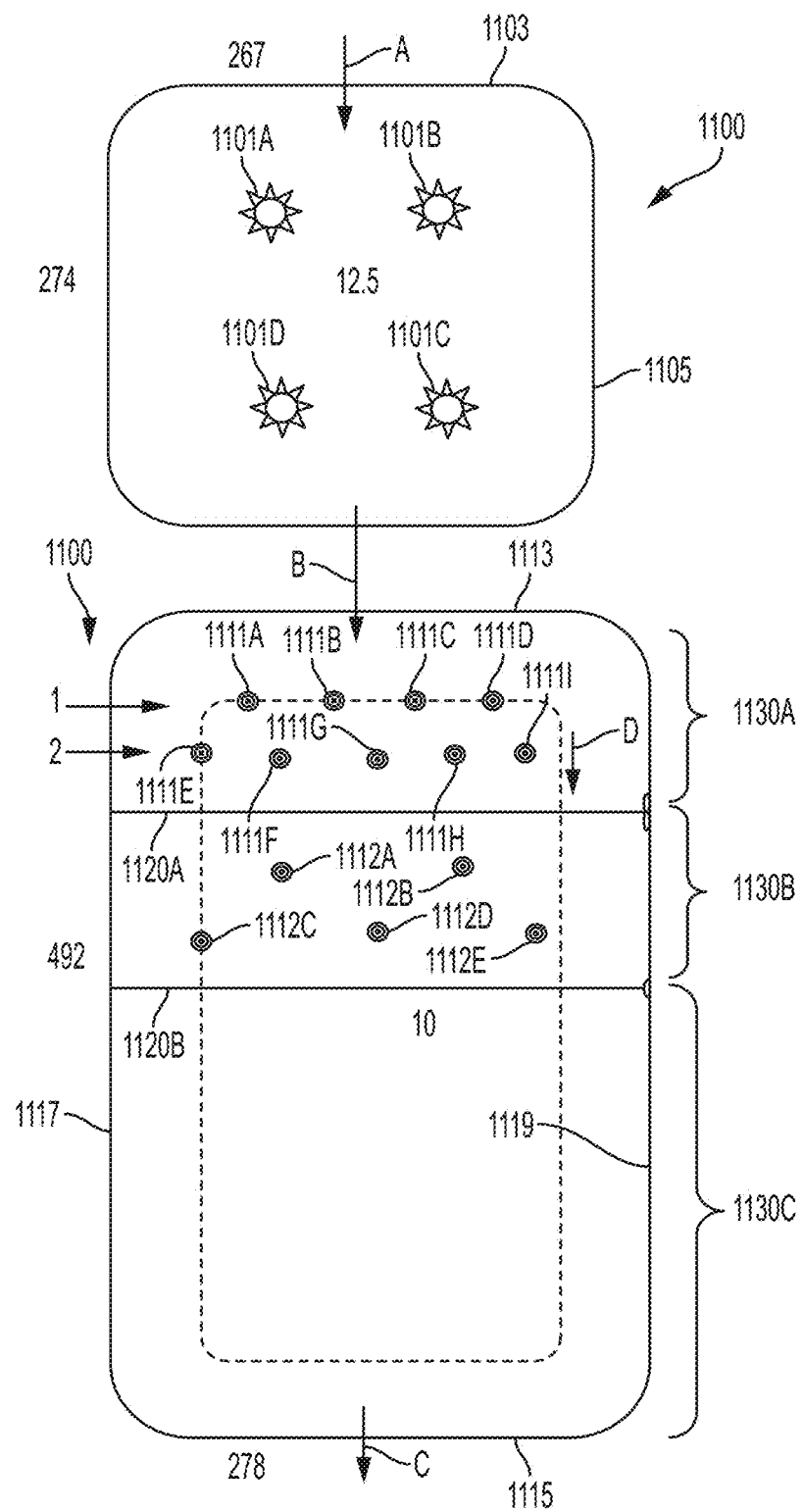
FIG. 11 illustrates a schematic plan view of arrangement of two lagoons according to an embodiment of the present disclosure.

Referring now to FIG. 11, an embodiment applied to first lagoon 1100 and second lagoon 1110 may be provided. In this embodiment, first lagoon 1100 includes conventional aerators 1101A, 1101B, 1011C and 1101D. First lagoon 1100 has an influent side 1103, at which influent (depicted by arrow "A") is received. In addition, first lagoon 1100 has an effluent side 1105, at which effluent (depicted by arrow "B") is output.

Still referring to FIG. 11, second lagoon 1110 has in influent side 1113 at which influent (depicted by arrow B) is received. In addition, second lagoon 1110 has an effluent side 1115, at which effluent (depicted by arrow "C") is output. Further, second lagoon 1110 is bounded by first berm 1117 (extending from influent side 1113 to effluent side 1115) and second berm 1119 (extending from influent side 1113 to effluent side 1115).

Further still, second lagoon 1110 includes first baffle 1120A and second baffle 1120B. The first baffle 1120A separates a first cell 1130A of the second lagoon 1110 from a second cell 1130B of the second lagoon 1110. The second baffle 1120B separates the second cell 1130B of the second lagoon 1110 from a third cell 1130C of the second lagoon 1110. In this embodiment, each of the first baffle 1120A and second baffle 1120B runs the width of the lagoon from the first berm 1117 to the second berm 1119. Further, in this embodiment, each of the first baffle 1120A and second baffle 1120B is a partial depth baffle (that is, each of the first baffle 1120A and second baffle 1120B extends from the surface of the water of the lagoon downward towards the bottom of the lagoon, without reaching the bottom of the lagoon). In one example, each baffle may extend downward, for example, 27 inches. However, the length of the baffle may vary, as long as the baffle effects the process, as described below. Each of the first baffle 1120A and second baffle 1120B may comprise a floating component, such as a plastic pipe, which extends from the first berm 1117 to the second berm 1119. In one specific example, the plastic pipe may be 3 inches in diameter. In another specific example, the baffles may be constructed from 22-foot lengths of pipe. In another specific example, the baffle is a reinforced UV resistant fabric with an upper stitched pocket and a lower stitched pocket. In this example, the upper pocket is filled with an airtight 3" diameter×22 ft length of polyethylene (PVC) pipe. In this example, the lower packet is filled with a 1" airtight PVC pipe filled with sand. The weighted 1" pipe serves to keep the partial depth baffle essentially vertical in the lagoon.

Further still, the first cell 1130A of the second lagoon 1110 includes water circulators 1111A, 1111B, 1111C, 1111D, 1111E, 1111F, 1111G, 1111H and 1111I. Each of these water circulators 1111A-1111I may be of a type described herein. In one specific example, each of these water circulators 1111A-1111I may be of the reciprocating flow type (including cavitation) shown in FIGS. 10A-10E. Further, the second cell 1130B of the second lagoon 1110 includes water circulators 1112A, 1112B, 1112C, 1112D and 1112E. Each of these water circulators 1112A-1112E may be of a type described herein. In one specific example, each of these water circulators 1112A-1112E are the reciprocating flow type (including cavitation) shown in FIGS. 10A-10E. Note that in this figure the distance between adjacent water circulators 1111A-1111H is 30 ft. The distance between adjacent water circulators 1112A-1112E in this figure is 60 ft. The difference is due to reduced BOD in second cell 1130B that requires longer detention time to consume the DO added in the water circulators of second cell 1130B.

Still referring to FIG. 11, the water circulators 1111A-1111I may be disposed in a plurality of linear rows, shown here as row "1" and row "2". While this FIG. 11 shows two rows, any desired number of rows (and/or any desired number of water circulators) may be utilized to obtain any desired operating capacity. Further, the dashed rectangle represents the interface between the flat bottom of the lagoon and the sides/berms. In addition, the numeral 10 refers to the depth (in feet) in this example and the other numerals (267, 274, 492 and 278) refer to length/width dimensions (in feet) of the lagoons in this example.

In operation, at least some of the outflow from water circulators 1111A-1111I moves downstream (in the direction of arrow D) and impinges upon the first baffle 1120A. At least some of the water impinging upon first baffle 1120A then bounces off of the first baffle 1120A and is redirected to the base of the water column. This movement of water puts biosolids (TSS)-containing water at the bottom of the water column. The first baffle 1120A (along with the first berm 1117, the second berm 1119 and the influent side 1113) may provide substantially 360 degree containment of the water circulators 1111A-1111I. Without wishing to be bound, the berm-to-berm, partial depth baffles 1120A and 1120B create artificial cells within pond 1110. Surface water is redirected down to the bottom of the water column by baffle 1120A (and later by baffle 1120B) where there are lagoon granules. The lagoon granules remove BOD anaerobically. This has the effect of creating vertical up/down plug flow. BOD is reduced and sludge is digested in situ.

Figure 12A:
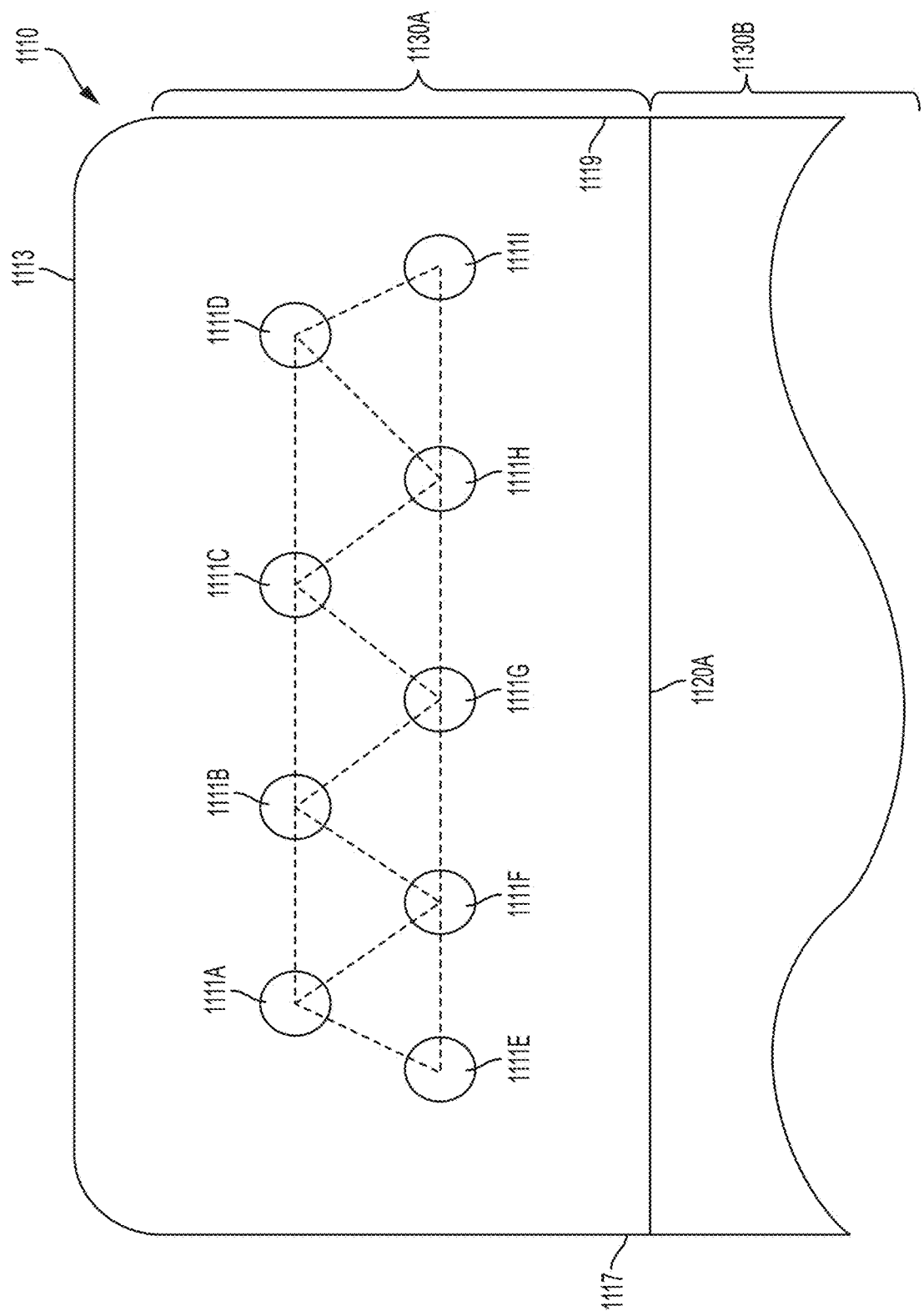
FIG. 12A illustrates a schematic plan view of arrangement of certain water circulators shown in FIG. 11.

Referring now to FIG. 12A, certain details relating to water circulators 1111A-1111I of FIG. 11 are shown (also shown in FIG. 12A are portions of second lagoon 1110 including influent side 1113, first berm 1117, second berm 1119 and first baffle 1120A).

As seen in FIG. 12A, clusters of three water circulators form equilateral triangle configurations. For example, water circulators 1111A, 1111E and 1111F comprise vertices that form a first equilateral triangle (see the dotted lines in the figure connecting these water circulators). Further, water circulators 1111A, 1111B and 1111F comprise vertices that form a second equilateral triangle (see the dotted lines in the figure connecting these water circulators). Further still, water circulators 1111B, 1111F and 1111G comprise vertices that form a third equilateral triangle (see the dotted lines in the figure connecting these water circulators). Of course, the remaining water circulators shown in FIG. 12A form similar equilateral triangles. In addition, it is noted that various equilateral triangles may be formed using a given water circulator more than one time (that is, a given water circulator may be shared by a plurality of clusters, in this case, triangles). In one specific example, the center-to-center distance between the water circulators in FIG. 12A (that is, the length of one of the sides of a given one of the equilateral triangles) is 30 feet. Skilled artisans recognize that equilateral triangles are geometrically equivalent to 3 circulators equidistant around an imaginary center. In other embodiments, water circulators in clusters may be in configurations other than equilateral triangles. For example, they may form any type of triangle, such as acute triangle, obtuse triangle or a right triangle. In other examples, they may form any other desired geometric shape.

Figure 12B:
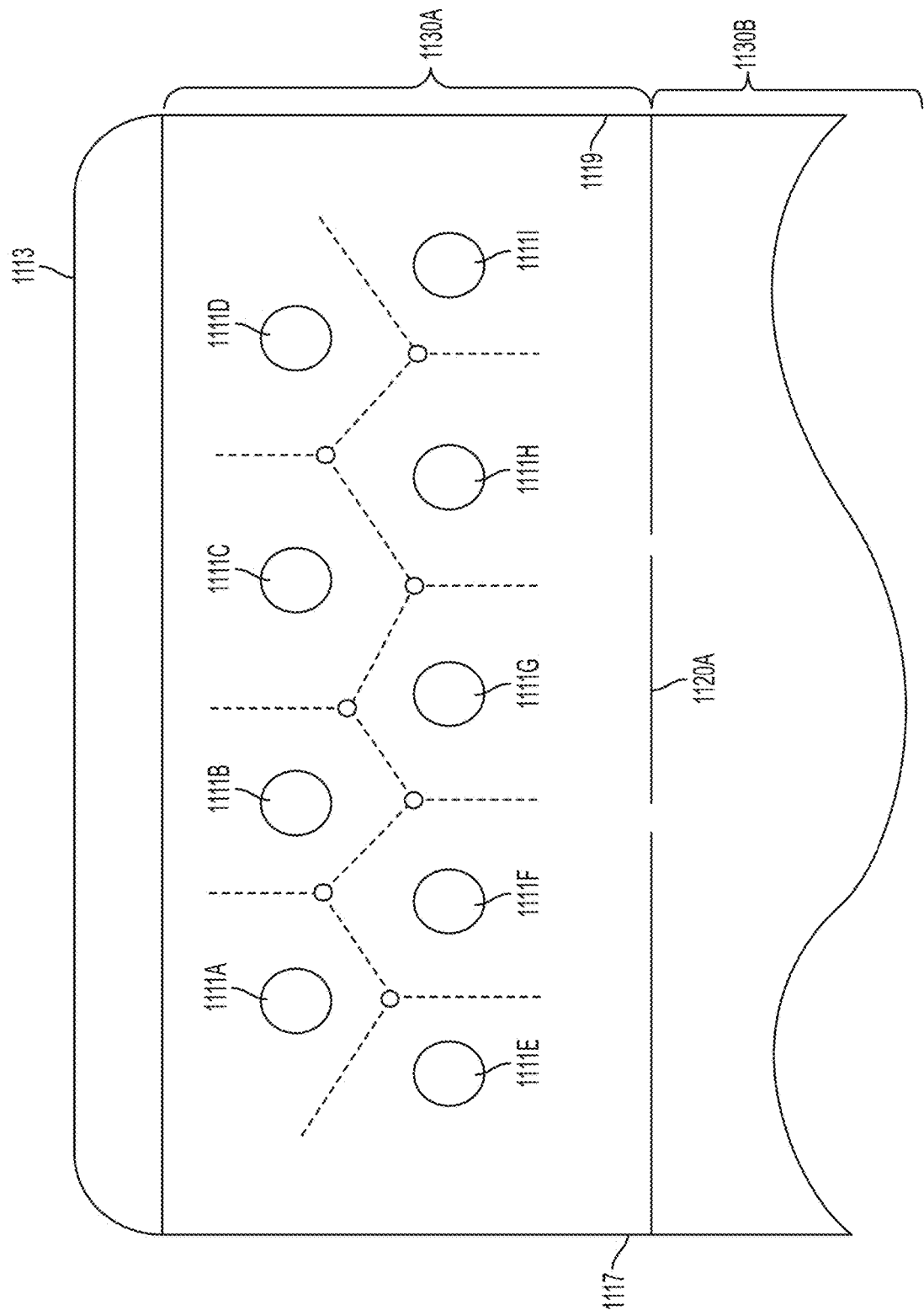
FIG. 12B illustrates a schematic plan view of arrangement of certain water circulators shown in FIG. 11.

Referring now to FIG. 12B, certain details relating to water circulators 1111A-1111I of FIG. 11 are shown (also shown in FIG. 12B are portions of second lagoon 1110 including influent side 1113, first berm 1117, second berm 1119 and first baffle 1120A).

As seen in FIG. 12B, in operation the water circulators 1111A-1111I form a number of hydraulic walls (shown in this FIG. 12B as dashed lines) and a number of hydraulic corners (shown in this FIG. 12B as dots where the dashed lines intersect). These hydraulic walls and hydraulic corners of the configuration shown in FIG. 12B may operate as described elsewhere herein.

Figure 13B:
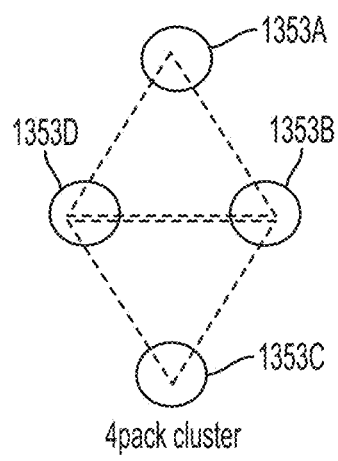
Figure 13C:
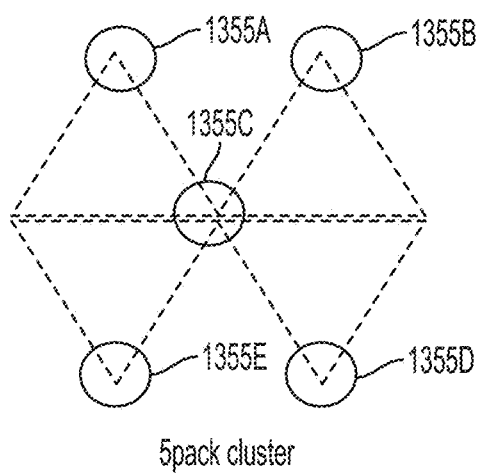
Figure 13D:
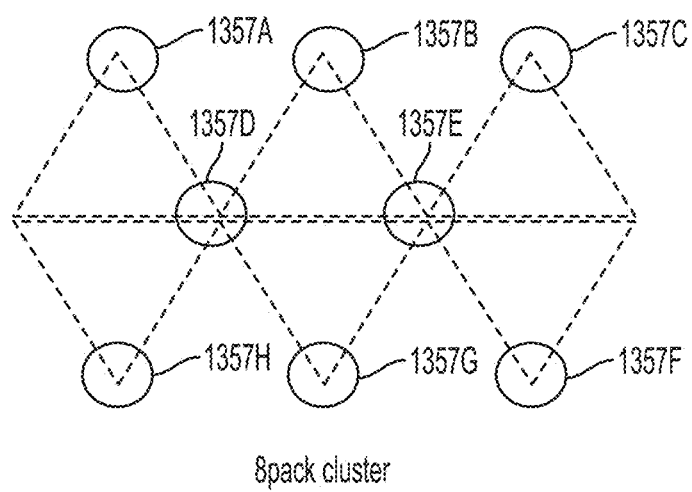

Referring now to FIGS. 13A-13D, illustrated are schematic plan views of various arrangements of water circulators according to embodiments of the present disclosure. More particularly, as seen, in FIG. 13A an equilateral triangle three-pack cluster may be formed of water circulators 1351A-1351C. As seen in FIG. 13B a double equilateral triangle four-pack cluster may be formed of water circulators 1353A-1353D. As further shown in FIG. 13C, a five-pack cluster may be formed of water circulators 1355A-1355E. As can be seen in FIG. 13D, an eight-pack cluster may be formed of water circulators 1357A-1357H.

Figure 14A:
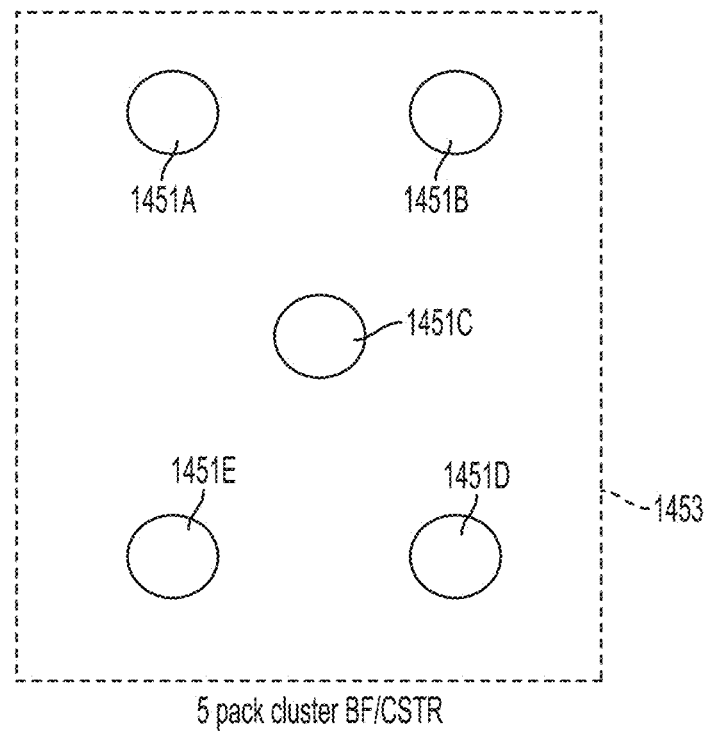

Referring now to FIG. 14A, illustrated is a schematic plan view of an arrangement of water circulators according to an embodiment of the present disclosure. More particularly, as seen, in FIG. 14A a five-pack cluster may be formed of water circulators 1451A-1451E. Further, baffle 1453 may provide substantially 360 degree containment of the water circulators 1451A-1451E. In this regard, baffle 1453 may be a closed shape that provides such substantially 360 degree containment without attaching to or connecting with any berm or side of the lagoon.

Figure 14B:
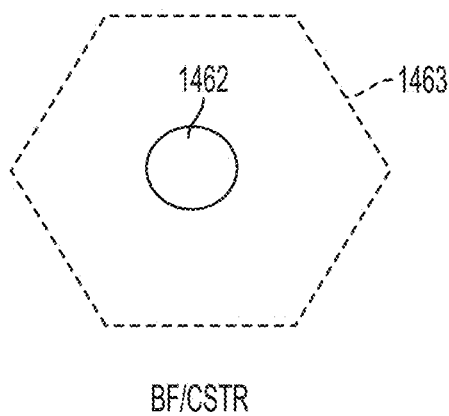

Referring now to FIG. 14B, illustrated is a schematic plan view of an arrangement of a water circulator according to an embodiment of the present disclosure. More particularly, as seen, in FIG. 14B, a single water circulator 1462 may be with baffle 1463, which may provide substantially 360 degree containment of the water circulator 1462. In this regard, baffle 1463 may be a closed shape that provides such substantially 360 degree containment without attaching to or connecting with any berm or side of the lagoon.

As described herein, biologically active granules are formed. It is these granules which help digest the sludge. The more of these granules that are formed, the faster the sludge is removed (digested) from the lagoon.

Without wishing to be bound, it is believed that the biochemistry of sludge digestion and the formation of the biologically active granules proceeds through the following steps.

Waste is converted into living and dead bacteria by aerobic bacteria, producing $CO_2$. This step is very different for different compounds present in the sludge, as specialized bacteria are needed for specialized compounds (i.e. industrial waste). Dead bacteria are hydrolyzed to simple liquids by extracellular enzymes from facultative bacteria and intracellular enzymes from cell lysing in the cavitation zone. This is a ubiquitous step, since all bacteria have similar element ratios. Facultative and anaerobic bacteria serially ferment simple liquids into acetic acid ($C_2$), which lowers the pH in the pond.

Obligate anaerobes convert $C_2$ into $C_1$ (methane and carbon dioxide). Acid is consumed, raising the pH in the pond. If the methanogens are part of a biofilm, $H_2$ production is also minimized. In the presence of Sulfur Reducing Bacteria (SRB), $H_2$ is converted to $H_2S$. When $H_2$ is not formed, SRB remain inactive, thus preventing production of $H_2S$.

The lagoon containing the sludge not only contains these bacteria, but also calcium and carbonate ions.

Without wishing to be bound, it is believed that cavitation described hereinabove creates such force that it causes the water molecules to break apart into free radicals, hydrogen free radical (.H) and hydroxyl free radical (.OH). It is also believed that the cavitation also causes mineral crystals to nucleate when the solution is supersaturated with calcium carbonate. When the pH initially is 7.5 or greater, the calcium ions react with carbonate anions and calcium carbonate seed crystals are formed. Once the seed crystals are formed, the pH of the lagoon water may vary to as low as 6.2 or as high as 10. Seeds (granule precursors) are discharged at the base of the water column. The seeds grow and propagate. As small seed crystals flow around in perimeter flow, the crystals grow in size and weight until they can precipitate into the anaerobic zone or alternatively are "shot" into the anaerobic zone during the 0.15 seconds when the flow reverses. Once in the anaerobic zone, the crystals are coated with a gas-forming anaerobic biofilm. As gas forms and occludes to the biofilm-coated crystal, the crystal floats into the facultative zone. Facultative bacteria attached to the biofilm. The facultative bacteria protect the biofilm by consuming toxic oxygen and feed the biofilm by converting solids serially into shorter and shorter fatty acids. C2 fatty acids (acetic acid) and $CO_2$ (C1) are the primary food of the gas-forming biofilm. The individual granules gradually agglomerate into large crystals that settle and do not fluidize. Immature granules can be fluidized; mature granules sink permanently. Eventually the granular fluidized bed is incorporates alluvial sludge and is physically higher in the water column than the gelled sludge. The alluvial sludge and immature granules are well mixed by produced gas. However, the gelled sludge is not.

With respect to the seeds being discharged at the base of the water column, in an embodiment, the seed outflow is initially at the surface until the seeds hit a hydraulic wall. Without wishing to be bound, it is believed that the hydraulic wall redirects flow down to the bottom. The path of least resistance is under the downward flowing hydraulic corners and thus at the base of the water column. When there is a hydraulic corner, the seeds are concentrated (e.g. in a 4-pack cluster from 4 different water circulators) and thus agglomerate into granules more easily.

Without wishing to be bound, it is believed that once the $CO_3^=$, indirectly produced by the granule, reacts with the $Ca^{++}$, thereby stabilizing the gel to form calcium: carboxylic acid ion pairs. The immediate gel collapses to become alluvial sludge (i.e. un-stabilized sludge). The process is iterative over time. The gel layer thins and the granule bed increases. The carbonate extracts $Ca^{++}$ from the sludge gel, destabilizing it. The resultant $CaCO_3$ is used to increase the size of the granules and form new granules. The bacteria bind the $CaCO_3$ to the granule with a bacteria-produced glue to increase the size of the granule.

It is believed, without wishing to be bound, that bacteria use the local $CaCO_3$ as a base on which they form a biopolymer that enlarges the granule. In addition, bacteria bond to other mineral salts, e.g. calcium phosphate and struvite, to form a biofilm which anchors to the granules. The colonizing bacteria form a synergistic biofilm on the heavy mineral. The mineral salts selected for use as granules encourages biofilm formation. The inner bacteria are obligate anaerobes, e.g. Geobacter and Methanosaeta. The outer bacteria are facultative bacteria that hydrolyze bio-solids into bio-liquids. The inner bacteria convert bio-liquids into gas and consume acid, raising pH. The obligate anaerobes in the interior utilize bio-liquids (hydrocarbons) to produce $C_1$ (methane) and/or carbon dioxide gases. A superficial coating of facultative bacteria consumes trace oxygen and extracellular and intracellular enzymes convert biosolids (sludge) into liquid BOD. The facultative granule's exterior hydrolyzes the castings into liquids while the interior converts liquids sequentially into gas and consumes acid. The free radicals and intense jets of hot water (from cavitation bubble collapse) described hereinabove attack the bacterial cell wall and lyse it, releasing intracellular enzymes. Intracellular enzymes are also released by cavitation. The combination of the extracellular enzymes and the intracellular enzymes and intracellular enzymes released by free radicals digest the sludge. It is well accepted that bacterial activity shows a first order response by slowing when temperatures drop. For example, ammonia oxidation is well known to have a strong dependency with temperature. The nitrification bacteria responsible for ammonia oxidation are inactive at temperatures below 5° C. The reduction in biochemical oxygen demand (BOD) is independent of ambient temperature when an aerobic vertical surface is combined with horizontal anaerobic granules. BOD is the amount of dissolved oxygen needed by aerobic biological organisms in a body of water to break down organic matter at a specific temperature over a defined period of time.

The area of the lagoon outside the baffle is quiescent and forms layers based on density differences. The top layer is aerobic; the bottom layer is anaerobic; the middle layer is facultative. Gas-producing granules settle at the facultative/anaerobic interface. Once the granules have propagated over the flat portion of the lagoon, gas is visible across the water surface above the flat. At the aerobic/facultative interface, bubbles cavitate violently as surface tension changes more than 20%. Intact cells precipitate through the aerobic zone. Cavitating bubbles chemically and physically lyse the intact cells in the interface. Internal fluids are released. COD increases ten-fold in the facultative zone versus the aerobic zone.

The alluvial sludge is digested in situ. The granules are dense enough to sink through the alluvial sludge, but they do not penetrate the gel-structured recalcitrant sludge. The alluvial sludge is digested, leaving entering solids and recalcitrant sludge to be digested. The new sludge (i.e. incoming solids, aerobic produced biosolids and fresh worm castings) is alluvial because new biosolids rain down from the quiescent zone above without yet forming a new gel. The granules have capacity to handle this load.

Recalcitrant sludge is difficult to digest because the granules are in intimate contact only on the substantially spherical granule's contact surface area with substantially flat recalcitrant sludge's gelled structure. Only the granule's lower surface, in direct contact with recalcitrant sludge, has the opportunity to digest. Thus, recalcitrant sludge is digested slowly.

Without wishing to be bound, for a more detailed explanation of the biochemistry of how the granules break down the sludge, reference is made to the Appendix. Thus, without wishing to be bound, it is believed that waste treatment has 4 steps: 1. Oxygen addition makes solids and $CO_2$ gas; 2. Enzymes hydrolyze solids into simple, soluble liquids; 3. Acid formers make serially shorter acids; 4. Acid consumers convert short acids into gas.

In a natural pond, Step 1 conversion of soluble BOD to solids is usually rate limiting because natural ponds are clean. That is there is little to convert to gas.

In a waste treatment pond, Step 2 is rate limiting (that is why solids accumulate).

In the present disclosure, there are two separate rate-limiting steps. Step 1 is rate limiting because the incoming BOD is removed from the lagoon effluent and solids do not accumulate (i.e. solids are digested in situ). By making excess granules, all the acid formed is consumed; the pH is stable (~6.5) and there is no odor (no VFA (volatile fatty acid) and no $H_2S$).

In the present disclosure: 1. The cluster(s) and the hydraulic corners create excess enzymes (the cavitation lyses bacterial solids releasing their intracellular enzymes). 2 The enzymes hydrolyze BOTH the incoming solids and the pre-existing solids inventory. 3 Granules grow on the seeds made during cavitation up to the food available (incoming solids+inventory solids). 4. Thus, excess granules are made during inventory removal (excess only after the pre-existing inventory is digested). 5. Once the inventory is gone, the available substrate is only incoming solids. 6. The granules have too little food and thus cannot be rate limiting.

In an embodiment, the absence of outboard hydraulic walls (that is, the absence of hydraulic walls in areas outside of the circle) has the unexpected result of controlling trace odors. There is continuous wave activity. This creates a situation where suspended solids are acted on by gravity and friction. Gravity pulls all solids down. During the half wave cycle when the wave is rising, there is a down friction force on the particle. The net force is to pull particles to the wave/no-wave interface, leaving a substantially clear or "sweet" layer on the surface that is virtually solids free.

In an embodiment, the "sweet" layer extends down from the surface of the water at least 6 inches. In an embodiment, the above mentioned wave activity is from the falling reciprocating flow water circulators. In an embodiment, the activity of the falling reciprocating flow water circulators increases the depth of the "sweet" layer.

Thus, in an embodiment, the continuous wave formation outboard of the cluster has the surprising effect of controlling lagoon odor by creating an aerated, solids-free "sweet" layer cap over the entire lagoon. The continuous wave motion also inhibits cyanobacteria growth (blue green algae). Cyanobacteria are disrupted by continuous waves and do not bloom. When cyanobacteria bloom, they consume alkalinity and the pH often rises above permit limits (>9). Thus the absence of outboard hydraulic walls indirectly controls effluent pH by preventing cyanobacteria blooms.

Each cavitating water circulator lyses bacteria and algae. It may be difficult to calculate the degree of this lysing as it is dependent on the cavitation, the moles of bacteria and the moles of algae. To develop a measure for design, the ratio of the circulator flow (# of circulators*flow per circulator) divided by the influent flow is a useful dimensionless ratio. In an embodiment, a dimensionless ratio of the flow rate of the reciprocating water circulator per influent gallons per day ranges from 2 to 15, while in another embodiment, it ranges from 3 to 11, while in another embodiment, it ranges from 4 to 9. In a specific example, a ratio with respect to flow rate is 1 reciprocating BF water circulator/0.3 Million Gallons Per Day=6.7 [6.7=1 circulator*2MGD per circulator/.3MGD influent].

Table 1 below provides examples of ratios.

TABLE 1

| # of circulators | Flow per circulator MGD | influent flow MGD | RATIO |
| --- | --- | --- | --- |
| 1 | 2 | 0.3 | 6.7 |
| 3 | 2 | 0.7 | 8.6 |
| 4 | 2 | 1 | 8.0 |
| 1 | 2 | 0.6 | 3.3 |
| 1 | 2 | 0.5 | 4.0 |
| 2 | 2 | 0.8 | 5.0 |
| 4 | 2 | 0.8 | 10.0 |

These granules are concentrated in the center of the circle of the circulators, making the granules more concentrated in one area, thereby making the sludge digestion more effective by mechanically breaking through the recalcitrant gel. Once gas is produced below the gel, the rising produced gas destabilizes the gel, making it alluvial. As the destabilization expands from the hydraulic corners, the recalcitrant gel breaks down and is readily digested.

In one specific example, the lagoon is at least four feet deep (with an anaerobic bottom and with essentially no limit on the maximum depth). In another specific example, the lagoon is at least seven feet deep (with an anaerobic bottom and with essentially no limit on the maximum depth).

In another example, lagoon granule productivity is surprisingly increased by forming "hot spots" of high concentration of reagents. When there are hot spots, there is more lagoon granule initiation. When there is more initiation, there is more lagoon granule proliferation. When there is more proliferation, there is more hydrolysis. When there is more hydrolysis, more intracellular enzymes are released (from lysed dead bacteria). When more intracellular enzymes are released, more biosolids are turned into simple liquids. When there are more simple liquids, more gas is formed. When more gas is formed, more simple liquids are pulled into lagoon granules. Sludge digestion accelerates.

In another example, provided is a mechanism to make granules in an aerobic environment (cavitation is aerobic) and then have them work in an unmixed anaerobic environment (anaerobic granules are well known and known to digest sludge when the granules are well mixed). In one specific example, the conditions are aerobic (making nitrite), but the granules are anaerobic and digest sludge (in this example, ammonia in supernatant from sludge digestion increased from 0.25 mg/l to 35 mg/l).

In another example, there are two $CaCO_3$ formation strategies: The first is pH>7.5 to initiate granule formation (this may only need to happen once). The second reaction takes place at the produced gas/supernatant interface where $CaCO_3$ can be made at a pH less than the above pH wherein $CO_2$ gas reacts with calcium and ammonia becomes ammonium in the bubble-surrounding water (e.g. pH=6.5).

As described herein, in various examples lagoon granules: (1) are biologically active; (2) produce $CH_4$, $CO_2$ and $H_2O$ (not $H_2S$); (3) self initiate and self propagate.

Further, as described herein, in various examples disclosed mechanisms: (1) operate best at cold temperatures (e.g., T<25° C.); (2) provide reciprocating flow past a constantly turning impeller; (3) use water having a pH greater than or equal to 7.5 one time only; (4) provide small granules (immature) that are fluidized (mature granules are not fluidized); (5) provide granules that do not wash out, but can cement-in in high calcium/high pH environments; (6) provide granules that are in reduced surface tension hydrolytic brine. Hydrolytic brine is a dense viscous fluid that forms at the base of the water column as BOD is converted into gas. A fraction of an intact cell is electrolytes. As the carbon leaves as gas, electrolytes accumulate, creating hydrolytic brine.

FIGS. 15-18 and 23 are presented to illustrate, without wishing to be bound, the biochemistry that is believed to be occurring in the embodiments described hereinabove when a baffle is used.

Without wishing to be bound it is believed that the hydraulic wall redirects the pathway of the expelled water as described here. The low resistance flow pathway is at the bottom of the water column just above the sludge blanket. Once outside the hydraulic wall, density differences cause the water to stratify into layers of differing density. Legacy sludge (pre-existing) is at the bottom. Clear water is at the top. There is an aerobic zone just below the clear layer where dissolved oxygen comes diurnally from microalgae. Just above the legacy sludge is a layer of mature granules, i.e. granules that are substantially spherical. They produce gas. Produced gas occludes to immature granules, i.e. granules that are not yet substantially spherical. The occluded gas carries immature granules to the aerobic/facultative interface. At the interface, differences in surface tension cause the bubbles to oscillate and strip occluded gas. Gas-stripped immature granules fall back to the bottom. The up and down motion creates a gently mixed zone the quiescent zone where substrate and immature granules are mixed. Meanwhile, suspended solids in the aerobic zone sink to the interface. The interface is violently mixed by oscillating bubbles (caused by changing surface tension in the interface.) Intact bacterial cells are ruptured, releasing their internal fluids.

Figure 2A:
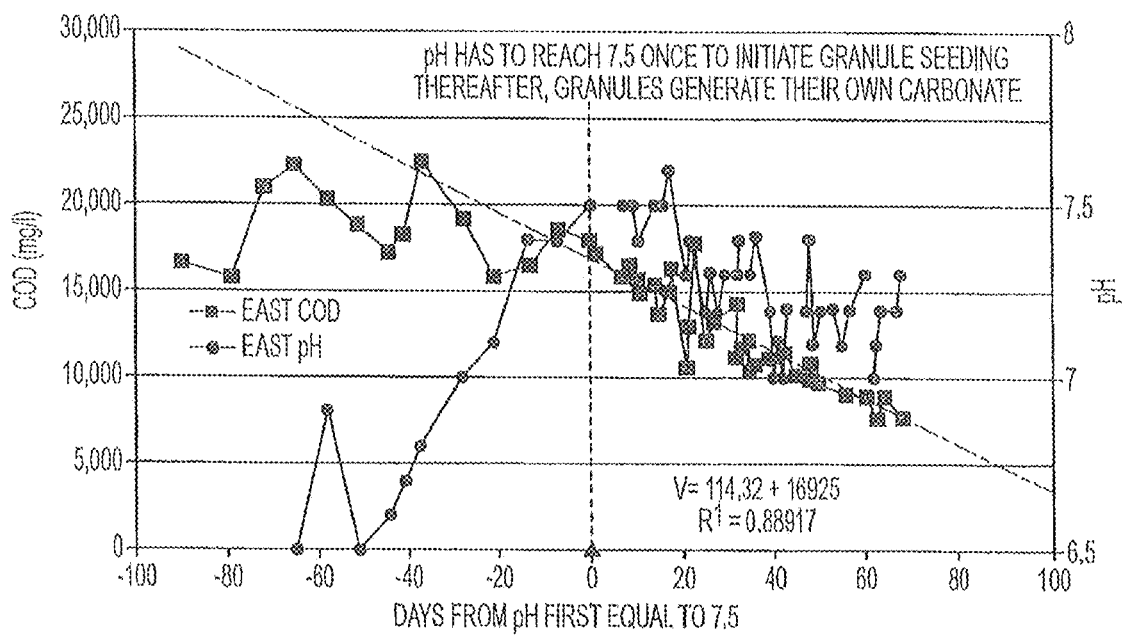
FIG. 2A illustrates a graph showing a change in chemical oxygen demand and pH in a waste pool.
Figure 2B:
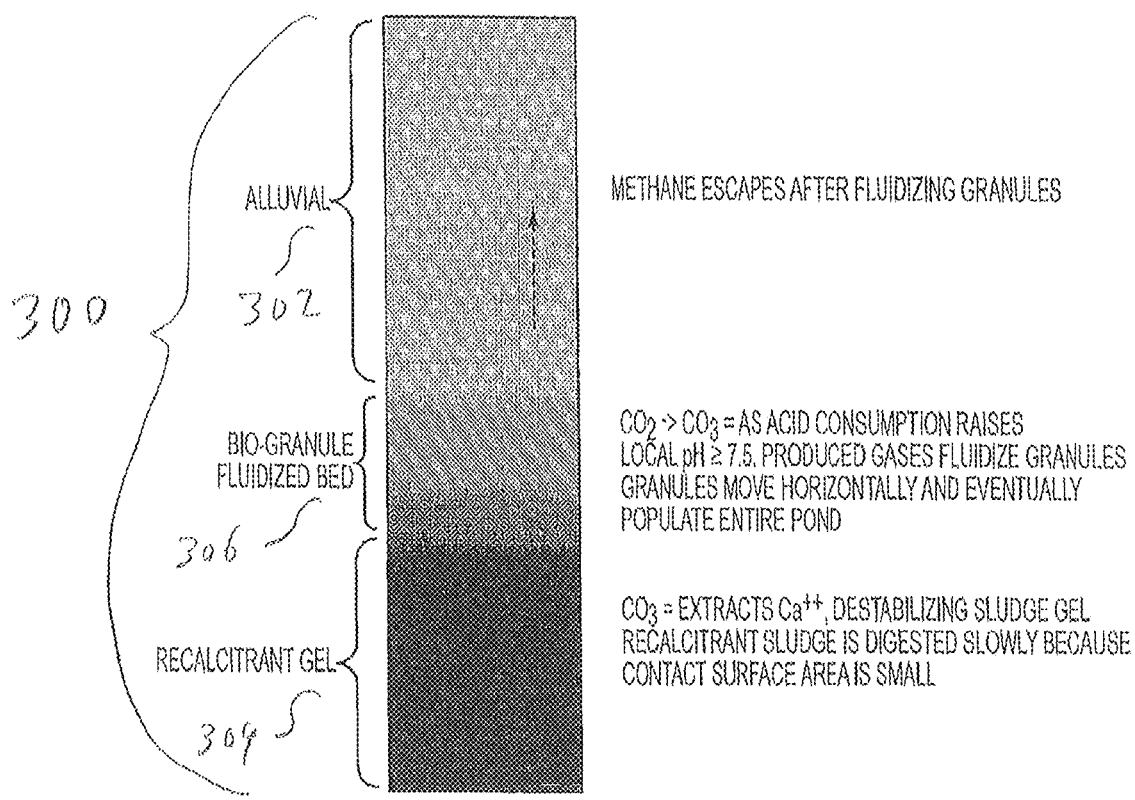
FIG. 2B illustrates a cross-sectional representation of the water column in a waste treatment pond.

Referring now to FIG. 2A, which relates to use of a water circulator (see also, U.S. Patent Application Publication No. 2014/0319054), the vertical line at zero days is the first day in which the pH=7.5. Prior to this date, the chemical oxygen demand (COD) was random; after this date, COD declined linearly. Colonizing bacteria that form the gas-forming biofilm populate the granules, once formed. The acid-consuming granule then creates $CO_3^=$ anions locally to allow granules to grow. The small granules are fluidized by produced gas and colonize the bottom of the entire pond. The large granules locate on sludge that is not easily broken up (i.e., recalcitrant sludge) and slowly digest it.

Figure 23:
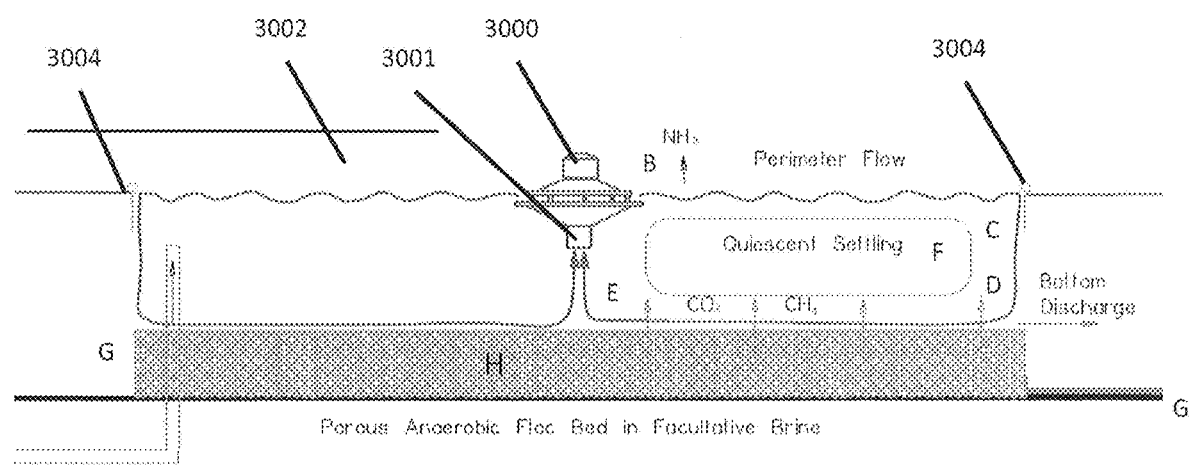
FIG. 23 is a cross sectional view of a cavitating circulator illustrating perimeter flow.

Without wishing to be bound and referring to FIG. 23, there is a quiescent or gently mixed aerated zone (2301) (DO>1 mg/l) where SBOD is converted into TSS. TSS settles 2302 (downward arrows). The surface tension of this water is close to pure water. (For example in one embodiment: 69.17 mN/m (pure water is 72 mN/m)).

The dots (2303) represent the gas-forming mature granules that are biologically active but do not fluidize. The upward arrows (2304) show the rising gas. The low surface tension zone (2305) is a facultative fluidized zone where immature granules are pulled up by occluded produced gas until the gas is released at the aerobic/facultative interface (high surface tension/low surface tension) and the immature granules fall. The surface tension of the fluidized bed is low, 44.98 mN/m in one embodiment (FIG. 12A embodiment). The reason surface tension is low is facultative bacteria convert solids first into long chain fatty acids (soap) before serially shortening long chain acids into C2 (acetic acid).

The interface between high and low surface tension (2306) is shown in FIG. 23. In an embodiment, it is about 3 inches thick. Internal bubble pressure is directly proportional to surface tension. Thus the upper part of the interface has small volume, high-pressure bubbles. The lower part of the interface has large volume, low-pressure bubbles. As an individual bubble transitions through large bubble/low surface tension and then into small bubble/high surface tension water, it is believed that the bubble geometry is inherently unstable (big on the bottom, small on top). This imbalance causes each bubble to cavitate as the big becomes small and small becomes big and then the process repeats until the cavitating bubble finally escapes the interface.

As TSS rains down from above, each intact bacterial cell is torn apart by the cavitating bubbles, reducing solids mass as internal water is released. For example, about 80% of the cell mass is water, 18% is substrate (sugars, enzymes, electrolytes, etc.) and 2% is non-digestible ash. The released digestive enzymes accelerate biological hydrolysis in the fluidized bed. For perspective in an embodiment, the COD in the high surface tension aerobic zone is 254 mg/l; the COD in the low surface tension facultative zone is 40,000 mg/l. This large swing in 3" of vertical travel is unheard of in a quiescent water column.

There is a critical mass of cell lysing that has to occur to insure that solids mass hydrolysis is greater than solids mass accumulation. Gas from a critical mass of granules provides sufficient gas to lyse virtually all the intact cells that rain down through the low/high surface tension interface. Legacy (ancient) sludge is gradually converted into gas at the sludge/mature-granule interface. The default position is sludge accumulates because there is insufficient hydrolysis.

Figure 15:
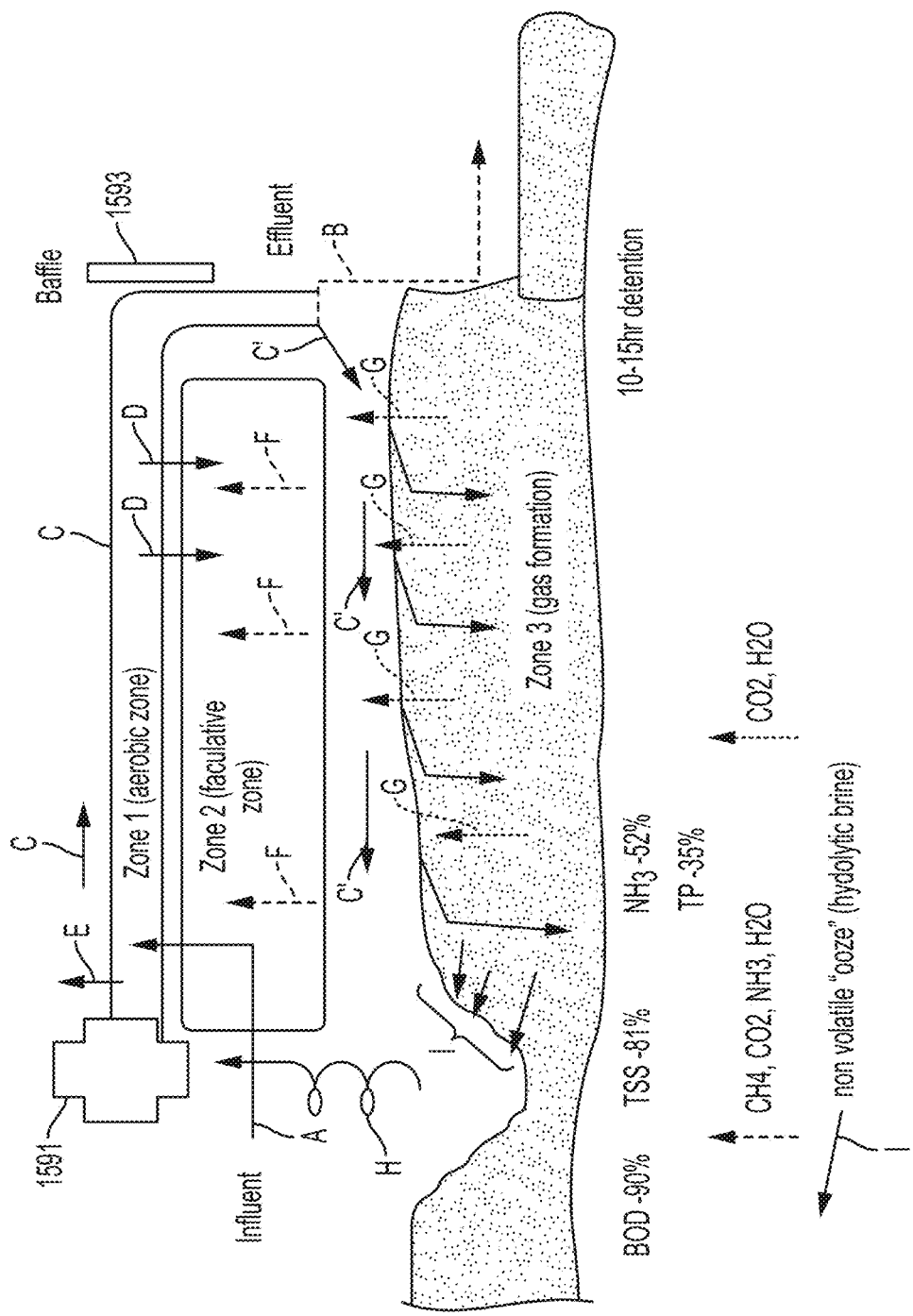
FIG. 15 illustrates a cross-section of a portion of a lagoon according to an embodiment of the present disclosure.

Referring now to FIG. 15, a cross-section of a portion of a lagoon including cavitating water circulator 1591 and baffle 1593 according to an embodiment of the present disclosure is shown (this FIG. 15 is provided to aid in discussing an example of water movement and processing). As seen in this FIG. 15, Zone 1 (aerobic zone) has flow out "C" and down "C". Further, the flow splits with a portion (see "B") out of the cell as effluent and with a portion (see C') across face of the bed (down and to the left) C' essentially equals C minus B.

Further still, the aerobic zone depicted (Zone 1) is, in this embodiment, 1 ft deep (e.g., DO=6.49 mg/l @ 1 ft) as DO migrates down after impacting baffle 1593 and DO is consumed. In Zone 2 (anaerobic zone), the ORP=−431.4 mV (highly anaerobic). Further still, produced solids comprising the aforementioned granules settle into Zone 2 (see "D"). A low pressure point is produced at the bottom of "H".

Water is brought up by "H" from the low pressure point. In addition, an amount of influent (see "A") is essentially equal to the amount of effluent (see "B").

Still referring to FIG. 15, Zone 2 (facultative zone or quiescent zone) is gently mixed by rising gas and falling liquids (not by water circulator 1591 pumping action). Further, Zone 2 is anaerobic (e.g., −431.4 mv @ 2 ft) but rich in enzymes from cell lysing during cavitation. Further still, produced solids from Zone 1 are hydrolyzed. In addition, serial shortening of simple soluble compounds after hydrolysis (to acetic acid) releases $CO_2$ (see "F"). During this process the pH rises from 6.5 to 7.4.

Still referring to FIG. 15, particles build up inside the BF/CSTR (that is, inside the area contained by the baffle 1593) via centrifugal separation (right angle turn). Moreover, return water flows across the bed face. Some water is pulled down into the bed by granules' breathing (filter feeders). In addition, non volatile ionic compounds accumulate (e.g., the cations being Ca++ (15,900 mg/l), $NH_4^+$ (5,320 mg/l), Total Phosphate (5,000 mg/l)) and volatile compounds (see "G") leave as gas bubbles. In this regard, BOD is converted into $CH_4$, $CO_2$, $NH_3$ & $H_2O$ leaving small residual BOD (27 mg/l, a 90% reduction in BOD). There is no measurable facultative zone because this embodiment as at the beginning of the process where mixing is high (not quiescent).

Still referring to FIG. 15, water outflows radially in Zone 1 from Circulator 1591 to the baffle 1593, where it is redirected and pulled directly back to the circulator 1591 inlet. The recirculating flow is high surface tension. Tiny crystals formed in the circulator cavitation 1599 recirculate until they grow large enough to precipitate.

Radial outflow continues, for example, for about 6 seconds (in an embodiment 5.85 seconds) and then a non-swirling pulse of liquid 1598 shoots down towards the anaerobic zone, Zone 3. Entrained crystals transfer out of the recirculating perimeter flow fluid 1597 during this pulse of, for example, 6 seconds, and penetrate the anaerobic zone (like a cannonball). Once in the anaerobic zone, the crystal is coated with a gas-forming anaerobic biofilm.

Gas is produced in the anaerobic zone. Produced gas occludes to the immature granule, lifting it out of the anaerobic zone into the facultative, fluidized zone 1597. Facultative bacteria grow all around the biofilm coated seed crystal.

As the immature granule with low surface tension rises towards the recirculating aerobic perimeter flow, the interface between high and low surface tension causes bubbles to strip from the immature granule and cavitate. Intact cells are lysed by the cavitation.

Finally, outflow (0.18MGD max) begins 1596 at the sludge blanket/fluidized bed interface.

Still referring to FIG. 15, it is seen that the configuration discussed above provides for a non-homogeneous lagoon having three distinct stratification layers. In addition, in the configuration shown in FIG. 15, water is allowed to escape only from the bottom of the water column (i.e. below the bottom of the baffle).

Figure 16:
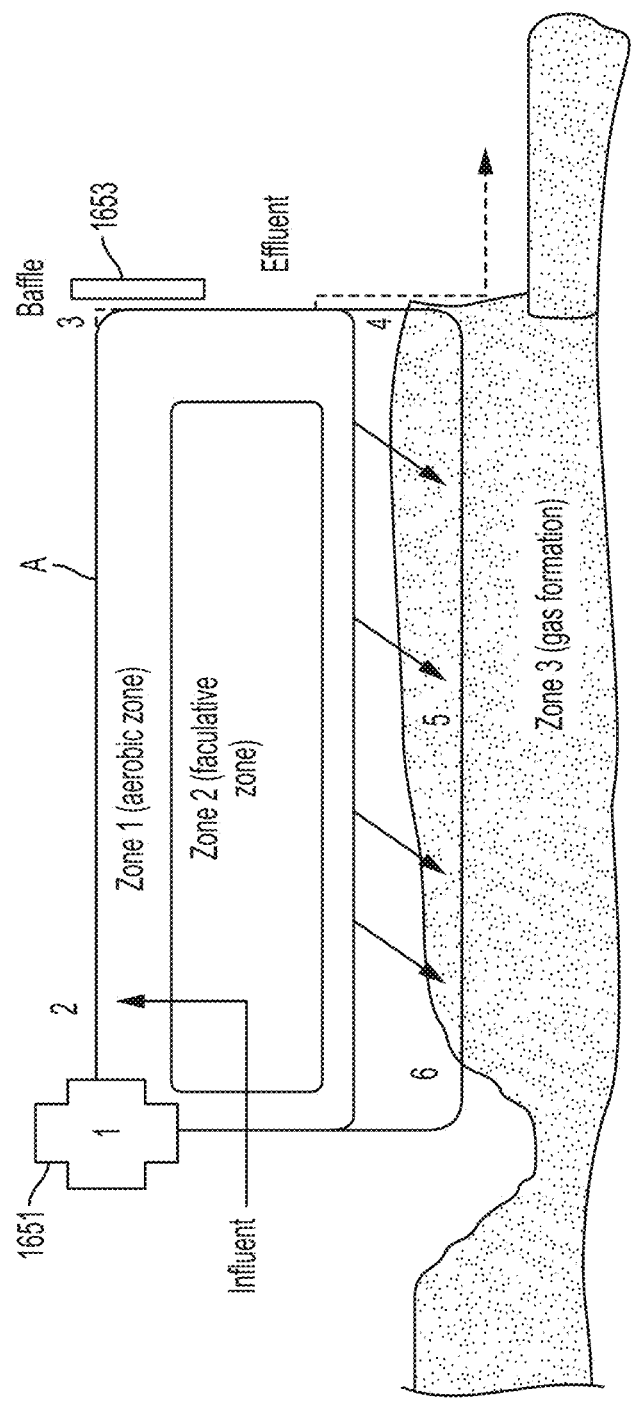
FIG. 16 illustrates a cross-section of a portion of a lagoon according to an embodiment of the present disclosure.

Referring now to FIG. 16, a cross-section of a portion of a lagoon including water circulator 1651 and baffle 1653 according to an embodiment of the present disclosure is shown (FIG. 16 is provided to aid in discussing an example of water movement and processing). As seen in FIG. 16 (which is similar to FIG. 15), the flow pattern through the BF/CSTR is "perimeter flow" (see "A") that encircles a strongly anaerobic center (zone 2).

Still referring to FIG. 16, there are six distinct areas as the perimeter flow completes the circuit. One of these areas is the cavitation area (see "1"). In this area flow reverses, for example, every 6 seconds (0.15 seconds down; 5.85 seconds out and back, net 2MGD up and out). In addition, fat is hydrolyzed into soap and surface tension is ~20% lower than pure water. Without wishing to be bound, as discussed hereinabove, it is believed that cavitation and varying surface tension lyse cells, releasing internal fluids.

Still referring to FIG. 16, area 3 is the high DO zone. Here DO is, for example, ~6.5 mg/l. In this area, it is believed, without wishing to be bound, that internal enzymes are partially oxidized, increasing the rate of hydrolysis of solids into simple liquids. In this area eddies re-entrain microbubbles as surface outflow thins; outflow depth is, for example, ⅜" thick; water is redirected down by baffle; and a hydraulic wall is formed.

Still referring to FIG. 16, between areas 3 and 4 is where air bubbles escape. Water becomes anaerobic (e.g., −448.1 mv); water flows down (air microbubbles float up and out); BOD absorbs dissolved DO; and effluent leaves BF/CSTR below hydraulic wall (FIG. 15, flow 3).

Still referring to FIG. 16, area 5 is where granules, initially created by $CaCO_3$ seeds that formed granules described before and by gas/liquid propagation, pull dirty water into each granule. Here carbon is converted into gas ($CH_4$, $CO_2$); non-volatiles accumulate as hydrolytic brine (e.g. Ca++=15,900 mg/l); free ammonia is reduced by increased salinity (e.g., pH=6.5; T>10° C. (warmer than surface)); Total Dissolved Solids (as dissolved NaCl)=1,410 mg/l); cell internal fluids are extracted by osmosis from low internal salinity to high external salinity, feeding granules; and 90%/o of BOD, for example, is turned into gas.

Still referring to FIG. 16, area 6 is where high salinity diffuses out of bed into influent swirl. The brine concentration stabilizes. Here the swirl centrifugally separates out produced solids, adding to the porous bed; the swirl scours a valley below the water circulator identified as BF 1651 via mechanical action; the cycle repeats; and the bed depth stabilizes.

Figure 17A:
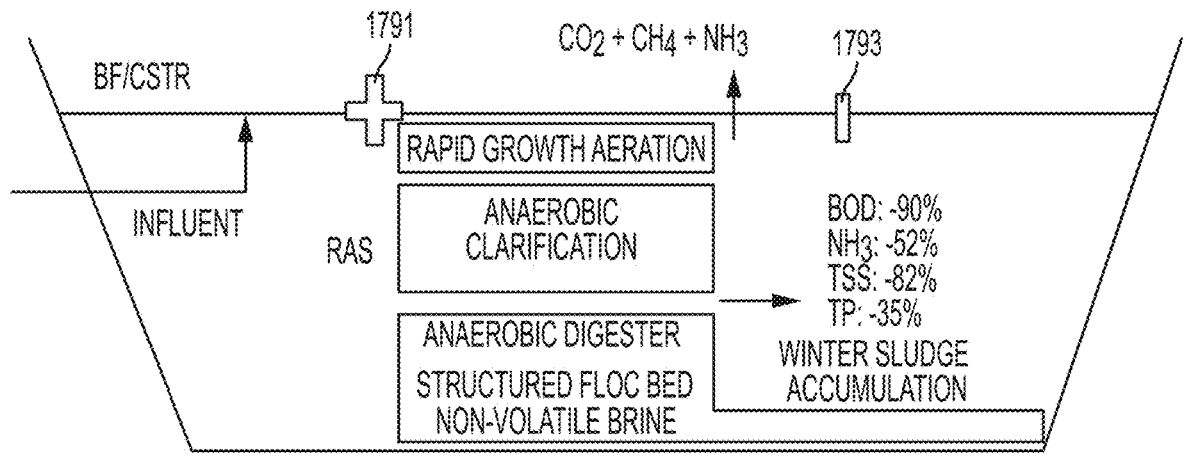
FIGS. 17A, 17B and 17C illustrate views of a lagoon according to an embodiment of the present disclosure.
Figure 17B:
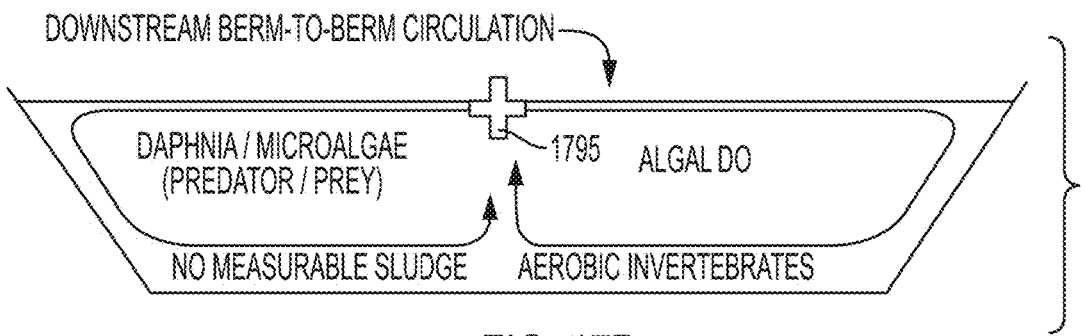
Figure 17C:
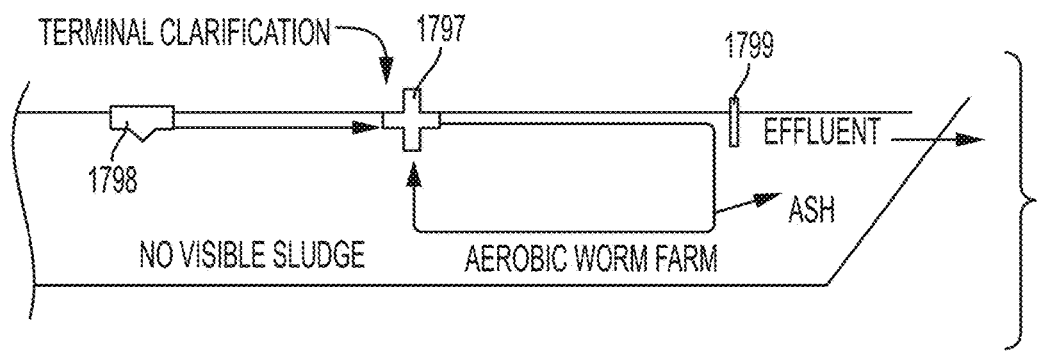

Referring now to FIGS. 17A, 17B and 17C illustrated are views of a lagoon according to an embodiment of the present disclosure. More particularly, FIG. 17A shows a cross-section of the lagoon at an upstream end (the cross-section of this FIG. 17A is shown with the most upstream end on the left with a downstream end being on the right). FIG. 17B shows a cross-section of the lagoon downstream of the rightmost portion of FIG. 17A (the cross-section of this FIG. 17B is shown with one lateral berm on the left and another lateral berm on the right). The lagoon, in FIG. 17B, has an aerobic bottom, such as in a natural lake. FIG. 17C shows a cross-section of the lagoon with an aerobic bottom, such as a natural lake, at a downstream end (the cross-section of this FIG. 17C is shown with the most upstream end on the left with a downstream end being on the right).

As seen in FIG. 17A, the lagoon includes water circulator 1791 (which may be a BF circulator operating in cavitation mode) and baffle 1793. Operation of the water circulator 1791 and baffle 1793 causes stratification as shown in FIG. 17A.

As seen in FIG. 17B, the lagoon, in this case, a natural lake with an aerobic bottom, includes water circulator 1795 (which may be a BF circulator operating in mix mode). Operation of the water circulator 1795 causes circulation as shown in FIG. 17B. Of note, the *Daphnia*, as defined herein, may be anything that prays on microalgae, such as zooplankton. Of further note, the aerobic invertebrates may be detritivores (that is, they consume dead bacteria and dead algae). Of further note, the algal DO refers to dissolved oxygen produced by algae.

As seen in FIG. 17C, the lagoon includes water circulator 1797 (which may be a GF circulator), baffle 1799 and water pump 1798 (which may be, for example, a 10 HP pump). Operation of the water pump 1798, the water circulator 1797 and the baffle 1799 causes water flow as shown in FIG. 17C. Of note, the ash may be primarily from worms. Of further note, the baffle 1799 may serve to protect the effluent physical structure from floating solids.

Still referring to FIGS. 17A-17C, it is noted that the system may be operated 24 hours a day, seven days a week. Further, it is noted that the configuration may be repeated for multiple lagoons (e.g., 50% improvement in free ammonia in lagoon one, another 50% improvement in free ammonia in lagoon two, etc.).

Figure 18:
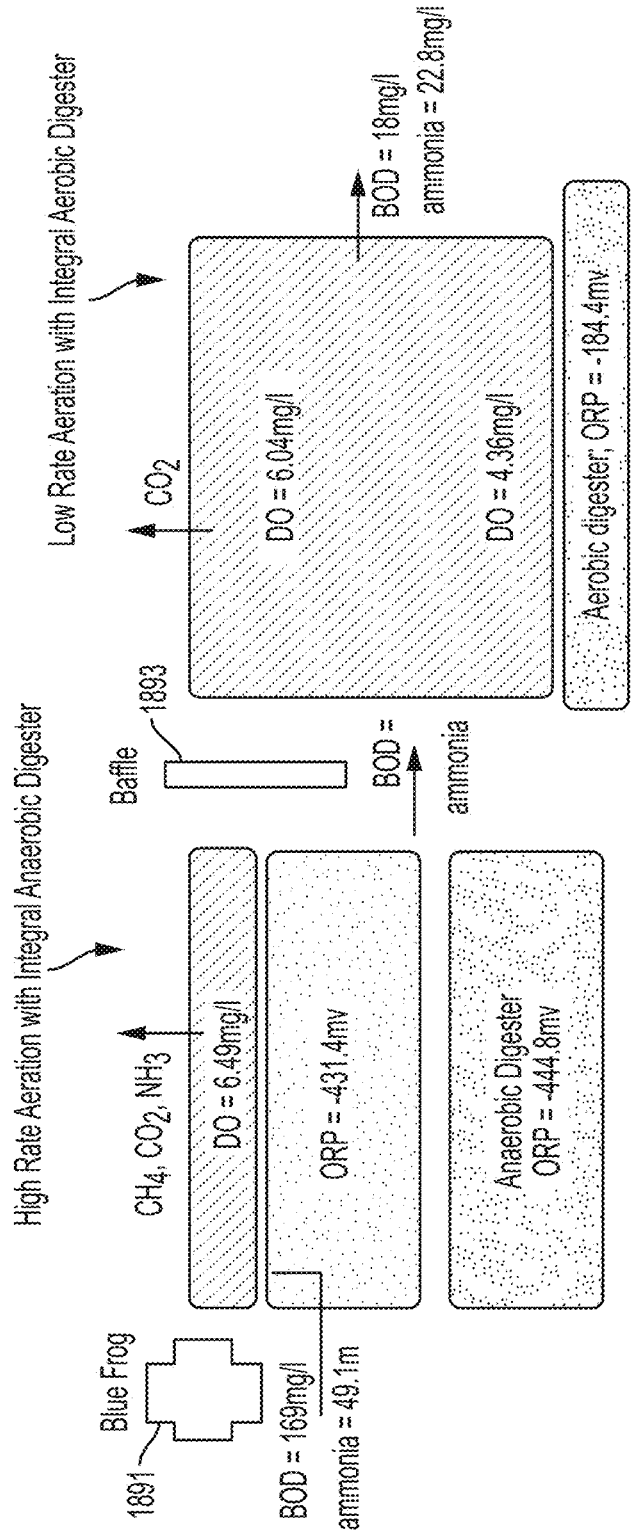
FIG. 18 illustrates a cross-section of a portion of a lagoon according to an embodiment of the present disclosure.

Referring now to FIG. 18, illustrated is a cross-section of a portion of a lagoon according to an embodiment of the present disclosure. As seen in this FIG. 18, a lagoon includes water circulator 1891 and a baffle 1893. Operation of the water circulator 1891 causes the stratification as shown on the left of baffle 1893 (this area on the left of baffle 1893 provides a high rate aeration with integral anaerobic digester). Further, operation of the water circulator 1891 provides the low rate aeration with integral aerobic digester as shown on the right of baffle 1893).

Thus, it is believed, without wishing to be bound, that the granules propagation is effected by the following process: The ammonia gas reacts with water and the carbon dioxide gas to form ammonium and calcium carbonate, which occurs at the bubble supernatant interface. In addition, the ammonia reacts with the water to raise the pH. The free ammonia, which causes the pH to become more basic (raises pH), inhibits anaerobic activity more than it inhibits the facultative acid formers. On the other hand, when the concentration of free ammonia is reduced, the pH falls concomitantly therewith. In addition, the temperature drops and salinity increases. Eventually, equilibrium forms and the pH is 6.5, thereby creating the conditions for granule propagation and anaerobic biosolids digestion.

It is believed, without wishing to be bound that granule formation requires three distinct steps: (1) Seed crystal formation; (2) A sticky biofilm grows around the seed; (3) Sticky seeds agglomerate into mature granules. Seed crystals occur if the pH>7.5 once; thereafter, a propagation mechanism makes seeds @ pH ~6.5. The sticky biofilm coats the seed at a facultative ORP (ORP) is less negative than −200 mv). The mature anaerobic granule does not occur unless the environment is fully anaerobic (ORP is more negative than −200 mv). The vertical inlet design is more anaerobic and therefore the bed of mature granules forms within the CSTR, not outside the CSTR. Note that inside the BF/CSTR, the anaerobic zone is built up to a height greater than the aerobic zone outside the BF/CSTR.

Figure 19:
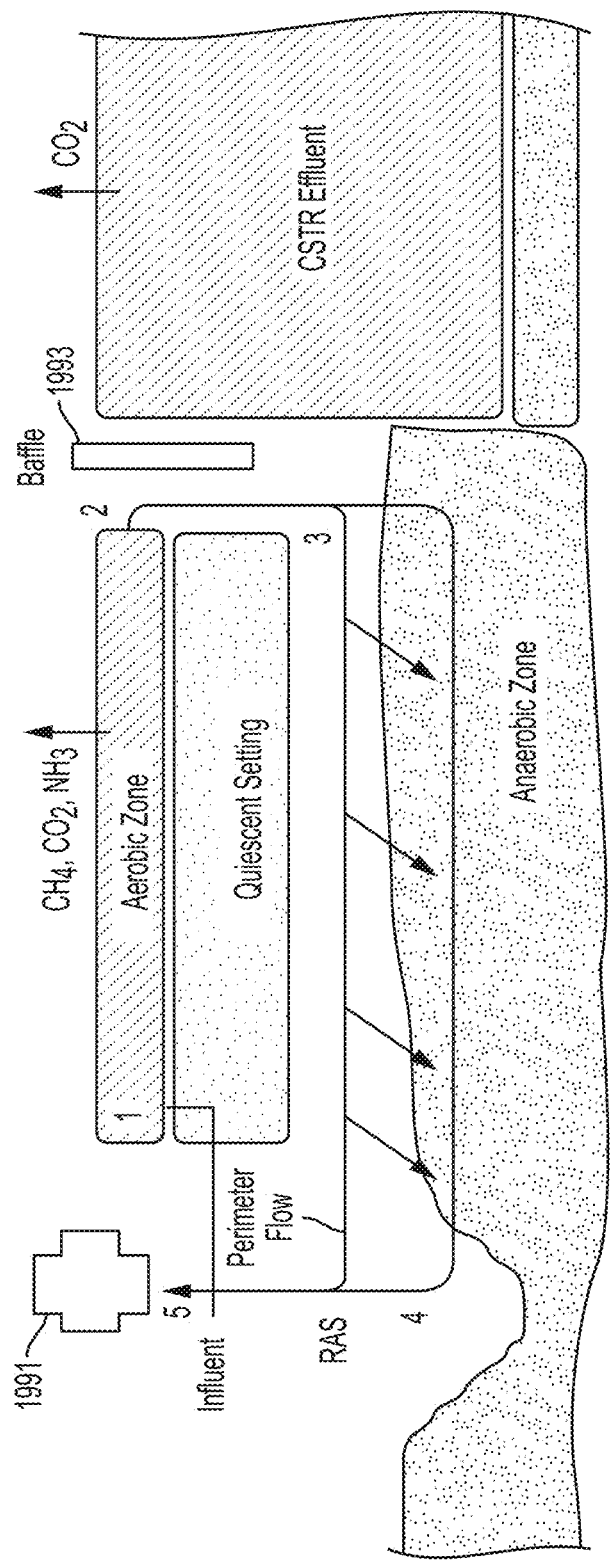
FIG. 19 illustrates a cross-section of a portion of a lagoon according to an embodiment of the present disclosure.

Referring now to FIG. 19, an additional description of an embodiment of the present disclosure is provided. In this FIG. 19, the water circulator 1991 intentionally cavitates and pushes water (e.g., 2 MGD) around the perimeter of a "tank-in-a-tank". More particularly, at "1", intense cavitation lyses bacteria cells, releasing internal digestive enzymes. Half the ammonia (as free ammonia) is boiled off. The aerobic zone has a DO~6.5 mg/l. At "2", a baffle 1993 redirects flow straight down to the bottom ("3"). Water and concentrated enzymes flow down; air bubbles float up and out. DO at "3" is, for example, 0.18 mg/l. A deep, porous, anaerobic (e.g., ORP=−448.1 mV) floc bed ("lagoon granules") forms at the bottom, producing gas and brine (non volatile cations & anions) and then sucking in fresh substrate. Flow percolates horizontally through the bed to "4". The water circulator 1991 has a vertical inlet that creates a tornado-like swirl down to "4". The low pressure point is at "4". Horizontal bottom flow is sucked into the vortex and swirls up and into the water circulator 1991 as RAS. Perimeter flow is established with an upper aeration zone, a lower anaerobic zone and a quiescent settling zone in the middle. As used herein, the quiescent settling zone is synonymous with the quiescent zone. There is no mechanical stirring of the granules in this zone, and the granules that are present flow through the zone settle in the anaerobic zone. BOD is reduced by, for example, 90%.

Figure 20:
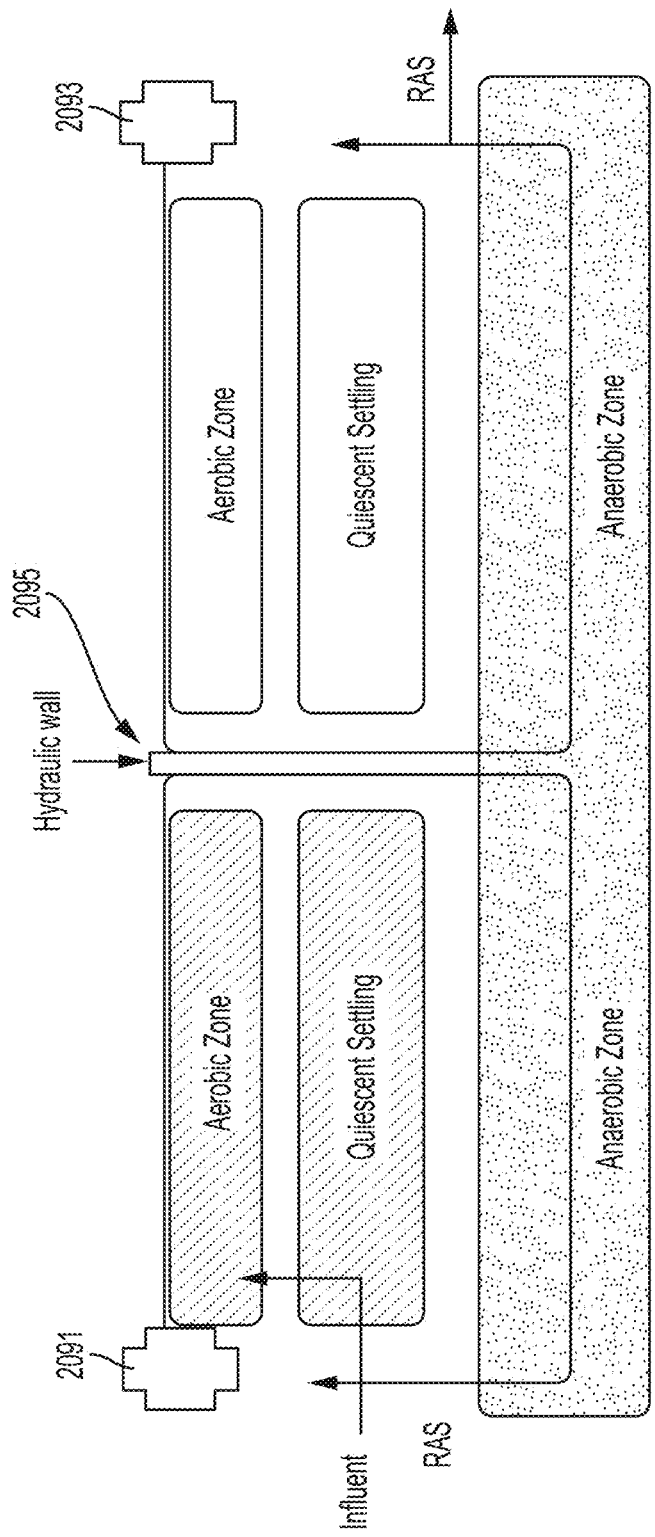
FIG. 20 illustrates a cross-section of a portion of a lagoon according to an embodiment of the present disclosure.

Referring now to FIG. 20, an embodiment is shown in which water circulators 2091 and 2093 cooperate to produce hydraulic wall 2095. In this embodiment, the hydraulic wall 2095 functions as one of the partial depth baffles described herein, resulting in the aerobic, quiescent settling and anaerobic zones shown in FIG. 20. Also resulting from the hydraulic wall 2095 is the perimeter water flow shown in FIG. 20.

Figure 21:
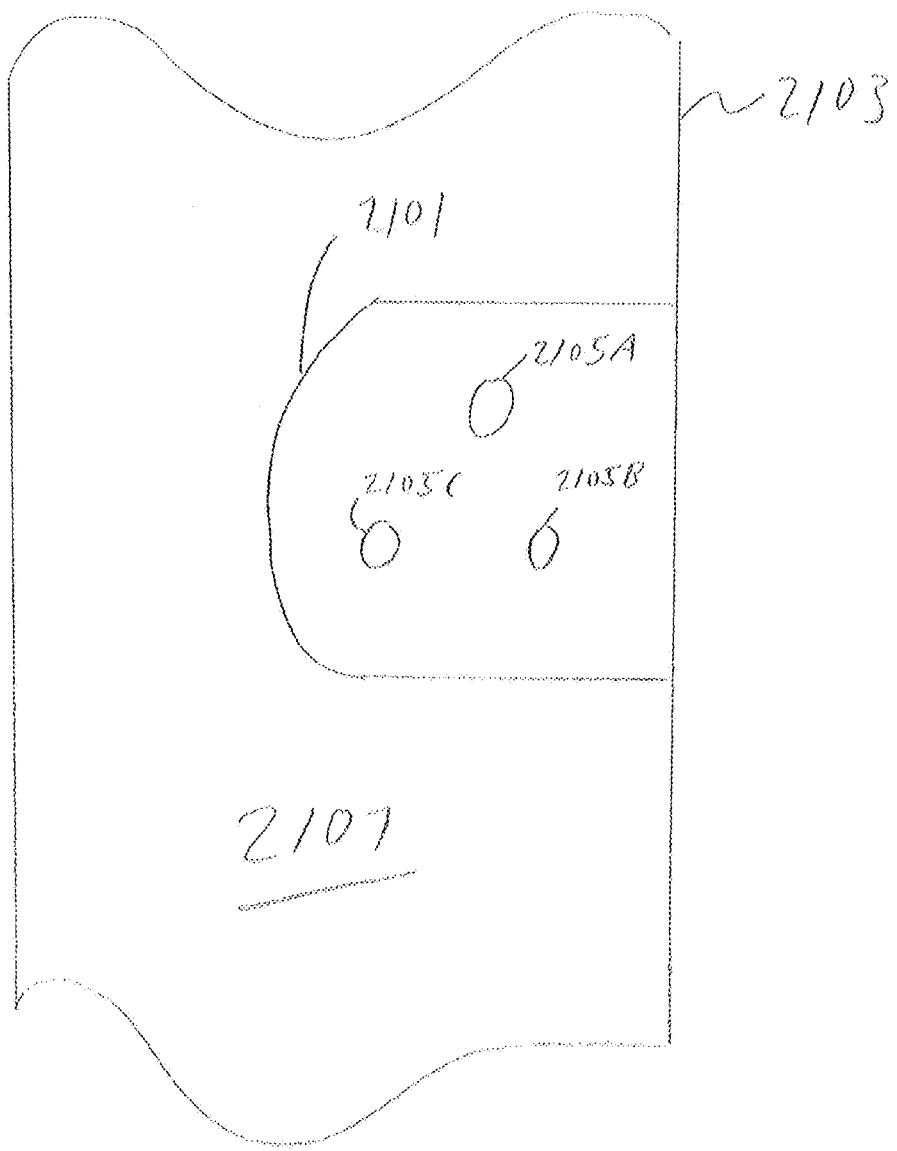
FIG. 21 illustrates a schematic plan view of arrangement of certain water circulators (and baffle) according to an embodiment of the present disclosure.

Referring now to FIG. 21 (which is a plan view), an embodiment is shown in which partial depth baffle 2101 extends from a first berm 2103 back to the first berm 2103, containing therein water circulators 2105A, 2105B and 2105C. While this FIG. 21 shows baffle 2101 extending from a right side berm, the baffle 2101 could instead extend from a left side berm or any other desired side of the lagoon 2107. In an example, a section of the berm may act as a portion of the baffle.

Figure 22:
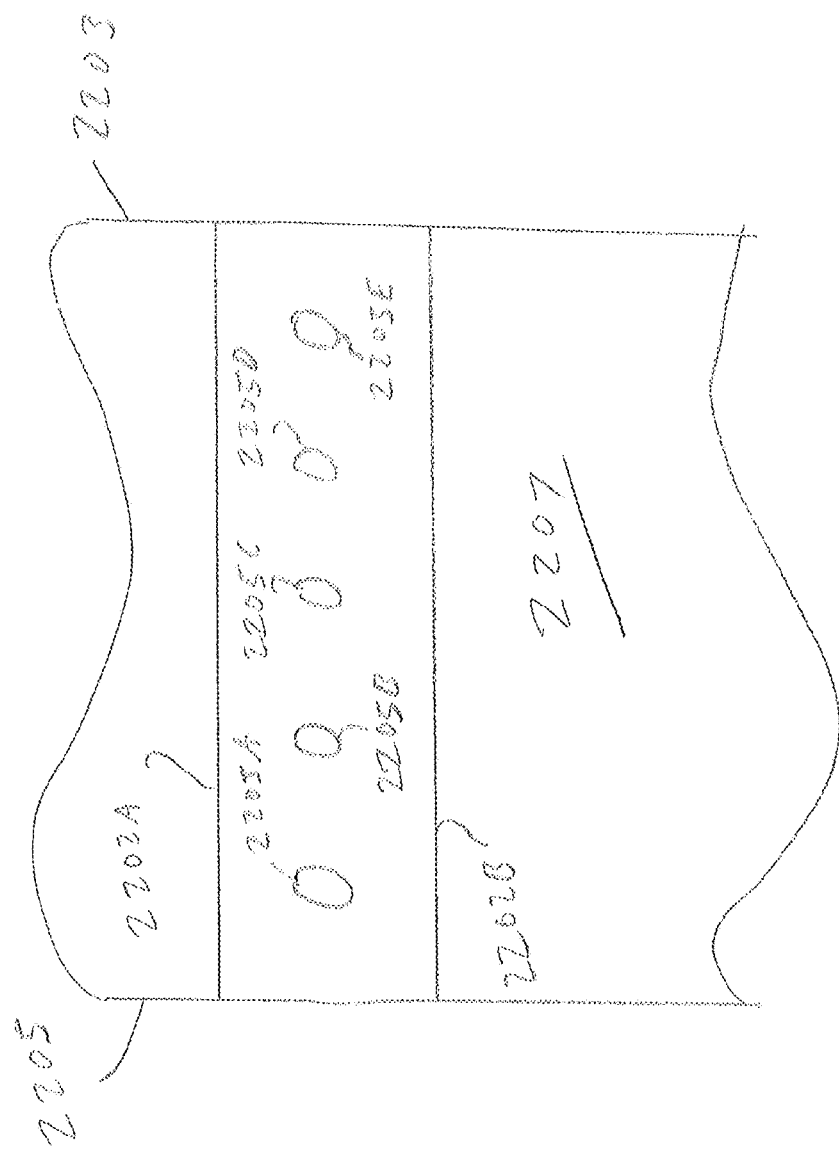
FIG. 22 illustrates a schematic plan view of arrangement of certain water circulators (and baffles) according to an embodiment of the present disclosure.

Referring now to FIG. 22 (which is a plan view), an embodiment is shown in which partial depth baffle 2202A and partial depth baffle 2202B extend from berm 2203 to berm 2205 in lagoon 2207, containing between the two baffles a linear line of water circulators 2205A-2205E. In an example, sections of one or more berms may act as portions of the baffles.

In another embodiment, a surface aerobic layer with dissolved oxygen>1.0 mg/l is in fluid communication with a subsurface anaerobic layer with oxygen reduction potential (ORP) more negative than −200 mV. In this regard, as is known to one of ordinary skill in the art, an ORP equal to or greater than 0 mv is aerobic, an ORP between 0 and −200 mv is facultative, and an ORP below −200 mv is anaerobic.

In another embodiment, a system is provided for formation of biologically active granules that reduce BO) in a lagoon containing circulating water. In this embodiment, the lagoon includes a bottom thereof. The water of the lagoon has a surface layer with dissolved oxygen>1.0 mg/l and a pH>7.0 and an anaerobic bottom layer with an ORP more negative than −200 mV and a pH<7.0 wherein substantially horizontal surface water flows repeatedly through the surface layer and then through the bottom layer before returning to the inlet of a water circulator.

In addition to the systems and methods discussed above, the present disclosure provides a system for the treatment of sludge, carbon, nitrogen and suspended solids in a lagoon containing water that promotes the formation of biologically active granules that digest sludge in the lagoon, the system comprising three zones, each downstream of the preceding zone: (1) a granule selection zone incorporating cavitation flow; (2) a quiescent stratified zone incorporating gas flow; (3) a nitrogen removal zone incorporating plug flow; and (4) a clarification zone incorporating perimeter flow. The depth of each of these zones are variable, even as compared to each other, and generally include a range of depths from about 3.5 ft to about 40 ft. These terms are more fully discussed below.

The granule selection zone comprises: X number of circulators in a cluster, wherein X is 3, 4, 5, 6, 7, 8, 9, or 10 circulators per cluster. In one embodiment, the cluster is oriented so that the circulators form the corners of equilateral triangles, with each side of that triangle being about 30 feet to about 75 ft. In other embodiments, this spacing can be about 40 feet to about 60 feet, or about 44 ft to about 52 ft, or about 48 ft.

The circulators can have a nearly constant impeller rotational speed, which dispels water at a cyclically varying flow rate radially across the surface of the lagoon from the centerline of each circulator. Over 95% of the outflow from the circulators is horizontal and radial; less than 5% of the flow is perpendicular to the horizontal, radial flow. Where the horizontal flow vectors are equal and opposite between adjacent circulators, a hydraulic wall forms to redirect flow downwards. Optionally, a partial depth baffle can be included in the lagoon to redirect terminal radial outflowing water down towards the bottom of the lagoon. Outflow from the granule selection zone is below the water column surface.

Figure 46:
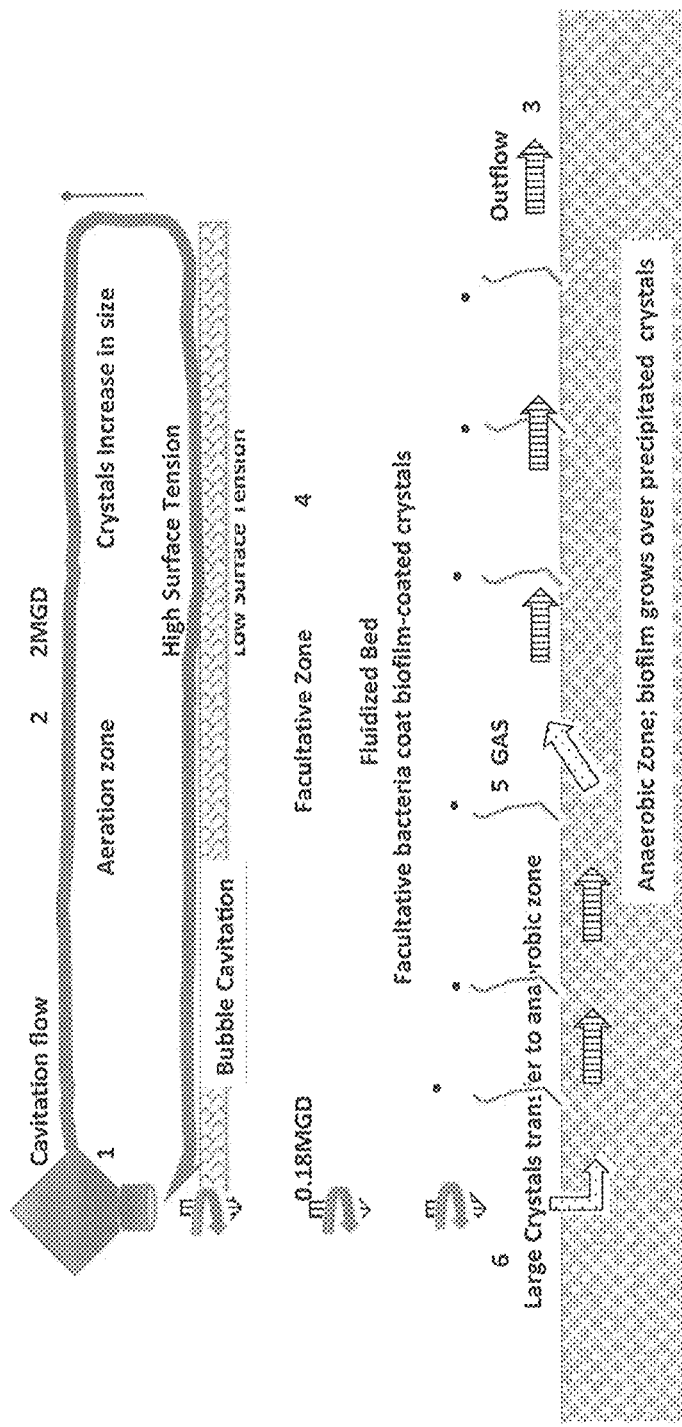
FIG. 46 is a graphical illustration of a cross section of cavitation flow.

The granule selection zone incorporates "cavitation flow" as shown in FIG. 46, which is an example of a cross-section representing "cavitation flow".

Cavitation Flow can be defined as: an impeller that runs at constant revolutions per minute (rpm), greater than about 50 rpm and less than about 500 rpm, such as about 100 to about 400 rpm; flow direction changes serially and sequentially from horizontal-radial-outflow to perpendicular-to-radial outflow wherein the ratio of radial-to-perpendicular flow is greater than 20:1 (for example about 11:1); and facultative/anaerobic granules form.

The quiescent zone stratifies the water column of the lagoon and is configured to remove carbon. The quiescent area is in fluid communication and downstream of the selection zone, allowing the water column to stratify into a plurality of layers according to their relative densities. A facultative bottom layer of accumulated biologically active granules reduces surface tension and produces gas. The top aerobic layer selects for microalgae that produce dissolved oxygen. The surface tension of the aerobic layer is at least 20% higher than the surface tension of the lower facultative layer. There is an interface between the aerobic and facultative zones, commonly defined by dissolved oxygen and ORP differences. At the aerobic/facultative interface there is greater than a 100× increase in chemical oxygen demand (COD) as precipitating solids fall through the interface and are lysed. In this zone, surface water can be discharged with low CBOD and low TSS (<20 mg/l). In this zone, sludge does not accumulate.

Figure 47:
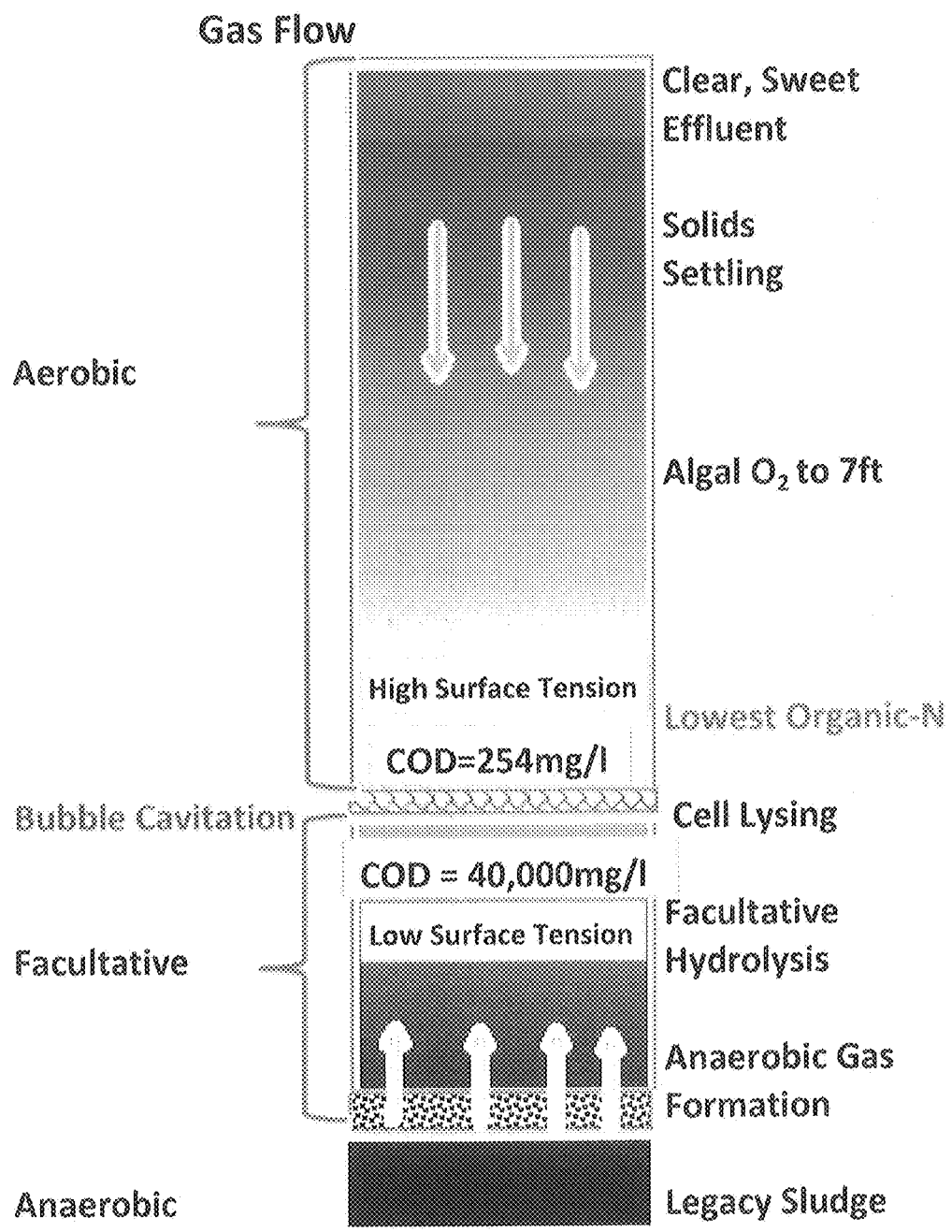
FIG. 47 is a graphical illustration of a cross section of a water column.

The quiescent zone incorporates "gas flow". Referring now to FIG. 47, which relates to a quiescent water column downstream of a granule selection zone. Continuous waves clarify the top, e.g. the top about 6 inches of the water column. Solids settle (yellow down arrows) further clarify the aeration basin portion of the water column to allow light to stimulate microalgae growth. This water has relatively high surface tension.

At the base of the water column is recalcitrant legacy sludge. Just above the legacy sludge is a layer of inventive mature granules that form gas. There is a low surface tension fluidized bed (brown) where rising gas lifts immature granules into the interface between the aerobic and facultative zones.

At the aerobic/facultative interface, produced gas bubbles begin to cavitate, driven by alternating high and low surface tension.

FIG. 47 cross-section represents "Gas Flow".

Gas Flow means; that the water column is partially mixed by produced gas; surface bubbles are visible when looking into the early morning sun; there is an upper aerobic zone wherein DO>1 mg/l; there is a lower facultative zone wherein ORP is less negative than −200 mV; and/or there is an interface between the aerobic and facultative zones wherein the COD on the facultative side of the interface is more than 100 times higher than the COD) on the aerobic side of the interface.

When granules are made by using the BF in aeration (cavitating mode) and when the discharge is at the base of the water column, the downstream quiescent water column normally separates into three zones: 1. upper algal-aerated zone, 2. bottom accumulated sludge layer and 3. active anaerobic zone, which produces some gas.

When heavy granules are produced (i.e. with a mineral crystal core coated with an anaerobic biofilm), there is a fourth layer. This fourth layer is unexpected.

The fourth layer is formed because of the difference in surface tension between the lower and upper layer. In one embodiment the upper layer has a 53% higher surface tension than the lower layer ("bubble cavitation" in FIG. 47). This interfacial layer is about 3" thick.

Internal bubble pressure is directly proportional to surface tension. Thus bubble volume is inversely proportional to surface tension (gas law). Produced bubbles (white arrows) from the inventive granules are small. As they transfer through the unexpected interface, the small bubbles are exposed to stripes of up to about 53% higher surface tension DO-rich water. This compresses the bubbles even smaller. Thus as an individual bubble passes into the transition zone, the bigger "half" is on the bottom and the smaller "half" on the top. This is inherently unstable and the bubble switches around. When this happens over and over, the bubble begins to cavitate. Water molecules are torn apart and become free radicals, as discussed below.

In the embodiment depicted, the surface tension in the algal oxic zone is 69.17 mN/m, very near the 72 mN/m surface tension of pure water. The low-to-high change in surface tension is large, 53.8%. There is no mechanical mixing through the interface, so clear, high surface tension, oxygen-rich water and turbid low surface tension, oxygen-poor water form "stripes" of alternating high/low surface tension until mixing is complete on the oxic side of the interface. Since internal bubble pressure is directly proportional to surface tension, an individual bubble rising through alternating surface tension waters is subjected to large changes in volume (gas law) to set up oscillation analogous to the oscillations from an ultrasonic horn, producing free radicals.

Thus, the free radicals lyse intact cells raining down from the Aerobic zone. Internal water, electrolytes, nutrients and digestive enzymes are released.

The results are noticeable. COD just above the interface is 254 mg/l; COD just below the interface is 40,000 mg/l. Not only that, the now-released digestive enzymes increase biological hydrolysis in the UASB zone (Up-flow Anaerobic Sludge Bed) and COD declines linearly in the UASB, anaerobic zone.

The root cause of the change in surface tension (i.e. when the facultative section of the water column has lower surface tension than the aerobic section) is the increased hydrolysis of solids into long chain fatty acids (soap). When surface tension oscillates between low and high, bubbles cavitate and free radicals are formed. What is unexpected is that this interfacial layer is deployed over the entire quiescent fraction of the pond.

After the carbon compounds are partially removed from the lagoon in the previous zones, the water of the lagoon enters the "nitrogen removal zone". This is the zone wherein the ammonia in the lagoon water is reduced in concentration. Even though there is substantially no current in the lagoon, after passing through the granule selection zone and the quiescent zone, some of the organic compounds are removed from the water in the lagoon, in accordance with the procedure described hereinabove. The water on the surface is moving downstream because it is less dense and viscous than the water below it towards the bottom of the lagoon.

The nitrogen removal zone is separate and apart from the granule selection zone. It is located downstream of the granule selection zone and at least one quiescent zone. In an embodiment, the nitrogen removal zone is at least about 100 feet downstream of the quiescent zone.

In this embodiment, the system provides a nitrogen removal zone for the reduction of ammonia in a lagoon that promotes the formation of biologically active granules. In this system, downstream of the triangular clusters described above and downstream of at least one quiescent zone there are Y number of circulators, wherein Y is 2, 3, 4, 5, 6, 7, 8, 9, or 10 circulators.

These circulators can be arranged in any suitable way, such as in a line substantially perpendicular to net flow. In some embodiments, the Y number of circulators are oriented in a substantially straight line with separation distance between adjacent circulators of about 30 ft to about 70 ft, or about 40 ft to about 60 ft, or about 44 ft to about 52 ft or about 48 ft. In this embodiment, each circulator has a source of rising air bubbles that are redirected horizontally by radial outflowing water over an optionally attached growth surface.

These circulators avoid cavitation, as such turbulence may dislodge the nitrifiers, (the autotrophic bacteria which converts the ammonia from their perch on the circulators) as explained below. Also, at least 50% of the circulators are equipped with aerators. In other embodiments, at least 60% of the circulators have aerators attached thereto, and in a further embodiment, at least 75% of the circulators have aerators attached, while in another embodiment, at least 80% of the aerators attached to the circulators, and in another embodiment, at least 90% of the circulators of the circulators have aerators attached, while in another embodiment, at least 95% of the circulators have aerators attached, and in further embodiment, all of the circulators have aerators attached. The aerators blow air in the water of the lagoon, and therefore increase dissolved oxygen (DO)) levels in the lagoon. The circulators are so arranged so that the source of rising air bubbles are redirected horizontally by radial outflowing water over attached growth surface of the nitrifiers.

In this embodiment, the circulators produce nearly constant flow at nearly constant impeller rotational speed, e.g., about constant revolutions per minute ranging from about 50 rpm to about 500 rpm and in another embodiment, from about 75 rpm to about 400 rpm, and in another embodiment from about 100 rpm to about 300 rpm, and in another embodiment, from about 125 rpm to about 200 rpm and in a still further embodiment, about 150 rpm. In other words, the water flows in and out of the circulators with impellers at a rate of about 6 million gallons per day (MGD) to about 8 MGD, or about 7 MGD in a forward mode, or about 1.5 MGD to about 2.5 MGD, or about 2 MGD in a reverse mode.

Also in this embodiment, there are optionally no floating baffles downstream of the circulators, with parallel hydraulic walls forming midway between adjacent circulators. This system is capable of reducing ammonia to less than 2 mg/L in water warmer than 10° C. due to nitrification bacteria.

In the nitrogen removal zone circulators can be arranged in two or more substantially straight lines, substantially perpendicular to net flow of the surface water. The present invention contemplates a slight deviation off the straight line, up to about 5%. The circulators are in a line perpendicular to net flow.

The distance between the two or more substantially straight lines of circulators can be from about 10 ft to about 400 feet, while in another embodiment, it ranges from about 200 to about 300 feet and in another embodiment, from about 230 feet to about 270 feet and in a further embodiment, at about 250 feet.

Without wishing to be bound, it is believed that autotrophic bacteria oxidize ammonia into first nitrite and then into nitrate. These so-called nitrifiers do not compete well against heterotrophs. They require some external surface to attach to. They prefer shade to sunlight. Nitrifying bacteria must have dissolved oxygen>2 mg/l. They require bicarbonate alkalinity (their source of carbon). Thus nitrifiers do not grow unless carbon has already been turned into bicarbonate alkalinity. Practically, this means the CBOD (Carbonaceous Biological Oxygen Demand)≤20 mg/l.

When nitrifiers grow successfully, nitrate accumulates. Nitrate is reduced into gas ($N_2$ and NOx) by heterotrophs that are starved of oxygen, i.e. in anoxic conditions (DO<0.5 mg/l). But the heterotrophs require a biological source of carbon and this carbon was previously removed to encourage nitrifier growth. Dead algae can be the source of carbon for heterotrophic de-nitrification, in the clarification zone discussed below.

Figure 41:
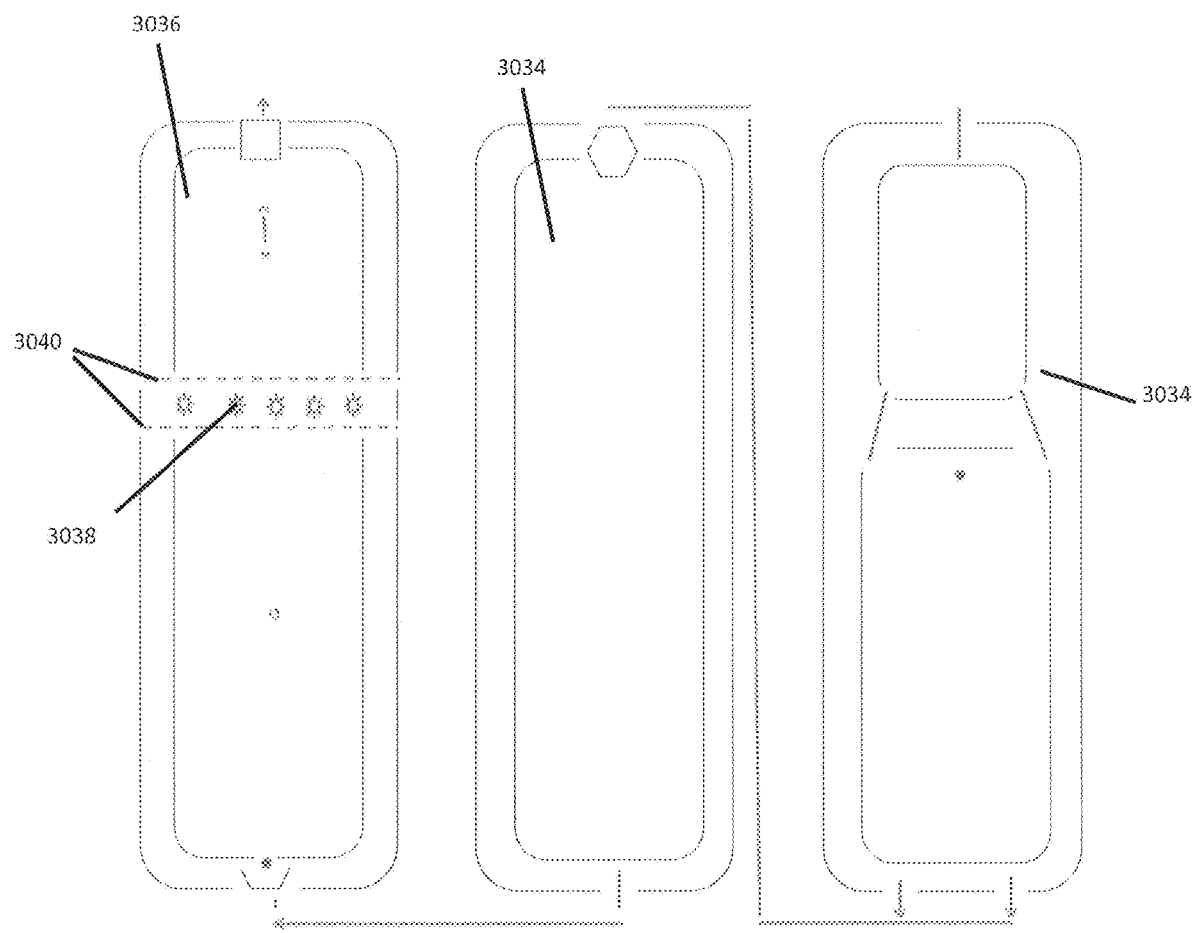
FIG. 41 illustrates a schematic plan view of a three lagoon system that includes a number of circulators and baffles.
Figure 48:
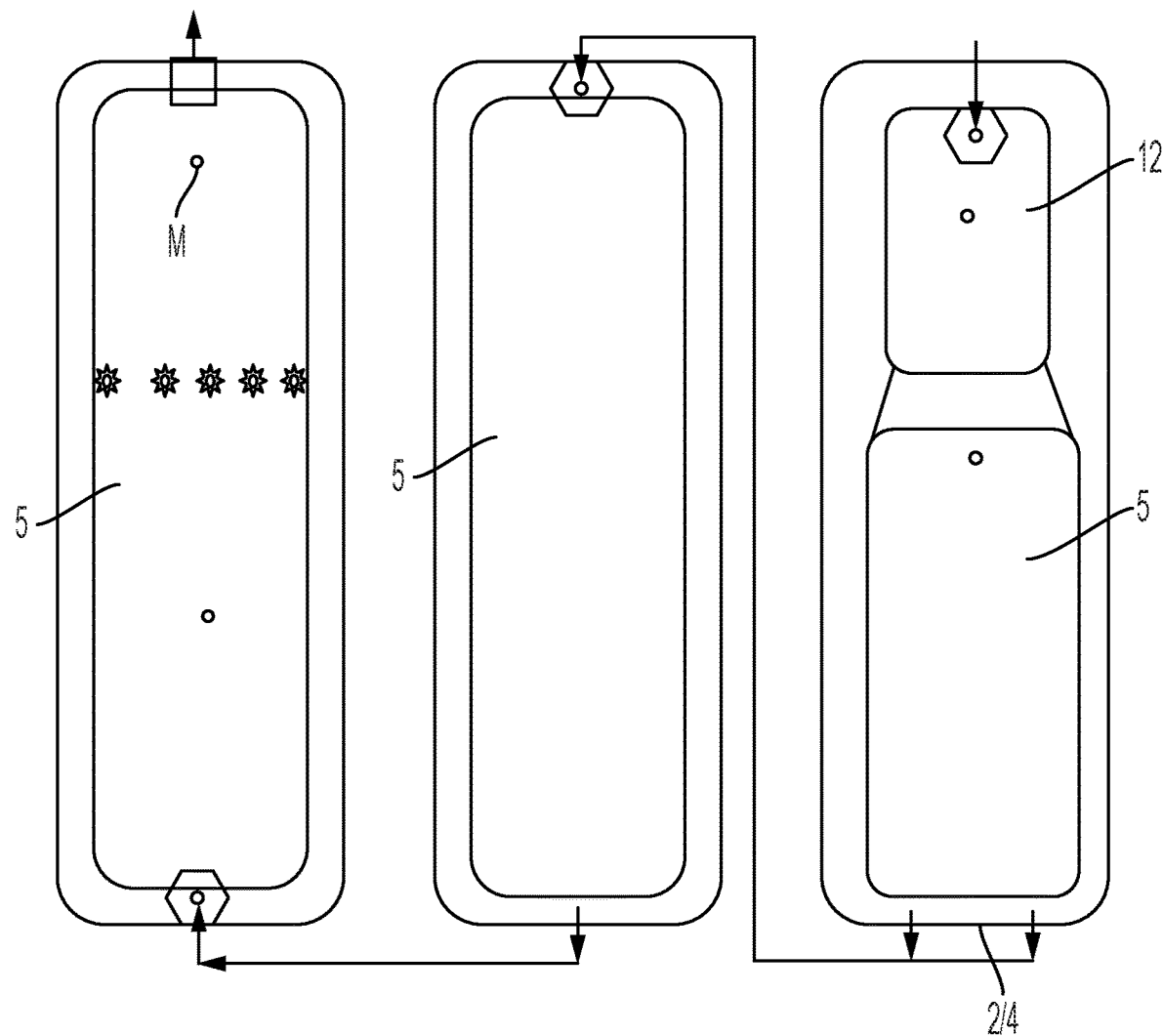
FIG. 48 is a graphical illustration of a plan view of plug flow.

The nitrogen removal zone incorporates "plug flow". FIG. 48 is a plan view representing plug flow, flow that simulates flow through a pipe. FIG. 41 is not plug flow; FIG. 48 is plug flow. Plug Flow herein is defined as: a linear cluster of a plurality of circulators spaced more than 20 ft apart and less than 100 ft apart; circulators have circumferential attached growth surfaces downstream of flow with DO>4 mg/l; CBOD is less than 20 mg/l; unrestricted outflow; and parallel hydraulic walls where the horizontal flow vectors of adjacent circulators are equal and opposite.

The clarification zone can be the last zone before effluent leaves the lagoon. A circulator with nearly constant flow at nearly constant impeller rotational speed can be about 25 ft to about 150 ft from the effluent means, and in other embodiments, about 50 ft to about 125 ft, or about 75 ft to about 100 ft. The inlet to the nearly constant flow circulator swirls up from the bottom of the lagoon, while the circulator itself moves up and down in the lagoon to create continuous sine waves.

Due to these sine waves, floating algae are selected away due to their aversion to continuous waves and microalgae are selected for as they can move up and down the water column diurnally, spreading oxygen down to about 7 ft. The waves generated clarify the top about 6" of the water column.

A floating partial depth baffle can surround the circulator in the clarification zone and protect the effluent means by deflecting circulated water. The circulator pushes radial circulating surface water towards the protective baffle, the baffle rejects floating trash and redirects outflowing clarified 6" of surface water downwards in the lagoon. A fraction of the down-flowing clarified water can be bled off into the effluent means as under/overflow (e.g. under the partial depth baffle and over the effluent weir).

Total flow minus flow bled off as effluent is redirected off the bottom of the lagoon and returns to the circulator inlet along the sludge bed/supernatant interface, creating perimeter flow.

The oxygen from microalgae brings low-level oxygen to the sludge bed/supernatant interface. The oxygen is not consumed because carbon and nitrogen were previously removed in the quiescent zone and the ammonia reduction zone. Sludge worms that commingle non-digestible ash and any remaining sludge do consume oxygen. Ash is then commingled into worm castings that are expressed vertically into the returning perimeter flow. Some worm castings are bled off into the effluent stream during continuous flow around the perimeter. As the worms consume low levels of oxygen, the sludge/supernatant interface becomes anoxic. Dead algae provide carbon; produced nitrate provides oxygen and nitrate is converted into gas as flow returns to the circulator.

Figure 49:
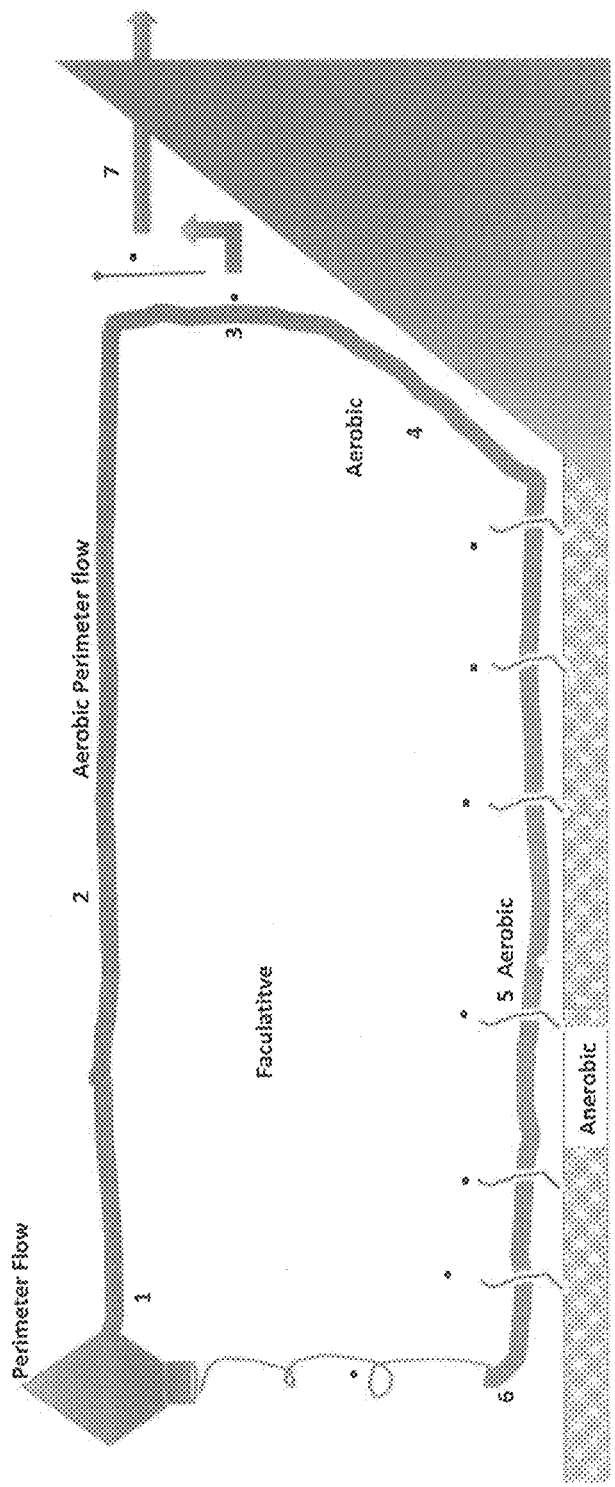
FIG. 49 is a graphical illustration of perimeter flow.

The clarification zone incorporates "perimeter flow". FIG. 49 is a cross-section representing perimeter flow. Perimeter Flow is defined as: an impeller that runs at constant revolutions per minute (RPM), greater than 50 rpm and less than 500 rpm; flow direction is 100% radial outflow along the surface; effluent pH is 7 to 8; BOD<15 mg/l; and TSS<15 mg/l.

Thus, the present system converts carbon and nitrogen into gases in a lagoon. A brief overview of the system mechanics are reiterated below. Controlled flow patterns (perimeter flow) select for granules that convert solids into gas and ammonia. This removes carbon and sludge. Once residual carbon is low, nitrification bacteria compete favorably for oxygen. This removes ammonia, creating nitrate. Worms transfer ash into castings and consume residual oxygen, making return water anoxic. Algae die and sink to the bottom, providing carbon for heterotrophic denitrification. Thus the present system removes carbon, nitrogen and ash. Optionally, alum can be added to the circulator in the clarification zone to convert soluble phosphate into insoluble phosphate. Insoluble phosphate leaves as part of the worm castings. Thus a sequentially processed lagoon can meet the discharge requirements of modern mechanical plants at a reduced cost, complexity and energy consumption.

The following non-limiting examples further illustrate the invention.

Comparative Example 1 and Example 1

In this example, a chicken processing plant passed its waste through an anaerobic digester, neutralized the once-digested waste with CaO (quick lime) and then passed it through an aerobic sequencing batch reactor. The double-digested solid waste was then pumped into a sludge holding pond. The recalcitrant sludge was circulated with a BF/CSTR and 9 outlying BFs. New sludge was digested as received, but ancient sludge inventory was not reduced.

The 4 BFs adjacent to the influent were converted into aeration (reciprocating flow) mode and the CSTR baffle was removed. The BFs were about 100 ft from each other, too far to form hydraulic corners. Sludge digestion improved slightly.

The 4 BFs were then moved to 30 ft spacing to form a plurality of hydraulic corners. Ancient sludge digestion began and pre-existing "sandbars" were digested. Forming a plurality of hydraulic corners was a vast improvement.

Example 2

4 reciprocating Blue Frog™ circulators were placed on 30 ft centers adjacent to the inlet of a large pond with 0.5MGD municipal waste flow (BF cluster). The mean sludge depth (n=14) was 5.0 ft. After 86 days, the mean sludge depth was 2.55 ft, a −49% reduction. The following examples are meant to illustrate the present invention, but are non-limiting.

Example 3

In a lagoon treating 0.8 MGD of municipal waste, a 4-pack cluster of water circulators (all 4 in cavitating mode) was installed with 30 ft center-to-center spacing. 2.) The pond had a persistent VFA odor and the effluent BOD was too high (105 mg/l). 3.) 49% of the sludge was digested (~2.5 ft) in 3 months. 4.) The flow was reversed (to non-cavitating) on two of the 4 circulators (diagonally opposed) in the cluster (the ratio (discussed in connection with Table 1) was =5.6). 5.) Overnight, the odor went away and the BOD dropped to 40 mg/l. 6.) The next sludge measurement (after 6 months) showed a 55% total reduction in sludge.

Without wishing to be bound, this is what is believed to have occurred: 1.) During the first 3 months, granules and excess enzymes were made. 2.) The enzymes hydrolyzed the alluvial sludge inventory and produced VFA. 3.) The granules did not have enough capacity to consume all the VFA. 4.) Excess VFA caused the odor. 5.) Dissolved VFA (i.e. soluble BOD) increased the BOD) of the effluent to e.g., 105 mg/l. 6.) When the set up was changed from 4 cavitating BFs to 2 cavitating/2 non-cavitating BFs, there was a reduction in the enzymes released (less gross cavitation=less lysing=fewer enzymes) (the ratio (discussed in connection with Table 1) went from 10 to 5). 7.) With fewer enzymes to hydrolyze solids into VFA, the now excess granules consumed all the VFA, the odor ceased, the BOD was cut in half and the rate of sludge digestion slowed.

In this example, the number of cavitating circulators acts like a throttle to modulate enzyme production. Throttling up (4 of 4) made Step 4 of waste treatment (acid consumption) rate limiting. Throttling back (2 of 4) made VFA production rate limiting. This was unexpected because there is a three way balancing act: sludge digestion, VFA production and VFA consumption.

It was unexpected to have two rate limiting steps in the same process. This is only possible because solids surge (i.e. sludge build up) allows separation of the overall process into two processes. The hydraulic corners maximized the production of granules so that they were in excess once the alluvial sludge inventory was digested (total solids<2.5%); the percent of circulators in cavitating mode allowed throttling back until acid formation was rate limiting (i.e. all the VFA produced is immediately consumed). This makes the effluent clean, the pond odor-free and no sludge accumulates. It is believed that this effect has never been achieved before without added chemicals, added bacteria or added enzymes.

Example 4 and Comparative Example 2

4 reciprocating BF circulators (horizontal inlet) were placed on 30 ft centers adjacent to the inlet of a large pond with 0.5MGD municipal waste flow to form a BF cluster.

The mean sludge depth (n=14) was 5.0 ft. After 86 days, the mean sludge depth was 2.55 ft, a −49% reduction.

A single BF (reciprocating flow; horizontal inlet)/CSTR and two freestanding BFs treated a smaller lagoon (flow=0.1 MGD) containing 4.51 ft of sludge. After 200 days, the sludge was 2.34 ft (−48%). The flow per reciprocating BF was about the same, but, in contrast, the time to reduce similar amounts of sludge with the BF cluster was reduced by 57% (200 days versus 86 days).

Without the cluster (a single BF/CSTR), it took 200 days to digest half the sludge; with the cluster, half the sludge was digested in 86 days. The increased cluster rate of digestion was unexpected. The improvement is one of making more engineered hydraulic walls to stimulate anaerobic lagoon granule activity by "force feeding" the granules with anaerobic substrate delivery.

Comparative Example 3 and Example 5

The BF/CSTR (horizontal inlet) is a well-mixed tank with an upper produced, well-mixed high-DO aerated zone (DO=9.4 mg/l) and an induced lower DO, well-mixed, aerated zone (DO=7.99 mg/l). BOD is reduced 11.3%.

The improved BF/CSTR (vertical inlet) is not well mixed. There is an upper aerated zone (DO=6.49 mg/l) and a lower anaerobic zone (DO=0.18 mg/l; ORP=−441.6 mV). Flow "A" follows the inside perimeter of the baffle-enclosed area, creating a large quiescent zone ("Zone 2") in the middle of the enclosed area. BOD is reduced 90%.

Referring to FIG. 16 and without wishing to be bound, it is believed that: (1) At "1", cavitation lyses intact bacteria cells, releasing internal enzymes; (2) At "2", collapsing cavitation bubbles strip free ammonia out of the water; (3) "3" is the end of the aerobic zone, where water is redirected down to the bottom; (4) Between "3" and "4" water flows down and air bubbles rise up. DO drops from 6.49 mg/l to 0.18 mg/l (this flow is about ⅜" thick and the concentrated enzymes produced in "1" are not diffused through the quiescent zone, but stay concentrated in perimeter flow "A"); (5) Between "4" and "6", water flows along the bottom, laterally back towards the inlet (the water is highly anaerobic (ORP=−441.6 mV), in addition, lagoon granules pull this enzyme-rich, anaerobic substrate into the granules and convert substrate into gas and brine); (6) At "6", swirl from BF 1601 creates a tornado-like vortex that creates a low pressure zone at "6". Flow is pulled laterally into the vortex and is pulled up vertically into the BF 1601 inlet.

The difference between 90% BOD reduction and 11.3% BOD reduction is large and unexpected. The BF/CSTR with horizontal inlet creates two aerated zones. The BF/CSTR with vertical inlet creates an aerated zone and an anaerobic zone. The anaerobic zone distinguishes the BF/CSTR (vertical) from the BF/CSTR (horizontal). In other embodiments of the disclosure, a 2 foot thick biofilm can be formed that can remove up to about 90% of BOD) in a 6 hour detention treatment space.

As described hereinabove, another embodiment relates to a system for formation of biologically active granules that digest sludge in a lagoon containing water, the lagoon including a bottom thereof, the water of the lagoon having a surface layer, the water of the lagoon having an initial pH of at least 6.2, after which the pH may range from 6.2 to 10, the system comprising:

X number of water circulators disposed in the lagoon, wherein X is an integer ranging from 3 to 10, at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water;

when said at least one water circulator is a number of water circulators less than X, a remainder of said X number of water circulators other than said at least one water circulator being configured to expel water taken from the lagoon, wherein the water is expelled such that at least some of the expelled water travels away from the water circulator in a path essentially parallel to the surface layer of the lagoon water;

said X number of water circulators are disposed in the lagoon in a configuration such that: (c) each water circulator is located essentially on a circumference of a circle defined by a predetermined radial distance from a center point of the circle; (d) at least some of the water expelled from each of a given pair of adjacent water circulators forms a respective hydraulic wall; and (e) the hydraulic walls force at least some of the water directed thereto downward, towards the bottom of the lagoon, thereby creating the conditions for the formation of the biologically active granules;

wherein:

each water circulator has associated therewith a respective vertical centerline;

a distance D between the vertical centerlines of each of a given pair of water circulators ranging from about 10 to about 60 feet.

In an embodiment, this distance D ranges from about 20 to about 50 feet. The distance D may vary from one pair of circulators to another. In an embodiment, D is essentially equal for all pairs of water circulators. In an embodiment, D is about 30 feet with respect to each pair of circulators.

In an embodiment, the cavitation of water is effected by the at least one water circulator resulting from a reciprocating flow of water in the at least one water circulator. The water is expelled from each water circulator such that at least some of the expelled water travels away from the water circulator in a path along the surface layer of the lagoon water. The cavitation of water by the at least one water circulator lowers a surface tension of the cavitated water. Further, the water that is cavitated provides a shear force to a plurality of bacteria within the water.

In a further embodiment, the system for formation of biologically active granules that digest sludge in a lagoon containing water, wherein the lagoon includes a bottom thereof, the water of the lagoon has a surface layer and an initial pH of at least 7.5, after which the pH may range from 6.2 to 10, comprises:

Y number of clusters of water circulators disposed in the lagoon, wherein Y is an integer ranging from 2 to 20;

each of the Y number of clusters of water circulators comprising:

X number of water circulators disposed in the lagoon, wherein X is an integer ranging from 3 to 10;

at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water;

when said at least one water circulator is a number of water circulators less than X, a remainder of said X number of water circulators other than said at least one water circulator being configured to expel water taken from the lagoon, wherein the water is expelled such that at least some of the expelled water travels away from the water circulator in a path essentially parallel to the surface layer of the lagoon water;

said X number of water circulators are disposed in the lagoon in a configuration such that: (c) each water circulator is located essentially on a circumference of a circle defined by a predetermined radial distance from a center point of the circle;

(d) at least some of the water expelled from each of a given pair of adjacent water circulators forms a respective hydraulic wall;

and (e) the hydraulic walls force at least some of the water directed thereto downward, towards the bottom of the lagoon, thereby creating the conditions for the formation of the biologically active granules;

wherein:

each water circulator has associated therewith a respective vertical centerline;

a distance D between the vertical centerlines of each of a given pair of water circulators ranging from about 10 to about 60 feet. In an embodiment, the distance D ranges from about 20 to about 50 feet. The distance D with respect to each pair of circulators may be the same or different, but in an embodiment, the distance D is substantially the same with each pair of circulators.

In an embodiment, the lagoon is bounded on at least a first side by a first berm and a second side by a second berm. The system for cleaning the sludge in the lagoon comprises at least one baffle, the baffle being disposed across the lagoon between the first berm and the second berm, the baffle dividing the lagoon into at least a first cell and a second cell, the first cell being on a first side of the baffle, the first cell being adjacent to the influent input side of the lagoon, the second cell being on a second side of the baffle, the second cell being adjacent to the first cell, the baffle extending from the surface layer of the lagoon water toward the bottom of the lagoon, the baffle being of a vertical height such that the baffle does not reach the bottom of the lagoon; and at least one water circulator disposed in the first cell of the lagoon, the water circulator being configured to (a) take in water from the lagoon travelling along a substantially vertical path, essentially perpendicular to the surface layer of the lagoon water, leading up to the water circulator from below the water circulator; and (b) to expel the water taken in, wherein the water is expelled such that at least some of the expelled water travels away from the water circulator toward the baffle in a path essentially parallel to the surface layer of the lagoon water;

wherein at least some of the expelled water impinges on the baffle and is redirected downward toward the bottom of the lagoon; and wherein a path for effluent to travel from the first cell to the second cell is formed below the baffle, between a bottom edge of the baffle and the bottom of the lagoon. In an embodiment, an upper edge of the baffle is configured to at least partially float on the surface layer of the lagoon water. The baffle may extend between the first berm and the second berm in a substantially straight line or in a curved path, wherein the substantially vertical path comprises a spiral heading towards the surface layer of the lagoon water from a location below the surface layer of the lagoon water. In an embodiment, at least one baffle, disposed in the water of the lagoon, provides substantially 360 degree containment around a portion of the surface layer of the lagoon water and at least one water circulator, which is disposed in the water of the lagoon in the portion contained by the baffle, is configured to (a) take in water from the lagoon travelling along a substantially vertical path, essentially perpendicular to the surface layer of the lagoon water, leading up to the water circulator from below the water circulator; and (b) expel the water taken in, wherein the water is expelled such that at least some of the expelled water travels away from the water circulator toward the baffle in a path essentially parallel to the surface layer of the lagoon water;

wherein at least some of the expelled water impinges on the baffle and is redirected downward toward the bottom of the lagoon; and wherein a path for effluent to travel to an area of the lagoon outside the baffle is formed below the baffle, between a bottom edge of the baffle and the bottom of the lagoon. wherein an upper edge of the baffle is configured to at least partially float on the surface layer of the lagoon water.

It is advantageous to digest sludge into gas (e.g. $CO_2$, $CH_4$ and $N_2$) and soluble salts (e.g. $NH_4^+$, $Ca^{++}$, $HCO_3^-$, $CO_3^-$, $NO_3^-$), and the like. One way to realize this advantage is to form a relatively thick biofilm as discussed herein.

In this embodiment, an increase of diffusion through a biofilm was created such that thick biofilms predominate, not thin biofilms, was created. As part of this relatively thick biofilm, the concentration of QS is increased to signal building of these biofilms.

Quorum sensing (QS) refers to the ability of bacteria to sense their density by exchanging diffusible communication molecules called auto-inducers. Quorum sensing appears to be an important process in biofilms, at least in part based on their high cell densities.

Quorum Quenching (QQ) is antagonistic to QS, the chemical signals to form a biofilm; QQ signals to stop biofilm formation. QS and QQ coexist in wastewater biofilms. Typically, QQ is encouraged to help prevent biofilm fouling of membrane based treatment systems.

Wastewater is a water mixture of soluble BOD (SBOD) and insoluble BOD usually as Total Suspended Solids (TSS) and many other compounds. SBOD will react with biofilm bacteria and is limited by diffusion. TSS typically settles to the bottom as sludge. Relatively old sludge is stabilized by divalent calcium cross-linking across carboxylic acid moieties. Relatively new sludge is typically alluvial (Total Solids<2.5%) and tends to flow like water. Sludge does not diffuse deeply into biofilms and sludge accumulates.

Typically, well-mixed circulation ends up inhibiting biofilm activity by diluting QS, but recirculating QS around just the perimeter of a confined space, and not circulating the quiescent middle zone, increases the thickness of a biofilm within the confined space. Further, biosolids accumulate as diffusion limits bacterial activity.

When there are excess QS, unorganized bacteria sense it is time to organize into a biofilm. The biofilm is complex, but at least part of the biofilm is anaerobic and produces gas. Insoluble, produced gas (i.e. $CH_4$, not soluble gas like $CO_2$) rises and fluidizes the biofilm, breaking a contiguous biofilm into small pieces ("granules", "tapioca eyes" and amorphous gels). This "Passive Fluidized Biofilm Bed" (PFBB) overcomes the diffusion limitation of traditional biofilms. Surface area is increased; fluid flow (gassy water) is up while granule flow (gravity) is down, increasing bulk mass transfer; internal produced gas pulls an internal vacuum that partially offsets diffusion resistance by pulling water into the granule. The net effect is a vast improvement in biofilm productivity as measured by up to about 90% reduction in CBOD within the contained volume and the large reduction of SBOD as legacy sludge is digested (i.e. quantified as calculated soluble BOD=(TSS-BOD).

The results include, an odor reduction, there is reduced legacy sludge inside and outside the confined volume, a conversion of fresh solids to gas and the effluent being relatively clear.

When the contained volume is upstream, the PFBB becomes a Heterotroph Passive Fluidized Biofilm Bed. When the contained volume is downstream (i.e. if the CBOD<20 mg/l), then the contained volume is an Autotroph Passive Fluidized Biofilm Bed. The autotroph bed uses dissolved $CO_2$ (alkalinity) and ammonia to make nitrite, nitrate and then $N_2$ and $NO_x$ gas. Thus the passive fluidized bed can be deployed upstream to remove carbon and downstream to remove nitrogen.

This disclosure is directed to the combination of an upwelling or surface influent, a cavitating circulator, a circumferential baffle and a swirling inlet to the circulator. This combination produces "perimeter flow", as discussed in reference to FIG. 23, which is a cross sectional view of a cavitating circulator 3000 in a lagoon 3002.

Referring to point "A" in FIG. 23, raw blackwater flows from the inlet pipe up to the surface of the lagoon 3002. At the surface, the blackwater "flowers" out into a thin film across the enclosed surface.

At point "B" the cavitating circulator 3000 pushes water radially in a thick film away from the circulator 3000 centerline to point "C". In the lagoon 3002 there is a circumferential partial depth baffle 3004 that redirects radially outflowing water relatively straight down from "C" to the biofilm/supernatant interface at point "D".

The down-flowing waterfall from "C" to "D" is redirected by the biofilm surface back towards the circulator 3000, flowing across the biofilm surface from "D" to "E". At point "E" the water swirls vertically upwards, in a swirling configuration, towards an inlet 3001 of circulator 3000. This swirl causes the formation of a low pressure area vertically below the inlet 3001 at the biofilm/supernatant interface.

Oval "F" is a quiescent zone that allows any solids to settle down onto the biofilm surface bringing substrate down to the biofilm.

Point "G" is a relatively shallow biofilm just outside each end of the enclosed space formed by the baffle 3004. There is about a two foot difference in height from the top of biofilm "H" just under the baffle 3004 to the upper surface of the film by point "G". "H" is a relatively thick, passive, fluidized biofilm bed. $CH_4$ rises from the bed, fluidizing and breaking up the contiguous biofilm.

This is further understood in reference to the following examples.

Counter Example A—Known Methods

In this example, a dairy processor produces high fat wastewater that is treated in a traditional aeration basin followed by aluminum sulfate (alum) addition to remove total phosphorous (TP) and then a clarifier. The clarified effluent is discharged to an adjacent river. 1% Total solids (TS) fluid is returned as Return Activated Sludge (RAS) to the aeration basin and wasted as Waste Activated Sludge (WAS) to an 80 ft×20 ft sludge holding tank with a single BF aerator.

The waste is concentrated to 2% solids and then pumped from the bottom to a holding tank and then spread on adjacent fields. Supernatant returns to the aeration basin. There is no evidence of biofilm formation and no sludge digestion other than concentration from 1% to 2% total solids.

Based on these data, it appears that the BF in the tank is designed to completely mix the 80 ft tank, the large contained volume dilutes QS chemicals and no quorum is sensed, biofilm does not form, sludge removal is at the bottom of the tank, so any QS chemicals are removed from the tank and no quorum is sensed.

QS Example B of the Present Disclosure

Using a system including that what is shown in FIG. 23, a small town system had a prior art BF/CSTR designed to completely mix a contained space. The results of implementing the system of the claimed disclosure, shown in FIGS. 24 and 25, was that BOD and TSS declined steadily and sludge was digested. One BF was modified to create perimeter flow (see arrow of FIGS. 24 and 25) and results improved.

Figure 24:
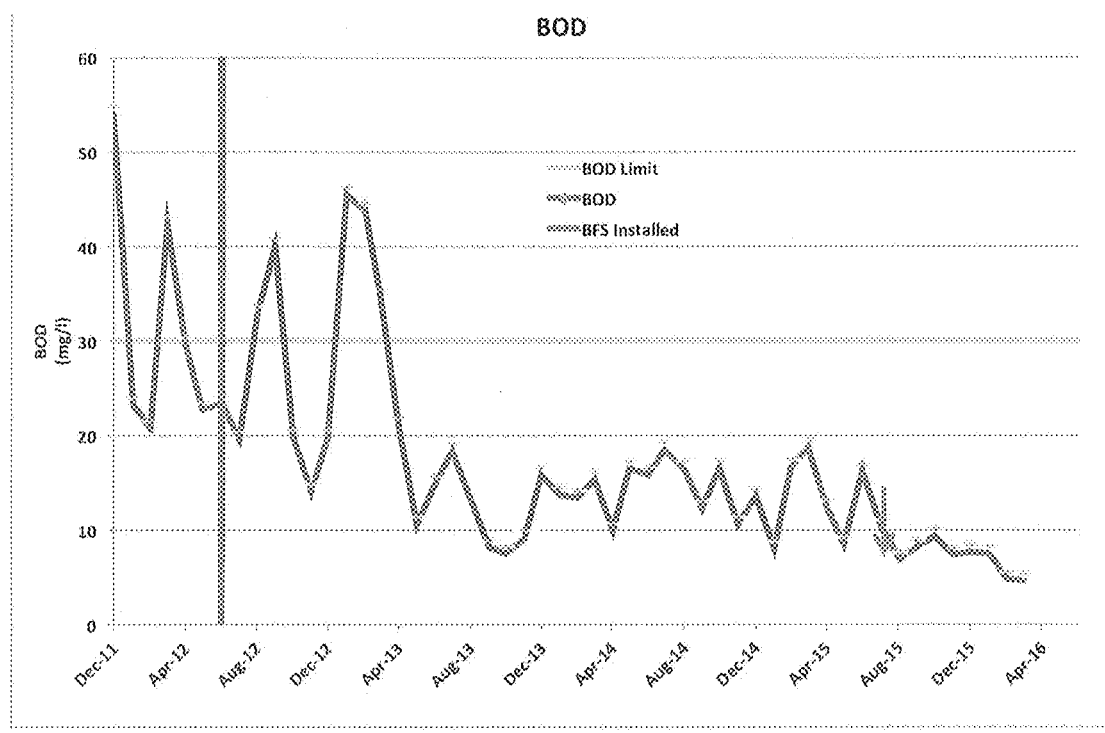
FIG. 24 is a graphical representation of BOD levels.
Figure 25:
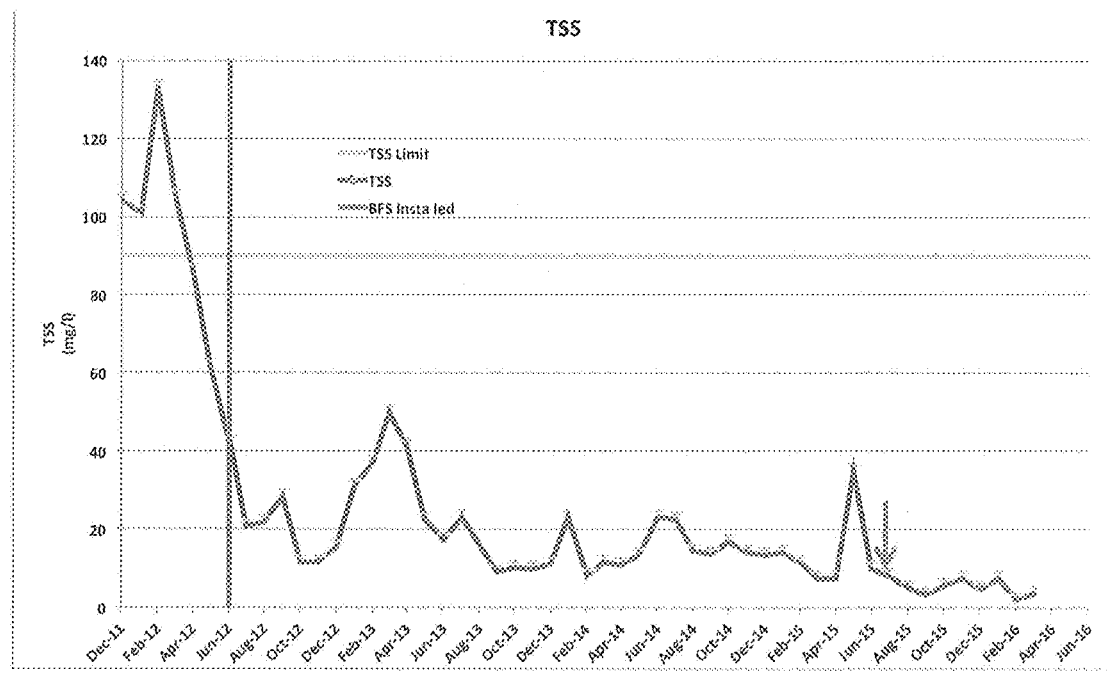
FIG. 25 is a graphical representation of TSS levels.

In this example, as shown in FIGS. 24 and 25, BOD varied up and down shortly after start-up as alluvial sludge (TS<2.5%) was digested rapidly; BOD and TSS varied in a narrower range as gelled legacy sludge (TS≥2.5%) was slowly digested from the gelled surface; a thin biofilm covered the bottom of both ponds (outside the influent perimeter flow zone) as gelled sludge was digested; perimeter flow was developed and implemented in August 2015 in the influent contained space (6 hours detention time); BOD and TSS<10 mg/l; 90% of CBOD was removed in the perimeter flow space; an approximately 2 ft thick fluidized biofilm bed developed only in the perimeter flow space; there was no measurable sludge downstream of the perimeter flow space; there was a thin biofilm over the outside bottom as "champagne bubbles" of $CH_4$, which are visible at the water surface; perimeter flow reduced BOD and TSS and legacy sludge; there was a reduction in odor and the effluent was relatively clear.

QS Example C of the Present Disclosure—with Multiple Perimeter Flow Zones

Figure 26:
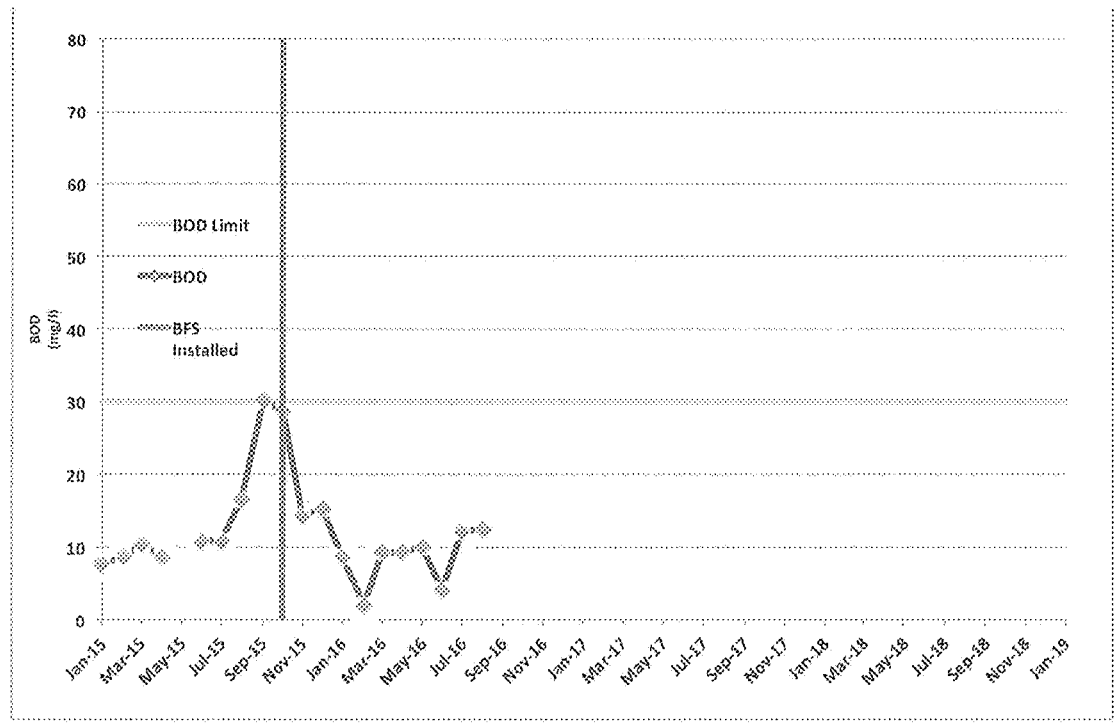
FIG. 26 is a graphical representation of BOD levels.
Figure 27:
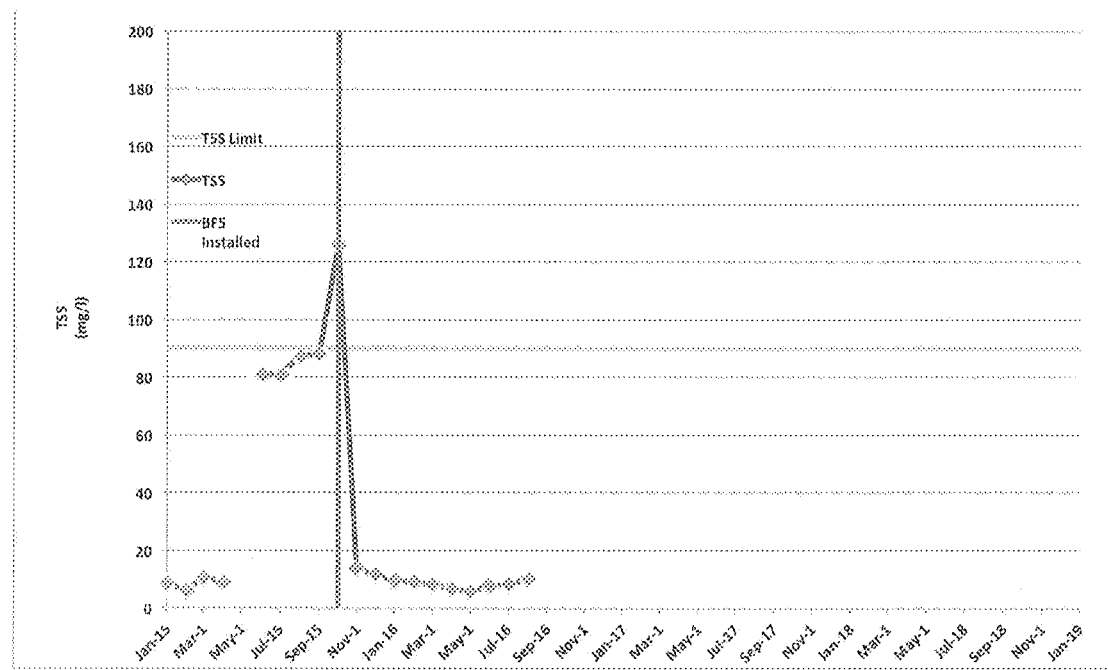
FIG. 27 is a graphical representation of TSS levels.

In a second small town with two lagoons, all circulators were operated in perimeter flow. As seen, BOD (FIG. 26) and TSS (FIG. 27) all dropped to about 10 mg/l after the BFs were installed.

Counter Example D—Known Methods Vs the Disclosed Methods

QS Example C of the present disclosure was compared with a multi-year prior art small town, both in Central Texas. The flows were comparable.

Figure 28:
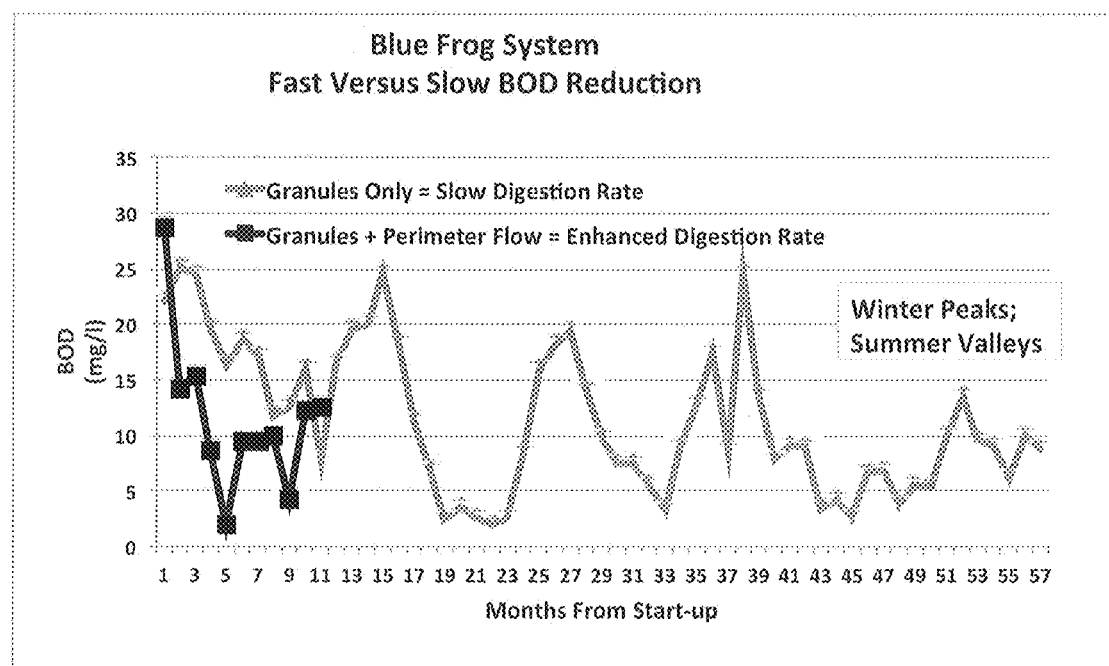
FIG. 28 is a graphical representation of BOD levels before and after treatment.
Figure 29A:
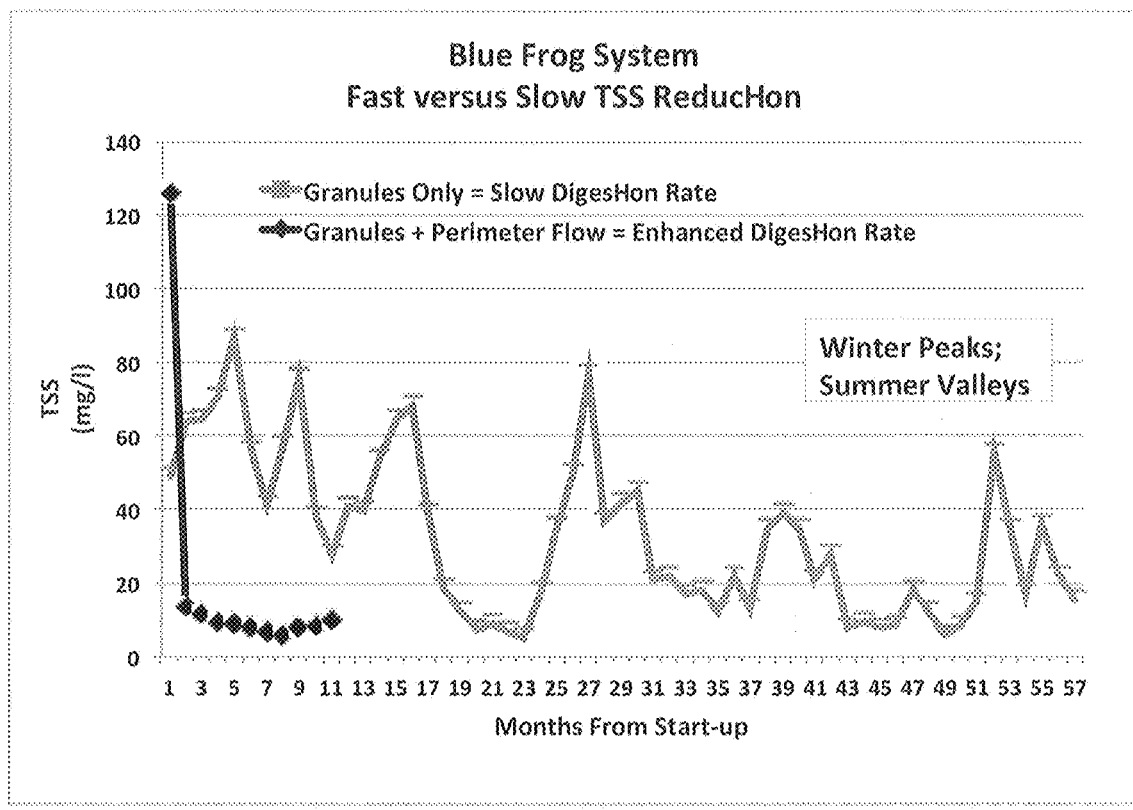
FIG. 29A is a graphical representation of TSS levels before and after treatment.
Figure 29B:
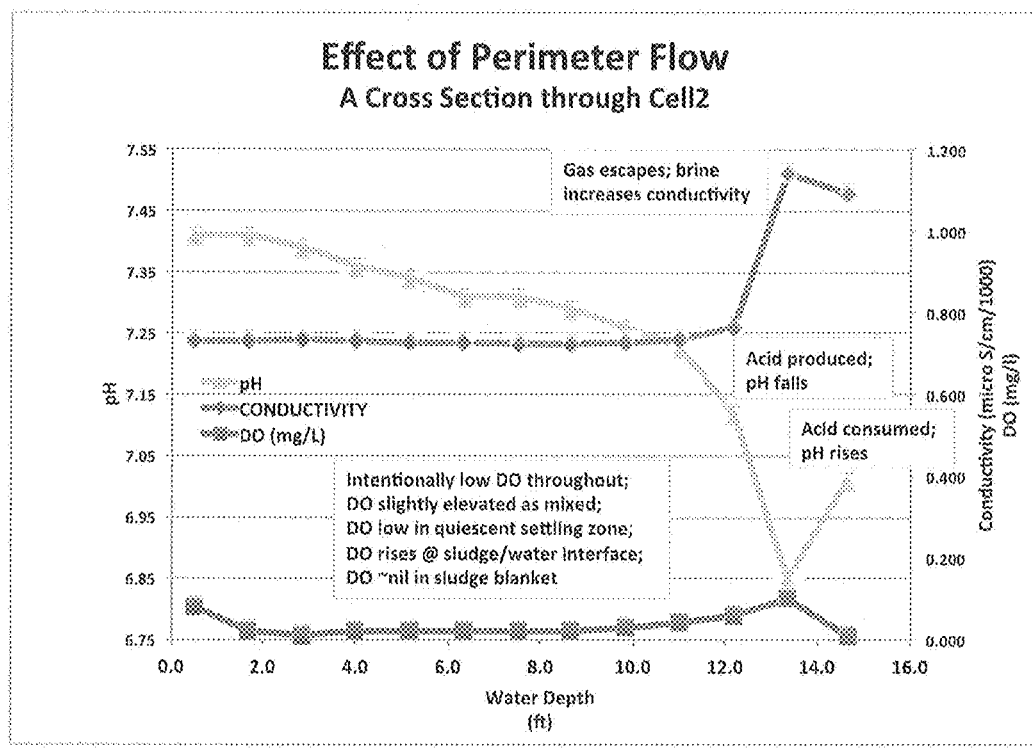
FIG. 29B is a graphical representation of pH, conductivity and DO levels at varying depths of a portion of a treated lagoon.

As can be seen, the reduction in BOD (FIG. 28) and the reduction is TSS (FIG. 29A) was enhanced with introduction of perimeter flow. Further, granules formed in both applications; cold temperature affected results in the prior art application; in the present disclosure utilizing perimeter flow, perimeter flow site, the fluidized bed digested sludge faster and was able to attenuate the low temperature effect, likely by increased exothermic activity and the smoothing effect of fluidization. FIG. 29B graphically illustrates pH, conductivity and DO at varying water depths for a system of the present disclosure.

QS Example E of the Present Disclosure

Figure 30A:
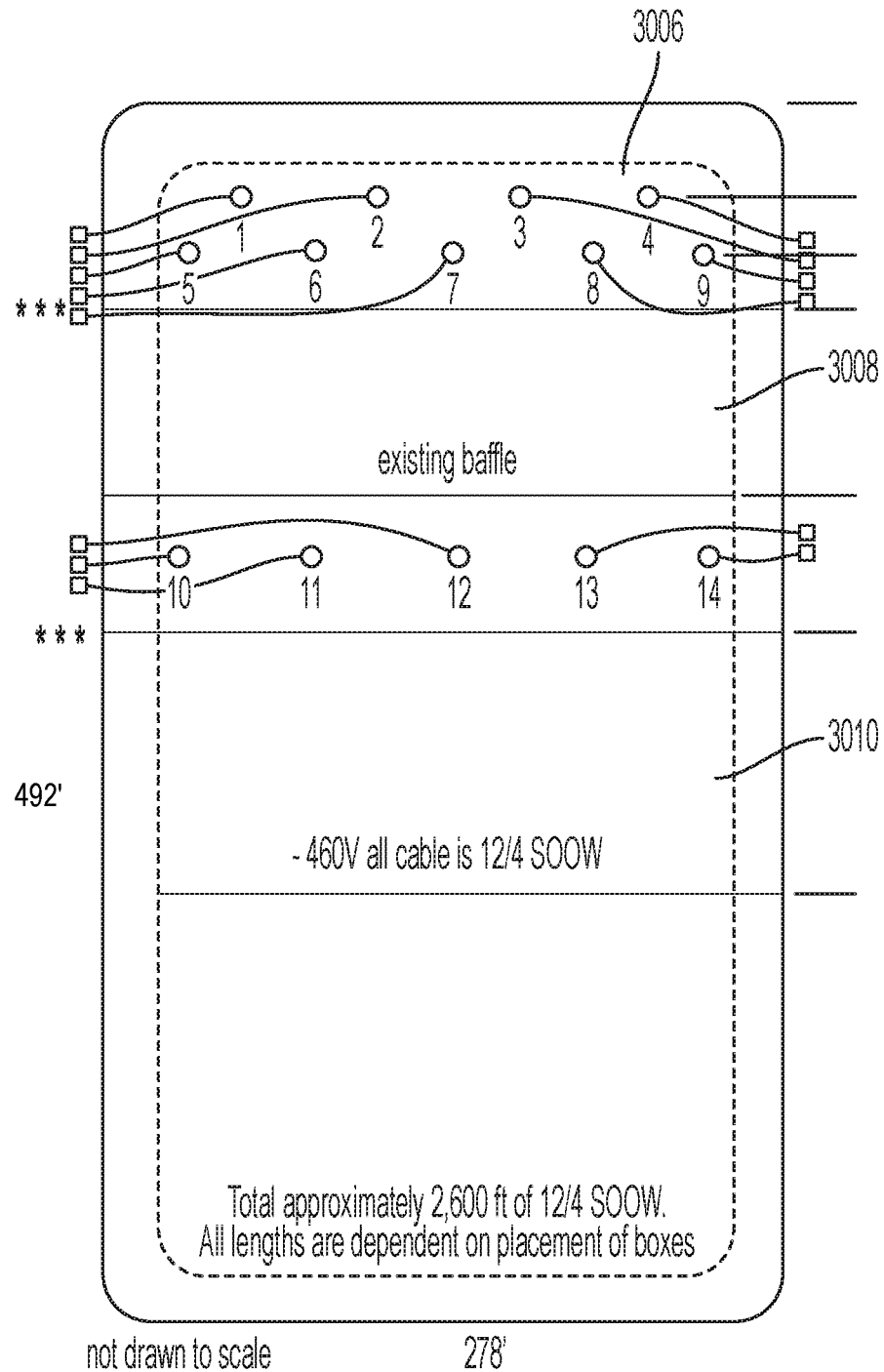
FIG. 30A illustrates a schematic plan view of a treatment lagoon.
Figure 30B:
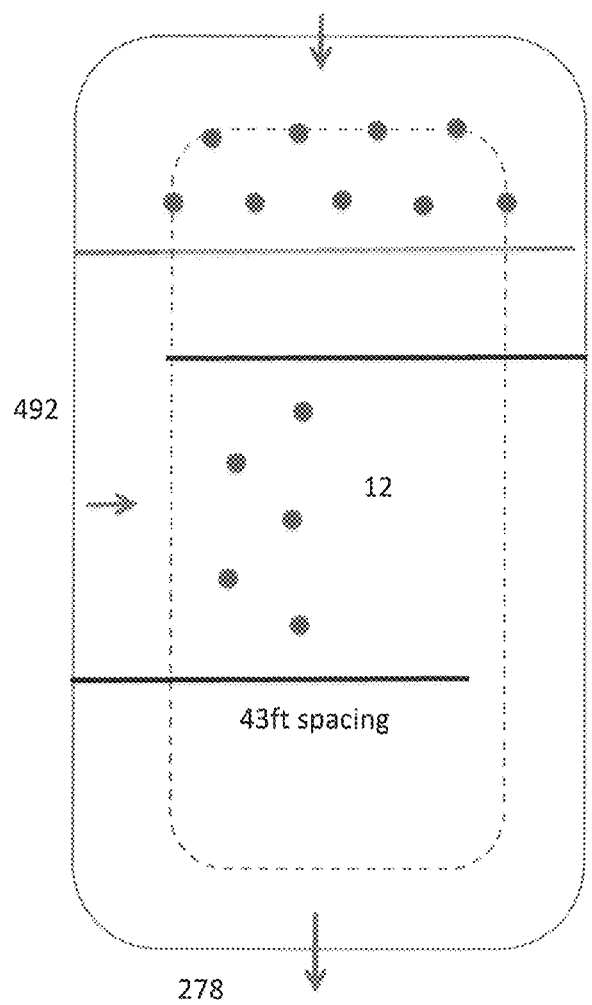
FIG. 30B illustrates the FIG. 30A lagoon with improved ammonia removal.

This example is a 2MGD system that includes multiple circulators in a space defined by boundary baffles, as shown in FIG. 30A. The lines leading to the numbered circles represent electrical wires. The numbered circles are BF circulators. The thicker horizontal lines (***) are berm-to-berm, partial depth baffles that form three cells, a first cell 3006, a second cell 3008 and a third cell 3010. The thinner lines (###) are pre-existing bottom-to-top baffles that end at the flat/berm interface. Flow is top to bottom in FIG. 30A.

Figure 31:
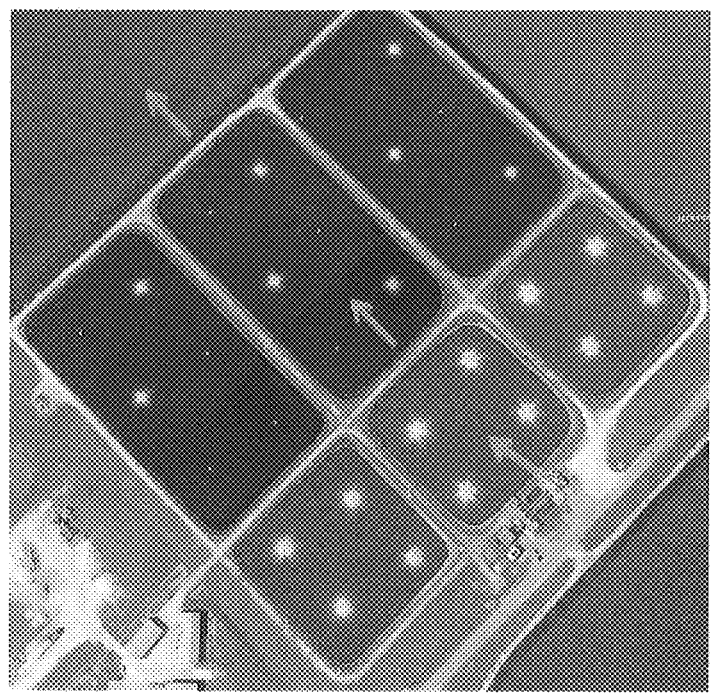
FIG. 31 is a photograph of the treatment lagoon.
Figure 32:
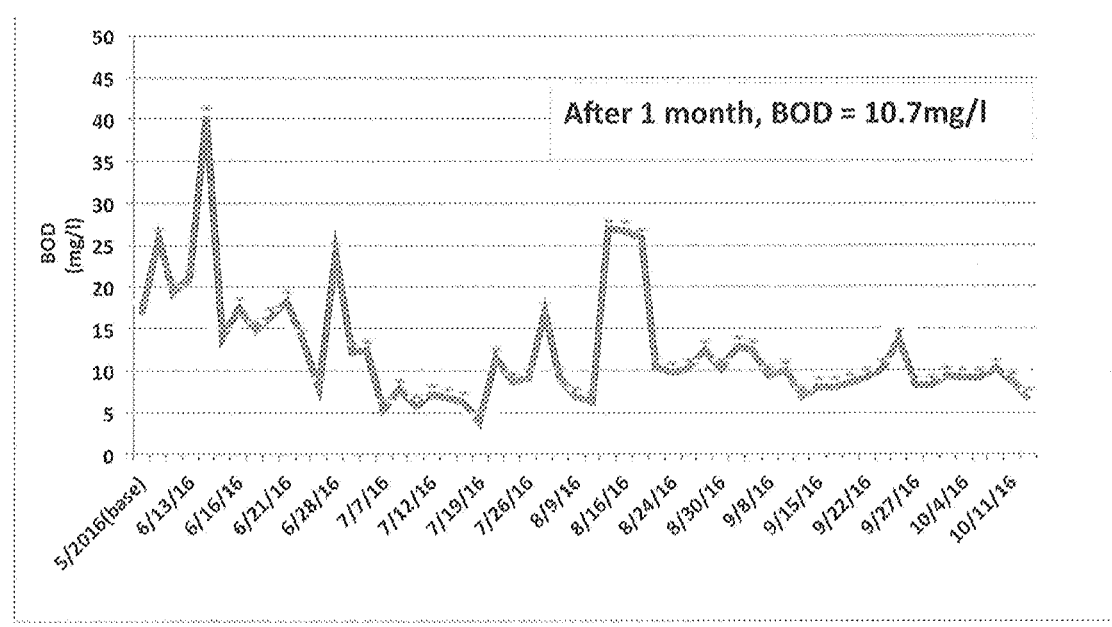
FIG. 32 is a graphical representation of BOD levels.
Figure 33:
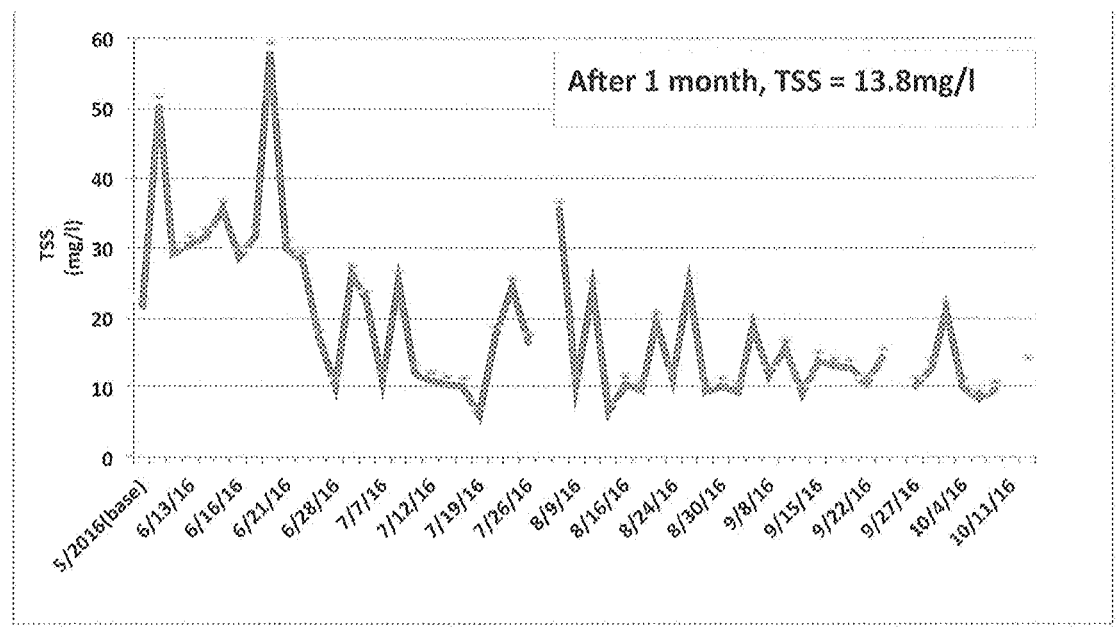
FIG. 33 is a graphical representation of TSS levels.
Figure 34:
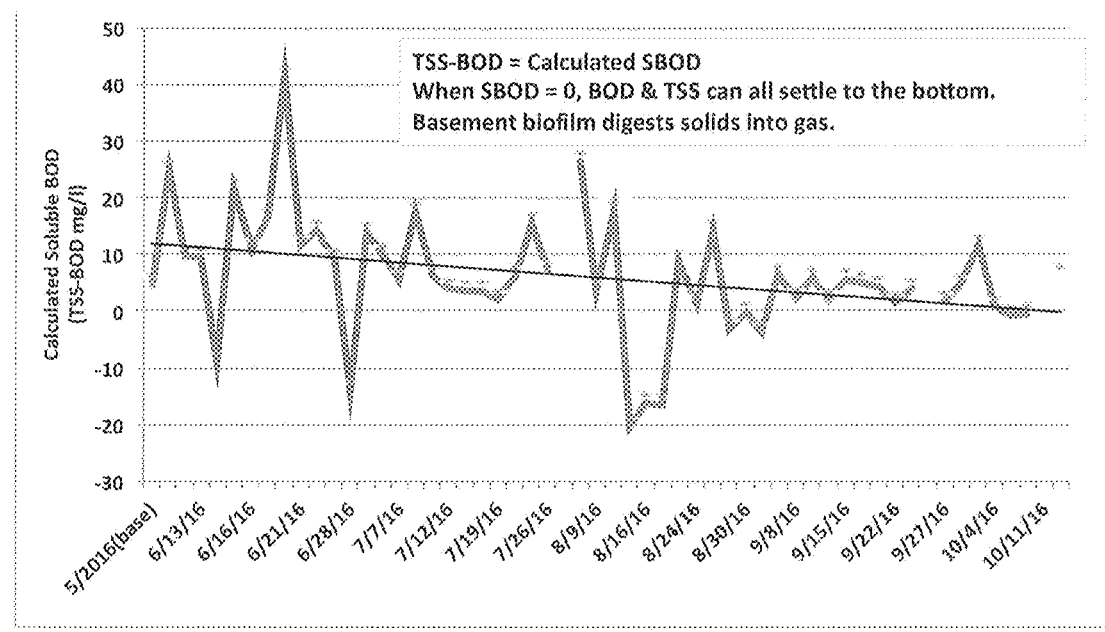
FIG. 34 is a graphical representation of TSS-BOD levels.
Figure 35:
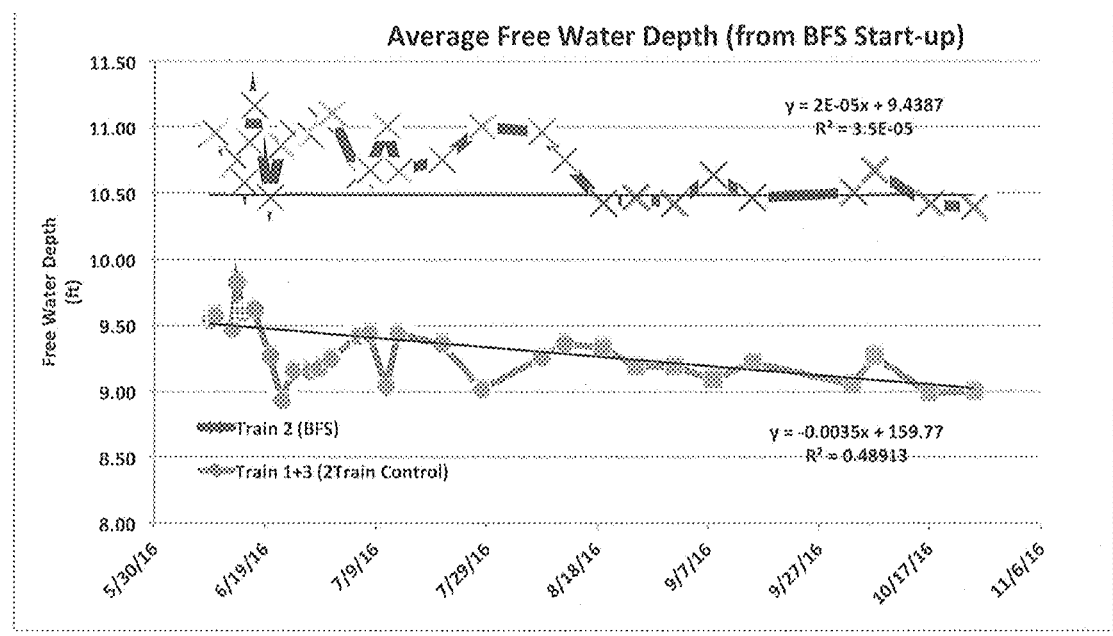
FIG. 35 is a graphical representation of free water depth of treated and untreated trains.

The image of FIG. 31 shows the three trains with direction of flow (three arrows). The central train was modified according to the present disclosure to include the elements shown in FIG. 30A. Data gathered from this second cell 3008 is shown in FIGS. 32-36.

BOD (20 mg/l)(FIG. 32) and TSS (30 mg/l)(FIG. 33) when the BFS (with perimeter flow) started up and alluvial sludge was first digested. The results calmed thereafter. Last 2 month BOD averaged 9 mg/l; TSS averaged about 12 mg/l. The metric of (TSS-BOD)(FIG. 34), "Calculated SBOD", showed a decreasing trendline coming to about zero after 6 months. This metric indicates that virtually all the BOD exists as solids, that is, that there is very little soluble BOD at the end of treatment.

In this example the depth of the lagoon was 12 feet. The sludge metric is the free water above the sludge. The upper "X" point data is the data of the central train, with the "circle" point data vertically below the arithmetic mean of the free water above the two control trains. In the first 3 months, the BFS varied up and down as alluvial sludge was digested and then sludge depth suddenly increased (i.e. free water declined) and then was unchanged thereafter. The control train free water continued to decline (i.e. sludge increased).

Figure 36:
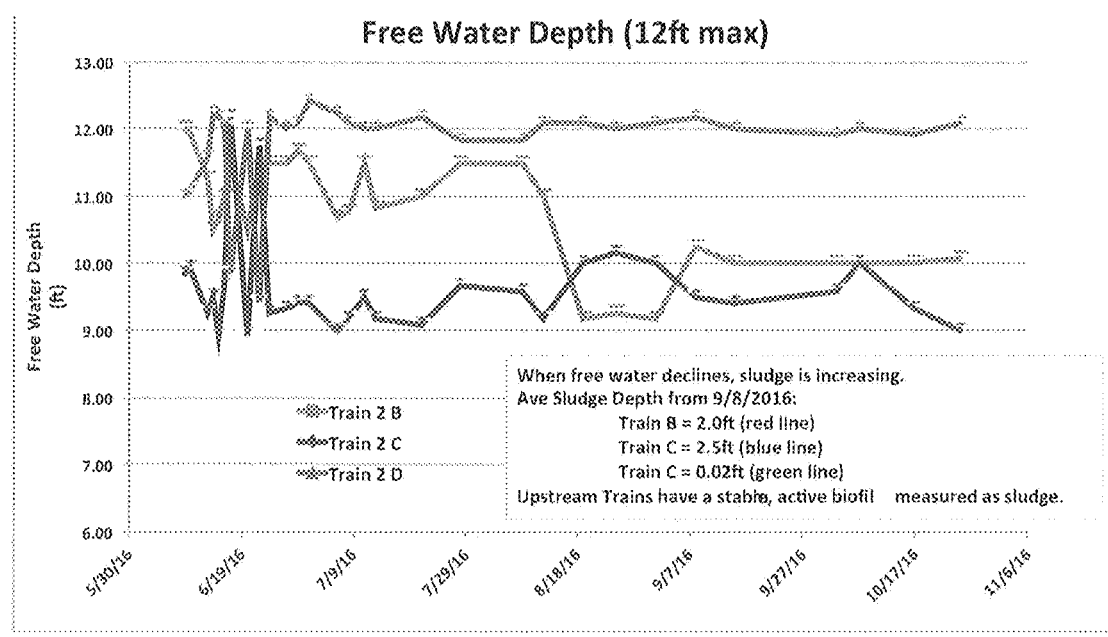
FIG. 36 is a graphical representation of free water depth of treated and untreated trains.

FIG. 36 illustrates the free water data for each of the 3 cells 3006, 3008 and 3010. Once sludge stabilized, cell 3006 had a constant 2 ft of solids, cell 3008 had about 2.5 ft of sludge and the cell 3010 had no measurable accumulation.

Based on this data it appears that legacy sludge was digested first until mid July; once the legacy load was gone, the lagoon began to clean the effluent towards 10 mg/l through mid September; when the legacy sludge was gone and the effluent was clean, then perimeter flow harvested and recirculated QS chemicals until a quorum was sensed and a relatively thick biofilm developed; the biofilm thickness reduced the free water in the two upstream cells (3006 and 3008); once the relatively thick biofilm was established, effluent further cleaned up (to ~10 mg/l) and the (TSS-BOD) difference was ~2 mg/l; this is consistent with development of an active fluidized bed; and the third cell (3010) stabilized at no measurable solids.

What differentiates the above discussed results from all others is that perimeter flows are established between adjacent circulators (hydraulic walls) and between the circulators and circumferential berms and partial depth baffles.

Figure 37:
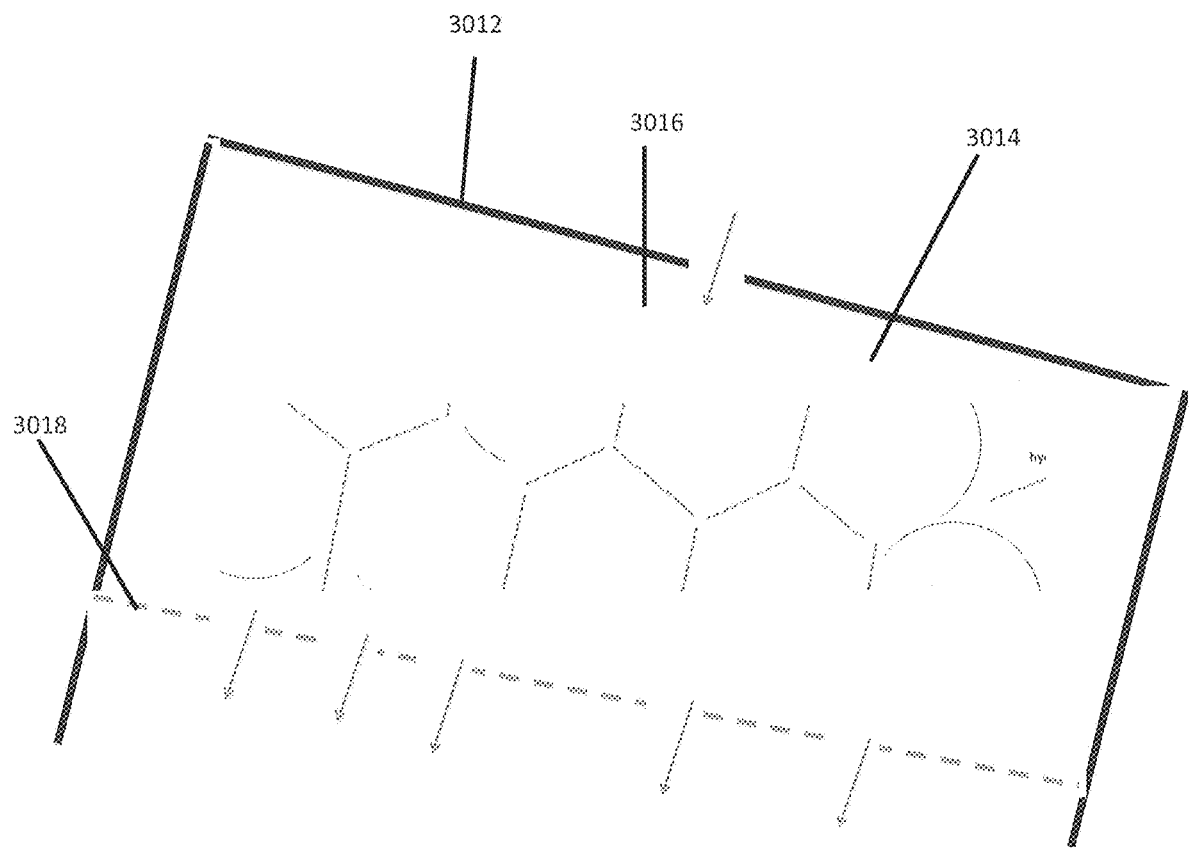
FIG. 37 illustrates a schematic plan view of a number of circulators and a partial depth baffles.

In FIG. 37, the heavy black lines labeled as 3012 are the berms of cell 3006 of FIG. 30A. The circles 3014 represent radially outflowing water at the moment of intersection with radial outflowing water from the adjacent circulator. The dotted lines 3016 are the hydraulic walls formed by the impact of equal and opposite horizontal flow vectors from adjacent circulators. Water flows down the hydraulic wall as shown in FIG. 23, across the biofilm surface and then up and into the circulator inlet.

The long, straight, partial-depth baffle (3018) redirects flow down and mostly back to the circulator inlets. Some flow escapes the perimeter flow space at the hydraulic gap between the baffle hydraulic wall and the biofilm cliff. This outflow along the surface of the downstream biofilm concentrates QS chemicals at the enclosed biofilm surface. A 2 foot fluidized biofilm bed builds up. Once the bed depth reaches its permeation limit, bed growth stops and any remaining substrate and QS chemicals flow downstream to the next cell.

The fluidized bed is measured with a flat plate attached to a calibrated pole ("weighted disk"). The measurement tool ignores free water, but sits on top of sludge>1% solids. Thus the 2% solids fluidized bed is counted equally with 10% solids legacy sludge.

As shown in FIG. 37, perimeter flow moves water in a thin film around the top, sides, bottom and up into the swirling inlet, continuously bathing the biofilm surface with moving water; most of the volume is quiescent; QS chemicals are concentrated in the recirculating perimeter flow; and high concentrations of QS chemicals are exposed to the biofilm surface.

Heterotrophic thick biofilm fluidized beds can be characterized by, for example, surface DO>0 mg/l; conductivity>800 Siemens/meter; sp. Gravity>1; pH>6; pH<7; CBOD<50% of inlet CBOD; total Solids<3 wt %; TKN>30,000 mg/l; and intra-bed ORP more negative than −200 mV.

Figure 38:
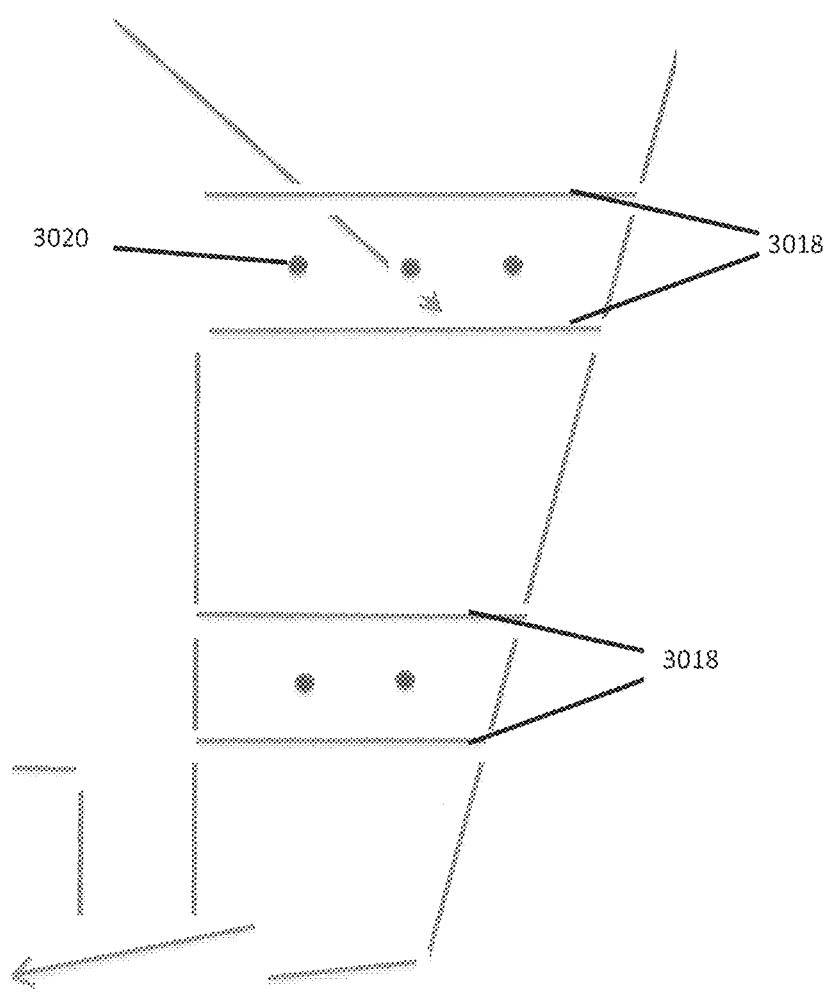
FIG. 38 illustrates a schematic plan view of a number of circulators and a number of baffles.

The principles of this disclosure can be executed in many different embodiments, such as that shown in FIG. 38. In this embodiment there are two partial depth, berm-to-berm baffles 3018 with a plurality of circulators 3020 such that the spacing between adjacent circulators and a berm/baffle is about 60 ft. In FIG. 38, the uppermost arrow indicates the inlet with the bottom most arrow indicating effluent flow from the circulation zone.

Figure 39:
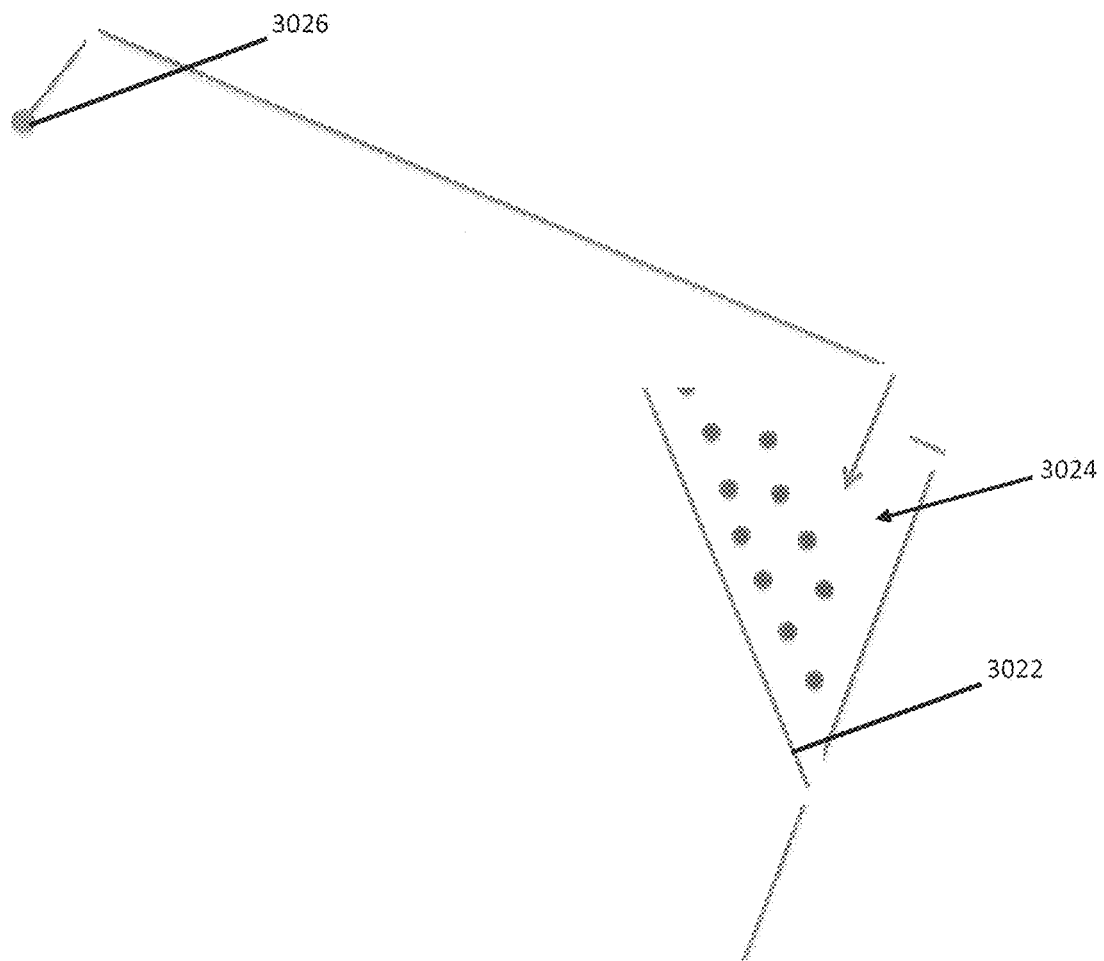
FIG. 39 illustrates a schematic plan view of a number of circulators and a partial depth baffle.

In another embodiment of the present disclosure (very large paper mill lagoon shown in FIG. 39), a corner of the 50 acre lagoon has a diagonal berm 3022 to define the perimeter flow space 3024. There is a return pump 3026 that returns 1 Million Gallon per Day (MGD) to the treatment area to provide substrate needed to support the fluidized biofilm bed. The return flow is a small fraction of the 40 MGD flowing into the lagoon. This pond has 3,500 hp of very large aerators creating sludge (not shown in this FIG.). The heterotrophic fluidized bed is a selector zone. Selected QS chemicals flow under the baffle under the surface aerators and create anaerobic biofilms to slowly digest bottom sludge.

Figure 40:
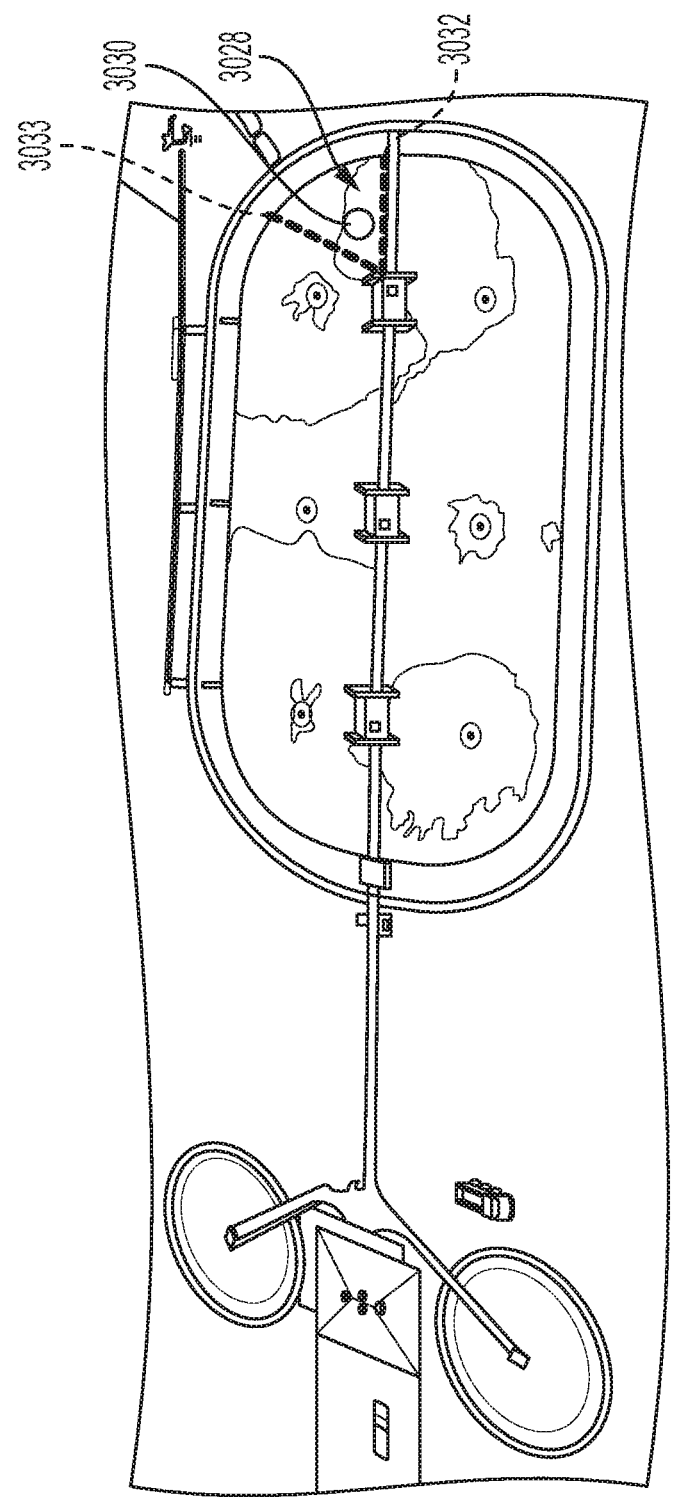
FIG. 40 is a photograph of a lagoon that includes a circulation zone and an aerated zone in fluid communication.

In another embodiment of the present disclosure shown in FIG. 40, a triangular selector zone 3028 is created adjacent to the black water inlet to the aeration basin. There is a single BF circulator 3030. Perimeter flow is established within the triangular selector zone 3028. QS chemicals escape below the partial depth baffles 3032 and encourage thin biofilms to develop around solids precipitated between surface splasher aerators.

In each of the embodiments of FIGS. 37-40 there is fluid communication between the circulated area and the aerated area in the remainder of the lagoon.

Many wastewater permits require ammonia reduction. There are at least three ways to remove ammonia; the first being to biologically sequester nitrogen in active bacteria, algae and sludge; the second being biological oxidation of ammonia into nitrite; biological oxidation nitrite into nitrate; biological reduction of nitrate into gas; the third being gas strip volatile $NH_3$ with rising gases along with pH>8 for normal volatilization and cavitation at neutral pH will remove up to 50% of free ammonia.

Biological removal of ammonia is possible after most of the carbon is previously removed. Heterotrophs (C-consumers) outcompete autotrophs (N-consumers) for DO and for attached growth surface. Commingling a heterotrophic and autotrophic strategy is problematic and unpredictable. Also biological ammonia removal is temperature dependent as these bacteria do not substantially grow @ T<5° C.

It was found that perimeter flow in combination with DO and attached growth surface can oxidize ammonia and then reduce nitrate to gas. The principles are as follows: remove carbon upstream; settle solids and digest them; create an Autotrophic Fluidized Biofilm Bed along the bottom of a confined space; aerate the space above the biofilm bed and provide attached growth surface for autotroph growth; and as autotrophs slough off the attached growth surface, they provide carbon for denitrification in the biofilm bed.

In the embodiment shown in FIG. 41, there are three in-series ponds. The influent pond 3034 has a deep end for inventorying winter sludge. Black water is treated in a boom-contained space with a cavitating circulator as described earlier. 90% of the carbon and 50% of the ammonia are removed in this space with the 2 ft deep fluidized heterotrophic biofilm bed. The deep end and shallow end are gently circulated to bring substrate to a thin biofilm to complete the removal of carbon.

The removal of carbon in water increases dissolved $CO_2$ (alkalinity). In the middle pond 3036, there is a second contained space with a circulator. Influent CBOD was removed in the influent pond 3034, but algae grow in the shallow end of pond 3034.

Some of these algae die and are digested in the pond 3036 fluidized biofilm bed. The algae grow; algae die; algae are digested strategy continues in pond 3036.

Figure 42:
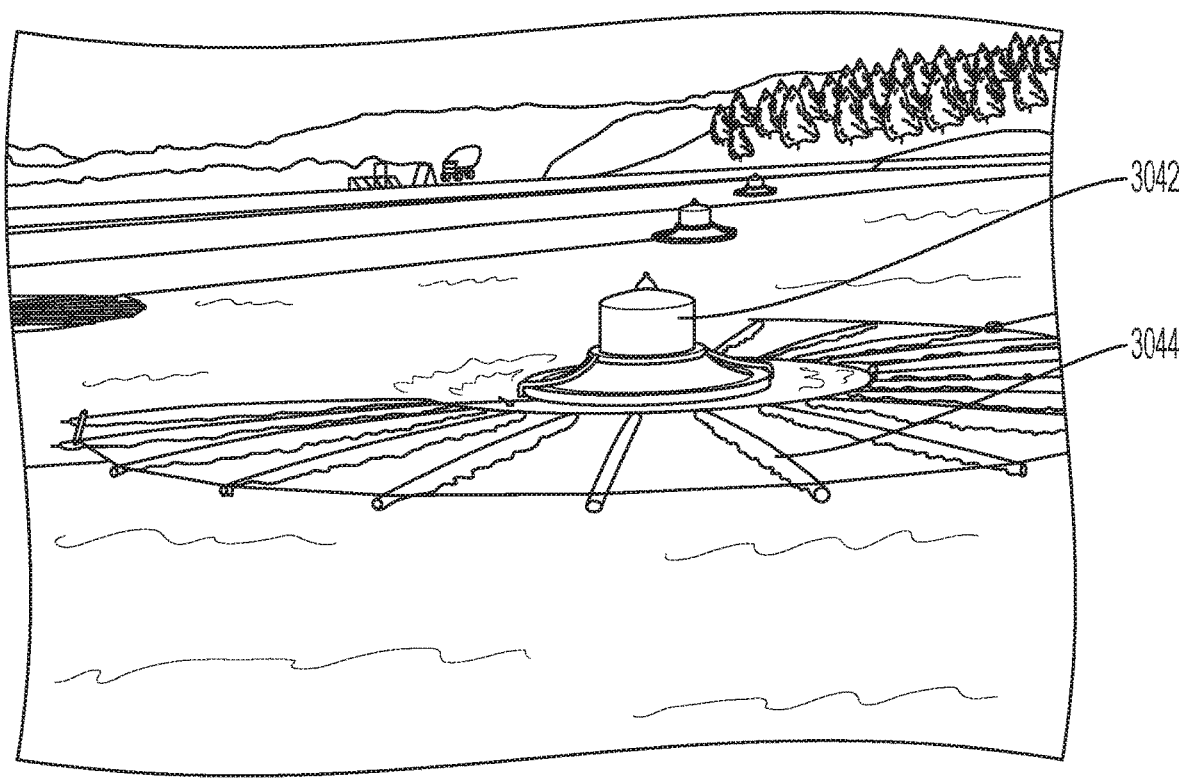
FIG. 42 is a photograph of a circulator with spokes attached thereto.

At more-than-halfway down pond 3036, there are a series of 5YF aerators 3038, each with 17 attached growth spokes, bounded on either side by parallel berm-to-berm, partial depth baffles 3040. In this example, the YFs are spaced about 45 ft from each other (centerline-to-centerline and centerline-to-berm). A photograph of a YF 3042 is shown in FIG. 42. Spokes 3044 are each, in this example, 10 ft long and hang down 30". Carbon-lean water enters the enclosed space at the biofilm/water interface.

Aerated carbon-lean, alkalinity-rich, ammonia-rich water flows past the attached growth spokes 3044. An autotrophic colony grows on the attached growth surface. Heterotrophs do not dominate because there is no organic carbon for them to digest. Aerobic grazers feed on the nitrification autotrophs, keeping the colony substantially vibrant. Slough and castings fall to the fluidized biofilm at the bottom of the treatment space. A biofilm grows on the bottom of the treatment space. It is a relatively thin biofilm, but is fluidized by $N_2$ and $NO_x$ gas produced by nitrate reduction to gas. Thus in this embodiment, an autotrophic fluidized biofilm bed is formed. It is similar to the heterotrophic fluidized bed except that there is less gas.

Figure 43:
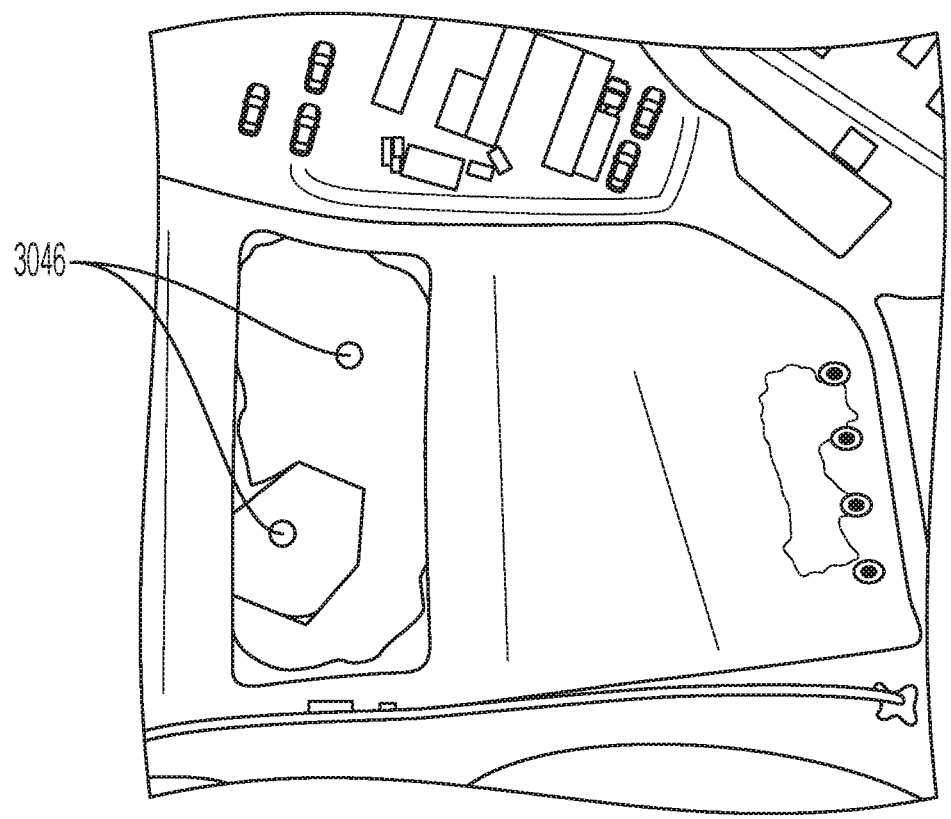
FIG. 43 is a photograph of a lagoon with two circulators therein.
Figure 44:
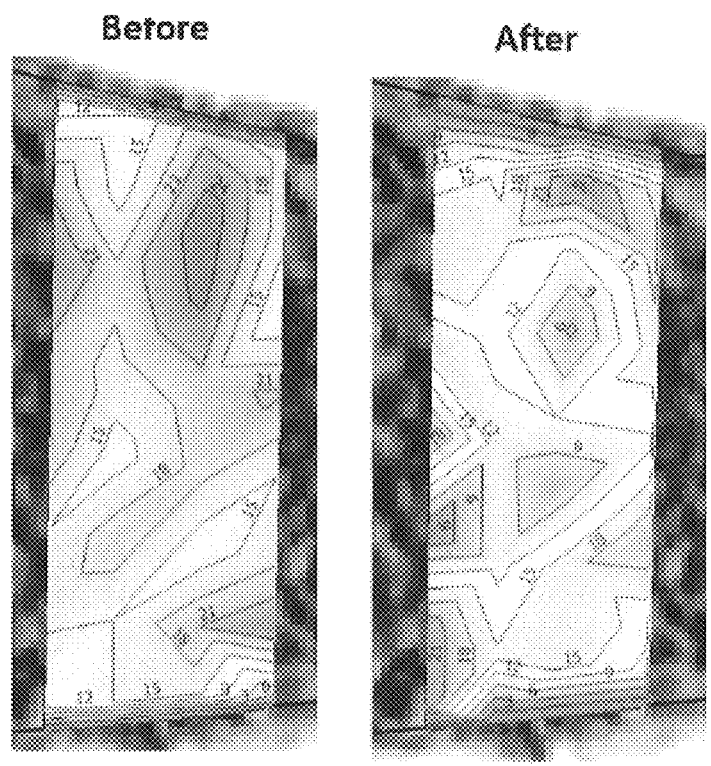
FIG. 44 is a graphical representation of sludge levels in that lagoon before and after treatment.

Another embodiment of the present disclosure is shown in FIG. 43. In this embodiment two circulators 3046 that were placed in a treatment marsh. After 95 days of operation, the circulators 3046 reduced sludge amounts by about 45%, BOD by about 40%, TSS by about 30% and reduced overall odor. FIG. 44 illustrates the before and after sludge depth in the lagoon illustrated in FIG. 43. FIG. 44 illustrates the inches of sludge measured with a Sludge Judge®.

Figure 45:
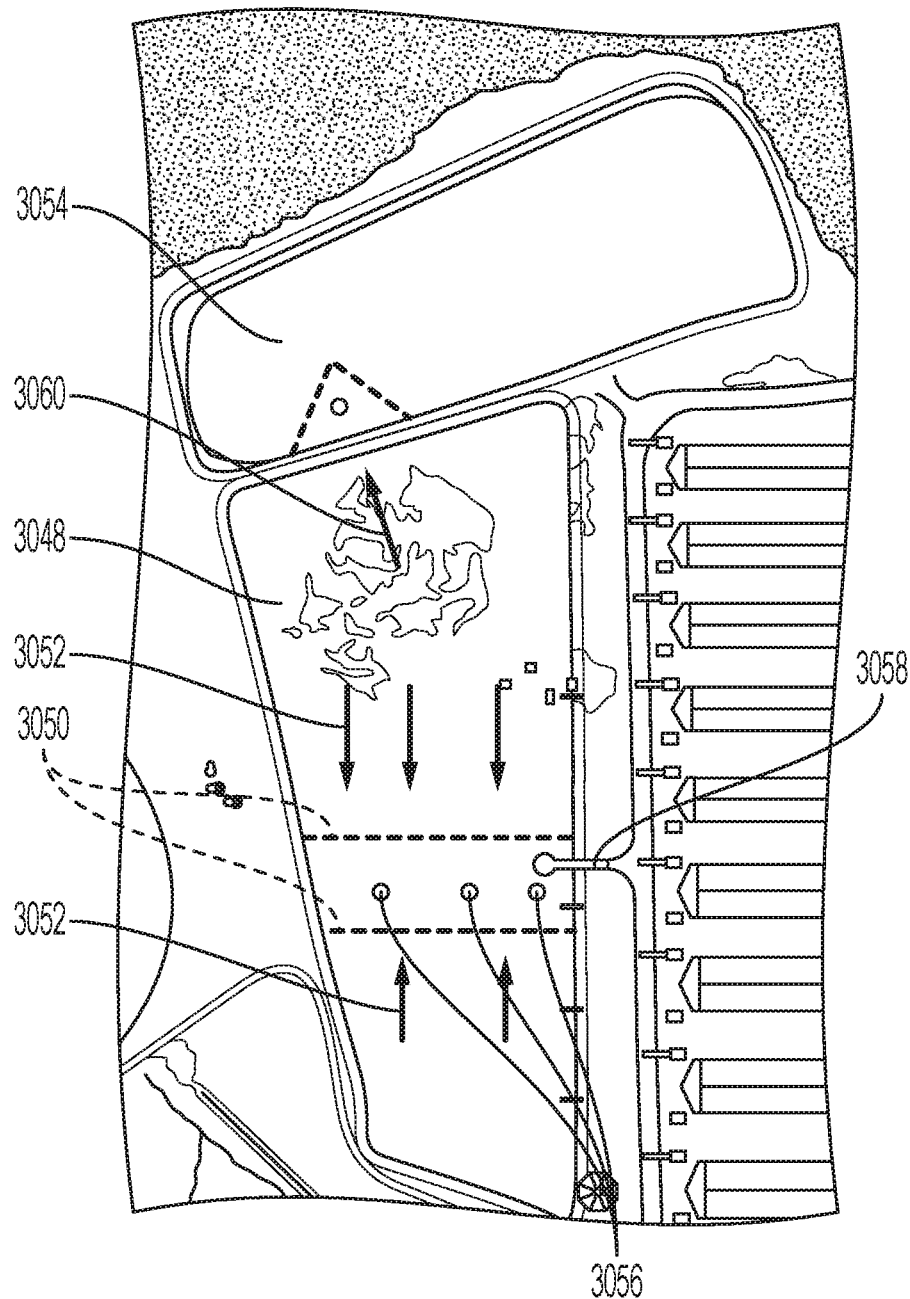
FIG. 45 is a photograph of lagoons that include circulators and baffles.

Another embodiment of the present disclosure is shown in FIG. 45. FIG. 45 is a photograph of a hog farm treatment operation that includes a middle pond 3048 that includes a treatment zone between the lines 3050. Fresh sludge migrates according to arrows 3052, and away from irrigation pond 3054. Influent flows downhill towards the treatment zone between lines 3050 and the three circulators 3056 contained therein.

Arrow 3058 is a flush return pump in the treatment zone that pumps back to flush alleys to inoculate the flush alleys with lower solids, low odor, facultative bacteria with multiple barn outlets spreading the facultative bacteria thinly across the flush alley floor. When the facultative bacteria sense oxygen, they grow about 5× faster, consuming dead anaerobes (slime) as their carbon source. The water on the flush alley has lower pH, from facultative bacterial growth producing acid. This reduces ammonia volatility inside the barn and there is a 50% reduction in hog mortality.

Thin, clarified surface water flows towards irrigation pond 3054 by arrow 3060. The irrigation pond 3054 can further digest any carry over and can be used for irrigation as needed. It is unexpected that sludge can flow in two opposing directions at the same time. Practically, this means that fluidized sludge does not flow towards the irrigation holding pond.

As used herein, a defined treatment space can be used to select for heterotrophic carbon removal upstream in a wastewater lagoon and then if the same type of treatment space is used downstream, post carbon removal, then autotrophic nitrogen removal bacteria dominate and total nitrogen (TN) is reduced to meet discharge limits.

Example 6

Figure 50:
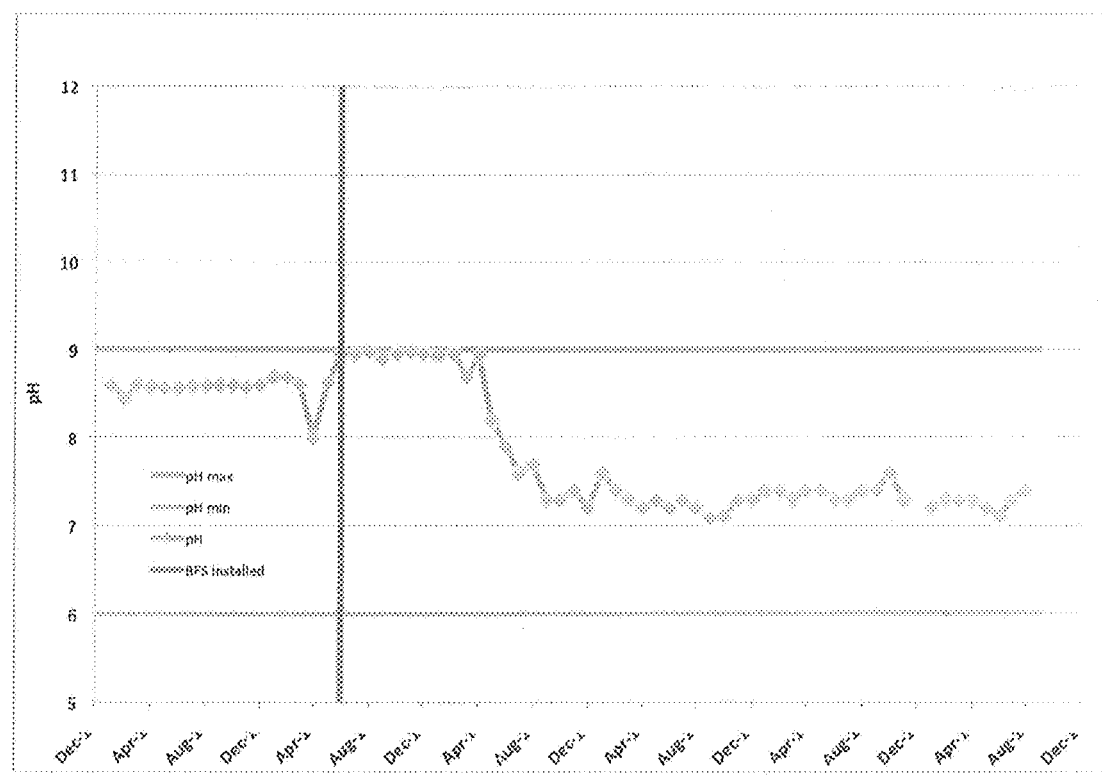
FIG. 50 is a graphical illustration of pH measurements over time.

In Example 6, Town B started full of sludge in a 5 ft pond. The terminal cell of a 4 pond system was in perimeter flow. For one year, the pH was ~9, not perimeter flow as defined herein. Over a 3 month period, the pH dropped to 7.3 and remained between pH 7 and pH 8 thereafter. An illustration of this pH is shown in FIG. 50.

Explanation of Example 6

There are four factors that determine pH in a lagoon:
133. When floating algae bloom (rapid growth), they consume bicarbonate as their carbon source. Carbonate ions and water react to form bicarbonate and caustic. The pH can rise to >10.
133. Facultative bacteria hydrolyze biosolids into fatty acid and shorted carboxylic acids, reducing pH.
133. Anaerobic bacteria consume acetic acid as they make gas, raising pH.
133. Dissolved carbon dioxide ($H_2CO_3$, $HCO_3$, $CO_3$) form a buffer. When bicarbonate is at its maximum concentration, the pH=7.5.

Wave activity from the perimeter flow circulator can create continuous sine waves that upset floating algae until their population drops and is replaced by microalgae. Microalgae move up and down the water column diurnally. When they bloom, any caustic formed is diluted and not concentrated. When sludge accumulates, hydrolysis (acid formation) is limited and pH rises. When sludge does not accumulate, anaerobes consume all the acid. The effluent pH is controlled by dissolved carbon dioxide, which then buffers in the 7-8 pH.

Town B pH was high because of excess floating algae production. When facultative bacteria hydrolyzed solids, pH fell. Waves selected for distributed microalgae. Hydrolysis and gas formation came into equilibrium as sludge was digested. The pH settled @ 7.5±0.5 as dissolved carbon dioxide had sufficient buffering capacity.

Example 7

Example 7 is an example of how to reduce the nitrogen concentration in a lagoon Total Nitrogen (TN) is defined as the arithmetic sum of organic nitrogen, ammonia, ammonium, nitrite and nitrate. Each term in the algorithm has to be reduced to meet the TN permit requirements year round.

Lagoon1 has two angled, full-depth curtains (black lines), forming 3 cells. There are 7 BFs in an equilateral disposition in Cell1 in cavitation flow. There are 2 BFs in Cell2, also in cavitation flow, followed by gas flow in Cell2.

Cell3 has 4 YFs (yellow circles) surrounded by 17 attached growth spokes (cut-away circles with black dots).

Lagoon2 has 2BFs behind a downstream partial depth baffle. There are two oblique rows of YFs with spokes, each followed by 100 ft of open water.

Lagoon3 is narrower and has 2 YFs with spokes perpendicular to the long berm. A partial depth baffle is 100 ft downstream of the YFs. A single BF (forward flow) is 100 ft from the baffle, establishing perimeter flow. There is a triangular baffle surrounding a surface effluent discharge.

The 3 pond system reduces TN to <10 mg/l.

Explanation of Example 7

The Example 7 pond system is in a CA town that is increasing the number of hook-ups to their treatment system. Each new house has to have low flush toilets. The CA regulators now require a grab sample TN<10 mg/l for permit compliance. Thus the Example 6 town has increased flow, higher concentration and tougher permit requirements, but no increase in the 17 day retention time in the three lagoons. Lagoon 1/Cell1 and Cell2 use cavitation flow to remove the CBOD<15 mg/l. Lagoon1/Cell3 uses plug flow to convert ammonia into nitrate. The plug flow strategy is repeated twice in Lagoon 2 and a third time in the beginning of Lagoon3. Ammonia-poor/nitrate rich water is redirected by the Lagoon3 baffle into the anoxic bottom of Lagoon3. When algae die, they sink. Dead algae provide the carbon needed for heterotrophs to convert nitrate into $N_2$ and $NO_x$ gases. This reduces ammonia, ammonium, nitrite and nitrate but does not decrease the organic-N stored in living algae. As shown in FIG. 47, microalgae thrive in the top 7 ft of the water column. There is clear water (i.e. low organic-N) between the 7 ft depth and the aerobic/facultative interface. The proscribed grab sample is taken in the inherently low organic-N strata. Perimeter flow brings enough DO to the floor to allow worms to commingle any remaining biosolids with non-digestible solids and expel them into the returning perimeter flow as castings.

Thus the combination of repeated cavitating flow, gas flow, repeated plug flow and perimeter flow allow the system to reduce total nitrogen to <10 mg/l.

Example 8

Modern regulatory requirements require removal of carbon, nitrogen, phosphorous, sludge and pathogens from wastewater discharges. Small towns typically have little money to invest and so have discharged their wastes into lagoons and ponds. Lagoons can do an excellent job of removing carbon, but their success in removing nitrogen and phosphorous is poor. Pathogens are typically removed with UV light or chlorine contact systems. Sludge is allowed to accumulate in ponds until it has to be mechanically dredged and sent to landfills or spread on fields. Spreading on fields is less and less acceptable because minor metals can contaminate entire fields for years.

Carbon is usually removed by using oxygen and heterotrophs to produce $CO_2$ and sludge. The $CO_2$ gas is dissolved as alkalinity; the sludge accumulates on the bottom of the lagoon. Some of the biosolids are turned into gas by facultative and anaerobic bacteria, but most just remain inert while accumulating on the lagoon bottom.

Nitrogen removal is more complex. Autotrophic bacteria oxidize ammonia into first nitrite and then into nitrate. These so-called nitrifiers do not compete well against heterotrophs. They need some external surface to attach to. They prefer shade to sunlight. Nitrifying bacteria must have dissolved oxygen>2 mg/l. They require bicarbonate alkalinity (their source of carbon). Thus nitrifiers do not grow unless carbon has already been turned into bicarbonate alkalinity. Practically, this means the CBOD (Carbonaceous Biological Oxygen Demand)≤20 mg/l.

When nitrifiers grow successfully, nitrate accumulates. Nitrate is reduced into gas ($N_2$ and NOx) by heterotrophs that are starved of oxygen, i.e. in anoxic conditions (DO<0.5 mg/l). But the heterotrophs require a biological source of carbon and this carbon was previously removed to encourage nitrifier growth. Dead algae can be the source of carbon for heterotrophic de-nitrification. Total nitrogen removal is complex.

Phosphorous removal is also accomplished. Precipitate ortho-P with cations and let them accumulate on the bottom of the lagoon. About half the ortho-P (soluble form) can be precipitated by hardness naturally in the water. The remaining ortho-P can be precipitated with alum or iron compounds.

When a system digests sludge in situ, the nutrient problem is exacerbated. Dead cells (i.e. biosolids) are 70% water and 30% other compounds. The 30% other compounds have a C/N/P ratio of about 100/5/1 plus minor elements. The water is released and the carbon turned into $CH_4$ and $CO_2$. Embedded N is released as $NH_3$ and $NH_4^+$ (ratios depend on pH). Embedded P is released as predominantly soluble ortho-P. In other words, digesting sludge makes the nutrient problem worse. However, once the legacy sludge (ancient sludge) is digested, then the nutrient release is only from incoming BOD (biological oxygen demand).

Thus, a process for nitrogen removal process in a lagoon can be:
1. Select for gas-producing granules
2. Produce continuous sine waves to inhibit floating algae and select for microalgae.
3. Remove carbon; create bicarbonate alkalinity
   a. Aerobic SBOD (soluble BOD)=biosolids+$CO_2$
   b. Anaerobic/facultative biosolids digestion=$CH_4$+$CO_2$
4. Aerate the water then pass aerated water over attached growth surfaces to incubate nitrifiers
   a. $2NH_3+3O_2=2HNO_2+2H_2O$
   b. $2HNO_2+O_2=2HNO_3$
   c. Worms grow on the aerated surface
   d. Wiggling worms dislodge nitrifiers from the aerated surface
5. Nitrifiers settle slowly and will attach to microalgae (small, typically spherical algae)
   a. The microalgae provide shade and oxygen.
   b. Microalgae diurnally move up and down the water column from 0 to 7 ft deep, indirectly keeping the nitrifiers in the aerobic water column for days.
6. The above steps can be repeated in cold weather applications
   a. Nitrifiers do not increase their population in winter.
   b. Pre-existing nitrifiers do process small amounts of ammonia in winter c. The nitrification process requires at least one warm summer to establish a critical mass of nitrifiers on the attached growth surface.
   i. In winter the nitrifiers do not die off.
7. As ammonia<1 mg/l is achieved, nitrate ($NO_3^-$) increases to >10 mg/l.
8. Water is directed downward into an anoxic zone, preferably below the microalgae migration depth
9. Microalgae below 7 ft die off from insufficient light and settle on the bottom as a hard-to-digest biosolids.
10. Heterotrophs use dead algae carbon and the oxygen tied up as nitrate to grow successfully in an anoxic environment, converting nitrate into various gases.

Figure 51:
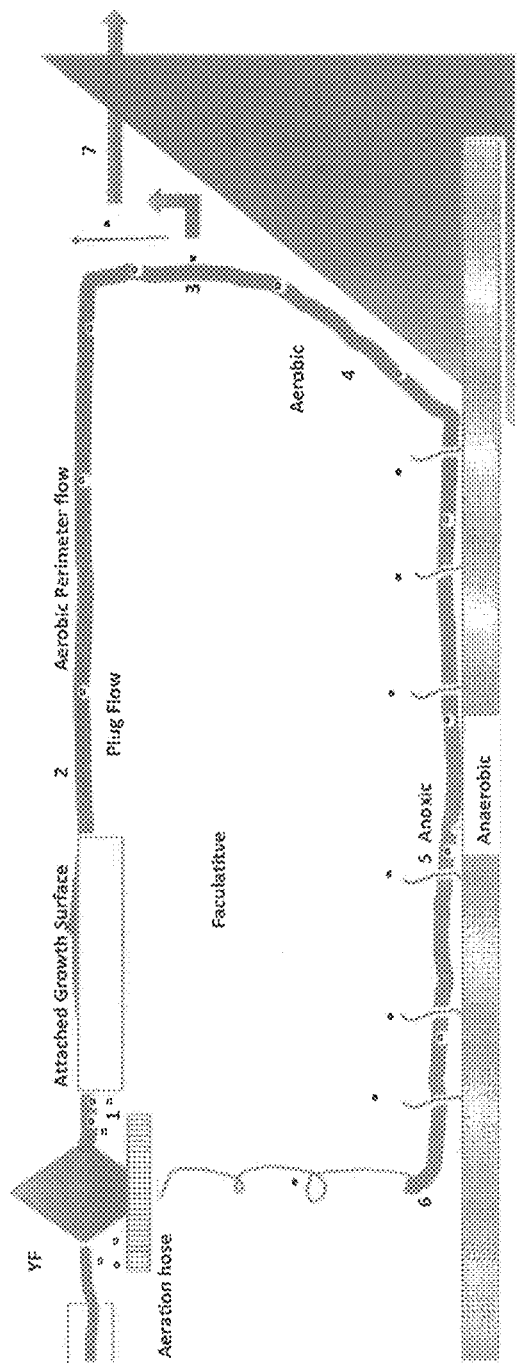
FIG. 51 is a graphical illustration of a cross section of a portion of a lagoon.

However, there is an inventive solution described below and illustrated in FIG. 51:
1. Select for carbon-digesting granules using intentional cavitation, hydraulic walls and quiescent stratification over a bed of granules.
2. Reduce CBOD (Carbonaceous BOD)<15 mg/l by allowing quiescent pond layering with a critical mass of bottom-dwelling granules.
3. Aerate the water to >2 mg/l DO with an aerating circulator.
4. Pass aerated water over attached growth surface to increase the nitrifier population
5. Create straight and parallel hydraulic walls between aeration circulators to create plug flow conditions.
a. Plug flow and a mixture of microalgae and nitrifiers reduce ammonia exponentially until either DO or alkalinity is rate limiting.
6. Return oxygen/alkalinity-depleted water to the circulator inlet at the sludge/supernatant interface
7. The anoxic conditions at the base of the water column and carbon from dead algae will reduce nitrate into gas.
8. The conditions are anoxic and not anaerobic. Worms thrive at the interface (red wiggles in sketch).
9. Their castings commingle de-nitrification bacteria and non-digestible solids into worm castings that are expelled vertically into the returning anoxic stream.
10. A fraction of the perimeter flow (i.e. flow around a "hard-boiled" egg) exit below a partial depth baffle ("under/overflow") and remove non-digestible solids as slightly increased TSS.

An inventive concept is to combine straight & parallel hydraulic walls with aerated attached growth to induce plug flow and consequent exponential decay of ammonia.

Figure 52:
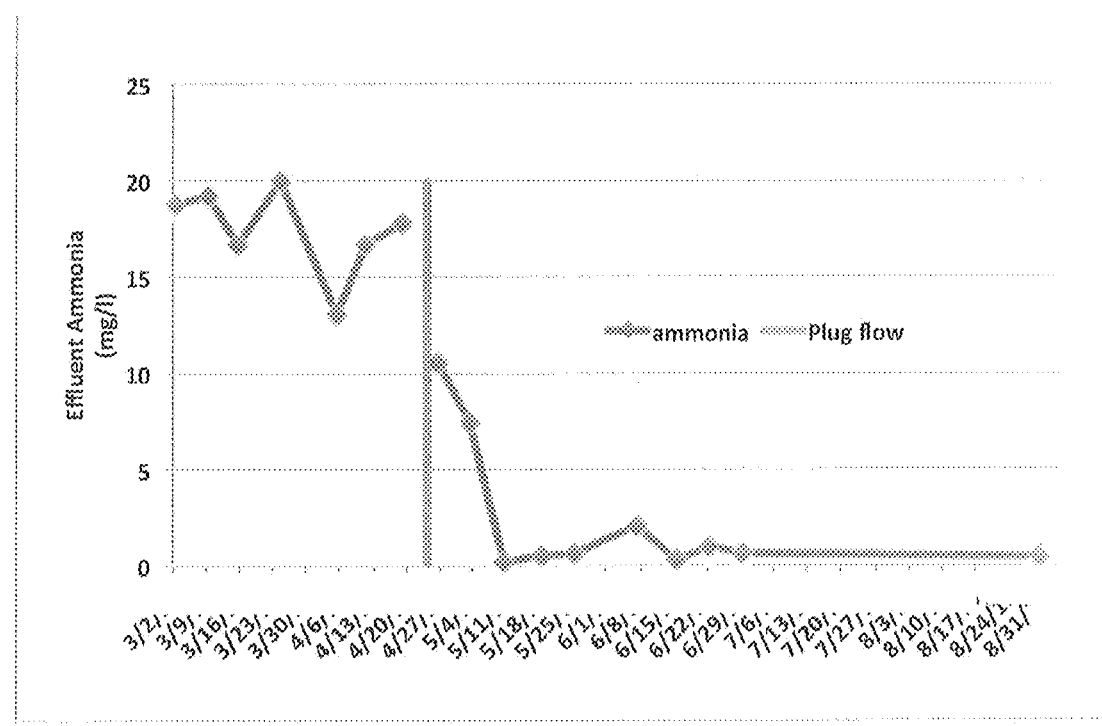
FIG. 52 is a graphical illustration of ammonia concentration over time.

FIG. 52 illustrates the dramatic and unexpected reduction in ammonia when the above method is included. In this embodiment, to the left of the vertical red line there was a floating partial depth baffle across the lagoon designed to intentionally restrict plug flow. Effluent ammonia was 15-20 mg/l. Ammonia dropped to <1 mg/l when the only change was to remove the cross-lagoon baffle.

Figure 53:
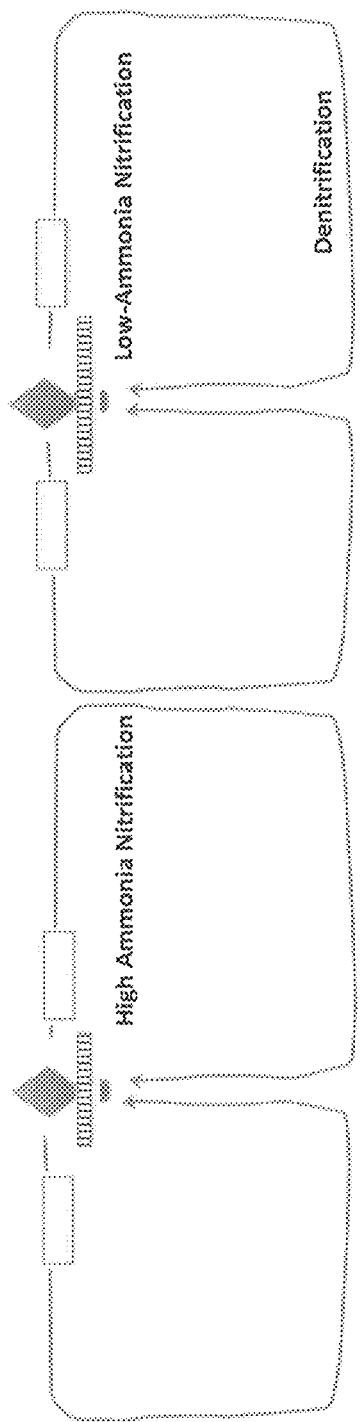
FIG. 53 is a graphical illustration of a cross section of two plug-flow systems in series.

The explanation for the 95% reduction in ammonia was the introduction of plug flow with straight and parallel hydraulic walls between each YF aerator (aeration, radial surface circulation plus 17 circumferential attached growth spokes).
1. Upstream granule formation reduced CBOD~15 mg/l.
2. Nitrifiers grew on the attached growth spokes, reducing ammonia to 15-20 mg/l (from ~40 mg/l).
3. Worms colonized the attached grow media.
4. Worm movement dislodged a fraction of the nitrifiers which then moved downstream
   a. The baffle pushed the nitrifiers low in the water column into the anoxic zone where they died.
   b. When the baffle was removed, the nitrifiers were slow to settle out of the eddy-mixed downstream surface flow.
5. The hydraulic walls are formed by equal and opposite horizontal flow vectors from each adjacent pair of circulators.
   a. Horizontal vector flow returns directly to the circulator inlet.
6. Vertical vector flow continues downstream for 4 days (depends on depth and pond dimensions) in plug flow.
7. Nitrifiers attach to microalgae that give them shade and DO.
8. Upstream CBOD digestion provides excess alkalinity.
9. Ammonia concentration declines exponentially until there is either insufficient oxygen or insufficient alkalinity (or insufficient ammonia)
10. If the permit requires low ammonia or cold weather ammonia reduction, then the plug flow process is repeated until the permit limit is reached.
11. FIG. 53 shows two plug-flow systems in series, each with straight hydraulic walls. Skilled artisans know that many more systems can be added, each with an exponential reduction of ammonia. Thus extremely low ammonia levels can be achieved in lagoons.
12. After a plurality of sequential plug flow systems, ammonia can increase.
   a. If the plug flow system does not extend hydraulically from side-berm to side-berm (i.e. with <150 ft from side-berm to circulator centerline), then floating algae can thrive along the berm and actually fix atmospheric $N_2$ into ammonia.
   b. As de-nitrification proceeds, some of the heterotrophs die and are digested, releasing ammonia back into the water column.
   c. To offset this, the end circulators in a straight line of YFs with attached growth spokes are 100 ft or less from the side-berm plus one "extra" line of YFs, attached growth surface and straight and parallel hydraulic walls are added.
      i. This provides protection from ammonia peaks and also from cold-water reduction in nitrification kinetics.

Some water quality permits are written in terms of TN (total Nitrogen). TN is defined as the arithmetic sum of organic-N, ammonia, ammonium, nitrite and nitrate. When the ammonia is very low and the nitrite/nitrate is also very low, organic-N has to be addressed. Organic-N is the nitrogen associated with bacterial cells and algae. Because the CBOD is low to remove bulk nitrogen, algae have to be controlled to reduce organic-N.

The issue is that algae are needed to provide oxygen for nitrification and dead algae for de-nitrification. The inventive solution is to discharge effluent from below the algae/no-algae depth in the water column. This is done with perimeter flow and under/overflow.

Figure 54:
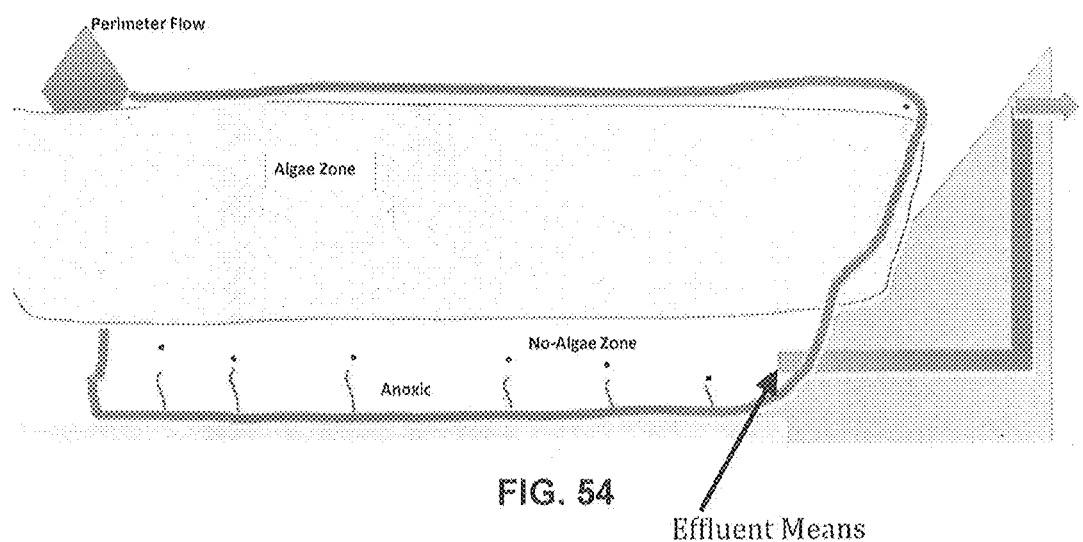
FIG. 54 is a graphical illustration of a cross section of a portion of a lagoon with an effluent means.

A single circulator, in one embodiment, pushes about 7MGD towards the effluent means, as shown in FIG. 54.

The inlet into the effluent means is deeper than 7 ft, the diurnal extent of microalgae's range up and down the water column. This lowers organic-N so that TN limits can be met, for example TN<10 mg/l.

Figure 55A:
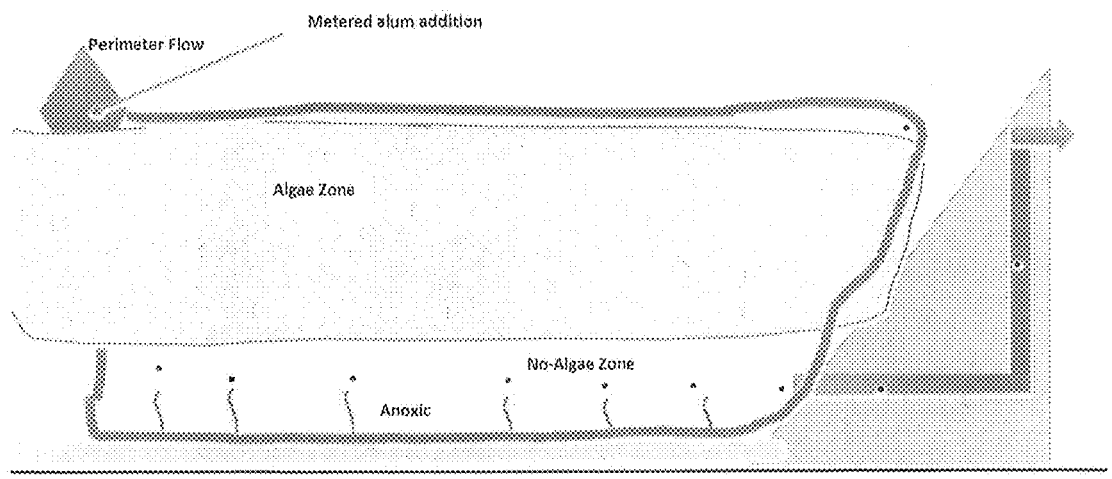
FIGS. 55A and 55B are graphical illustrations of alum addition into a circulator.
Figure 55B:
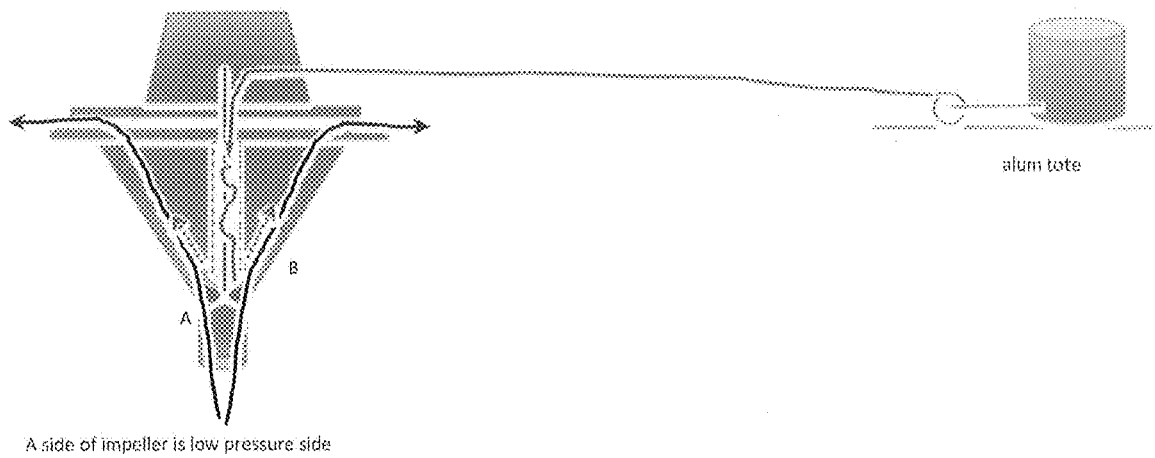

Some permits now require low Total Phosphate (TP) in lagoon effluent. This is met by metering a solution at any suitable concentration and volume, such as at least one of aluminum sulfate (alum), ferric chloride, poly aluminum chloride, ferrous sulfate and lime, into the mixing zone of the single circulator, as shown in FIGS. 55A and 55B. In FIGS. 55A and 55B, alum is used as an example.

In FIG. 55A, the general location of alum addition is shown, with FIG. 55B proving a more detailed view of alum addition. In FIG. 55B a metering pump delivers alum solution from the alum tote (or storage vessel) to an annular space within the circulator (shown as a white space in FIG. 55B). The shaft then turns, with the alum dripping down through the annular space and onto the higher pressure side of the impeller. This alum is directed to inside the inverted cone and mixes with water, eventually forming alum phosphate crystals that can form and then sink to the bottom of the lagoon.

In this embodiment, the circulator has a rotating shaft inside a non-rotating plastic chassis, creating an annular cylinder there between. Alum solution is metered into and then runs down the annular space until it hits the impeller hub. The rotating hub slings the solution into the mixing zone creating conditions for alum/phosphate precipitation. The alum/phosphate crystals become non-digestible solids. The worms in the worm farm commingle alum/phosphate, other non-digestible solids and any organic biosolids into worm castings. The worm castings are expelled vertically where they are entrained in returning perimeter flow. Eventually a fraction is continuously bled into the effluent stream as increased TSS.

Figure 56:
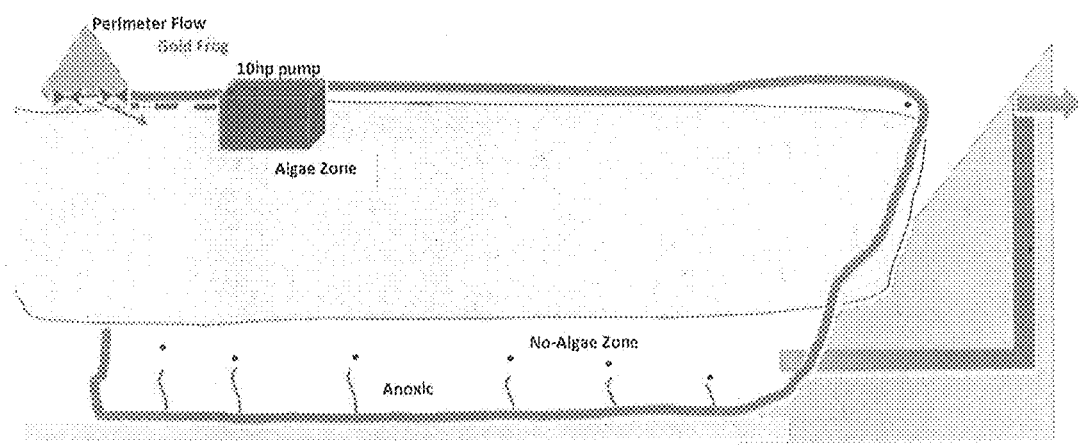
FIG. 56 is a graphical illustration of a cross section of a portion of a lagoon.
Figure 57:
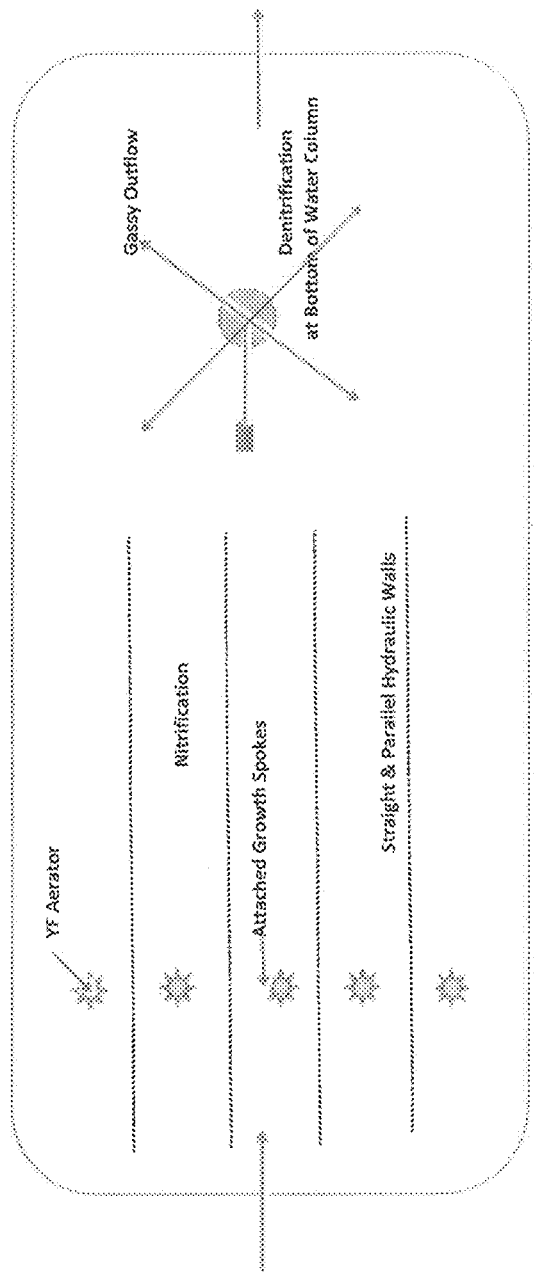
FIG. 57 is a top view of a portion of a lagoon.

In an alternate embodiment in which there is insufficient denitrification carbon from natural algal death, the GF circulator with impinging venturis is used to lyse half the algae, as shown in FIGS. 56 and 57. When algae are lysed by shear, CBOD is increased (soluble carbon), TSS is decreased (loss of internal water) and nutrients increase (embedded N&P released). The CBOD is used to for anoxic denitrification as perimeter flow returns along the bottom/supernatant interface.

Since the GF perimeter flow is the terminal cell in the treatment process, upstream nitrifiers transfer into the GF perimeter flow cell. Ammonia is oxidized into nitrate in the surface outflow from the aerator. The net effect is a reduction in TN and a slight increased in CBOD.

Example 9

In a growing town with a multi-lagoon treatment system, water is percolated into ground water from up to 4 unlined ponds. In this example the number of circulators (BF or GF) are provided as examples only, and can range from 1 to 20 in any portion of any of the discussed ponds. Also, each partial depth boom or baffle is optional.

Figure 58:
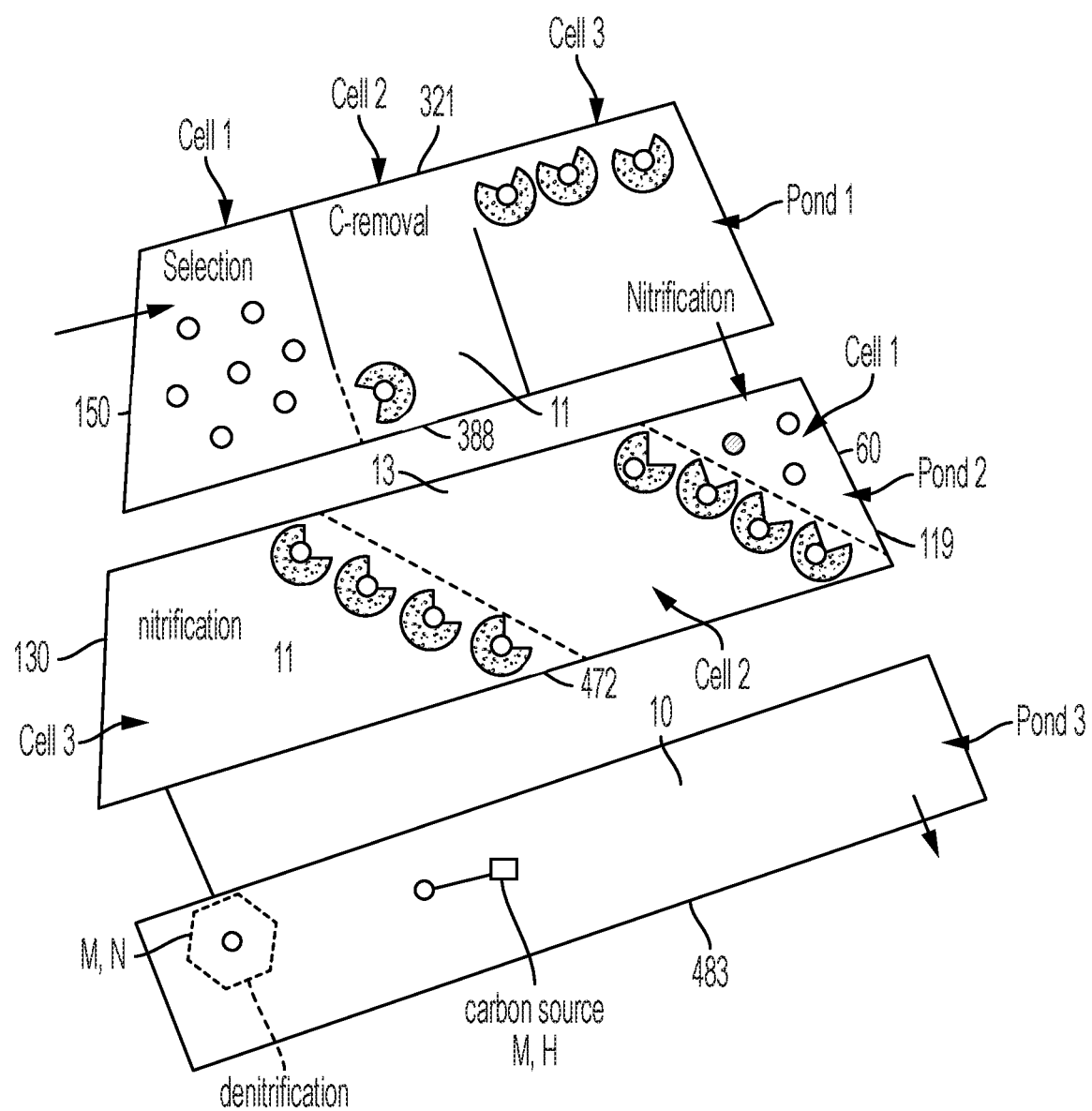
FIG. 58 is a graphical representation of a top view of a three pond treatment system

Raw wastewater is ground and then power screened before permeate enters the treatment ponds, as shown in FIG. 58. Pond1 was recently idled and cleaned. Upon restart, two full depth curtains (solid lines) that extend 70% of the distance across P1 will divide P1 into Cells1, 2 & 3. P2 was dredged over a decade ago. There are 5×10 hp aerators. The ponds are 11 feet deep. The detention time in P1+P2+P3 is ~20 days.

The City is expanding (+0.114MGD). The new hook-ups will have low flush toilets, so the influent BOD concentration will rise (assume 350 mg/l). The State Regulators have tightened the nutrient requirements and now demand Total Nitrogen≤10 mg/l (TN=organic-N+ammonia+nitrite+nitrate). The system is currently producing about 15 mg/l TN with about 5 mg/l nitrate before the influent change. The percolation ponds produce organic-N as algae. Salt concentration is also a State requirement. Drinking water has a chloride concentration at almost the discharge requirement, so even a slight reduction in salinity adds value.

The new cells in Pond1 are used to perform the first steps of the nitrogen removal strategy.

Cell1 receives raw water. There are 7 BFs (reverse mode, vertical inlets)(shown as dark circles in cell 1, pond 1) arranged in a regular hexagon (a series of equilateral triangles) that select for granules and convert CBOD into $CH_4$ and $CO_2$. The $CO_2$ dissolves in water as alkalinity.

Cell1 will produce SBOD as a byproduct of intense gas formation. At the end of the first curtain there is a 66 ft floating partial depth boom (dashed line). Its role is to force Cell1 effluent, with its SBOD load, to leave at the base of the water column.

Granules migrate into Cell2 under the boom.

There is a single YF with 17 attached growth spokes (single circle with semicircle surrounding it in cell 2, pond 1) "guarding" the boom. In this example, each circulator includes a semicircle of growth spokes, but in other examples, the growth spokes can fully surround the circulator, or can partially surround the circulator, with their dimensions modified as desired. The role of the circulator in cell 2 pond 1 is to convert SBOD into TSS. Cell2 is otherwise quiescent. The water column forms specialized layers that convert CBOD into gas. An important step occurs at the aerobic/facultative interface. The aerobic layer surface tension is about twice the facultative surface tension. Surface tension controls bubble size, bigger bubbles below the interface, smaller bubbles above. As an individual bubble passes the 3" thick interface, the bubble becomes unstable and cavitates. The bubble violence lyses falling TSS, releasing the cells' internal fluids. CBOD becomes methane and alkalinity.

Water enters Cell3, pond 1 with little CBOD. Nitrifiers are incubated on the attached growth surface. Worms forage on the nitrifiers but dislodge many of them. Released nitrifiers attach to microalgae that keep nitrifiers in the aerated plug flow water column for days. Three YFs with 17 attached growth spokes are clustered in a substantially straight line (three circles with semicircles surrounding them in cell 3, pond 1). This forces water to flow down Cell3, pond 1 in plug flow. Nitrate is produced until the oxygen is consumed.

Water then enters Pond 2 and the Pond2/Cell1 granule selection zone (3BFs shown as three dark circles in an equilateral triangle configuration with about 48 ft sides).

Sludge digesting granules begin to digest the Pond2 legacy sludge and produce SBOD) carbon for denitrification. A 7×22 ft partial depth boom (dashed line) separates Cell 1 from Cell2 in pond 2. Four YFs, each with 17 attached growth spokes, (four circles with semicircles surrounding them) are aligned linearly along a diagonal. This asymmetric layout allows plug flow from inlet to outlet in Pond2.

A second 8×22 ft partial depth boom (dashed line) separates Cell2 from Cell3. The boom also allows Cell2 plug flow to extend until the dissolved oxygen is exhausted. Cell3 repeats Cell2, but this time, low ammonia inhibits nitrification.

Water flows into unlined Pond3 into an octagonal floating boom (dashed line) surrounding a single BF (single dark circle) (forward mode (7MGD), vertical inlet).

There are 7×22 ft lengths of boom (the berm is the "$8^{th}$" section). The purpose of this continuously stirred tank reactor (CSTR) is to force influent into the anoxic bottom zone of Pond3 for denitrification.

In the inlet third of Pond3 is a single GF (single circle by the term "carbon source") (mix mode, horizontal inlet), about 100 ft downstream of the BF in the BF/CSTR. Its role is to rupture half the surface algae, releasing SBOD carbon for denitrification. The horizontal inlet keeps the algal killing confined to the top three feet of the water column. CBOD increases to about 20 mg/l. When algae are ruptured using intense cavitation, the omega3fats that algae produce are hydrolyzed into fatty acid soap. This lowers the surface tension by about 17.5%. Wetter water increases the percolation rate in Pond3.

The CBOD feeds the denitrification heterotrophs. Horizontal inlets keep DO from the bottom layer. Lower surface tension helps drive salty bottom water through the Pond3 soil, potentially lowering sample salinity.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

APPENDIX

The following provides more detail as to what is believed to be the biochemistry involved in the process described in the present disclosure. Without wishing to be bound, it is believed that:

1. The impeller rotates so as to push water down and out.
2. The chassis rises up as water is pushed down (equal and opposite reaction).
3. The radial annular opening rises above the waterline, ingests air and the impeller loses its prime.
4. The chassis crashes down, covering the annular opening with water.
5. The heel of water and the ingested air are whipped into froth by the impeller.
6. The froth density is lower than the surrounding water density and flow reverses.
7. Gas-free water flows past the impeller the "wrong way", causing intense cavitation (and shear) at the tip of the impeller.
8. Prime is regained and flow is down and out again.
9. The process cycles every 6seconds.
10. Cavitation bubble-collapse and re-formation stretches water molecules to the breaking point, forming free radicals (for example, ·OH and ·H).
11. Cavitation also causes mineral crystals to nucleate when the solution is supersaturated.
12. If the pH $\geq 7.5$, $CO_3^=$ anions are formed and $CaCO_3$ seeds form.
13. Free radicals are among Nature's most energetic chemical entities.
14. The free radicals attack the bacterial cell wall and lyse it.
15. BOD increases slightly because BOD-rich intracellular fluid is released.
16. TSS declines significantly because the deflated sac has less mass.
17. Intracellular enzymes (protease-rich) are also released.
18. The $CaCO_3$ seeds are coated with a bacterial biofilm.
19. The bacteria secrete EPS, making the surface sticky.
20. Coated seeds agglomerate together and form lagoon granules.
21. The lagoon granules organize themselves based on the free ammonia in "hydrolytic brine" surrounding the granules at the bottom of the lagoon.

22. The brine is concentrated and rich with intracellular enzymes and extracellular enzymes.

a. Normally sludge digestion is rate-limited by hydrolysis (with extracellular enzymes only). Solids accumulate.

b. By adding intracellular enzymes to the extracellular enzymes, the rate of hydrolysis exceeds the rate of sludge accumulation. Solids are liquefied.

23. Lagoon granules convert hydrolyzed liquids into gas via 3 pathways.

a. $H_2$ pathway b. Acetate pathway c. $CO_2$ DIET pathway

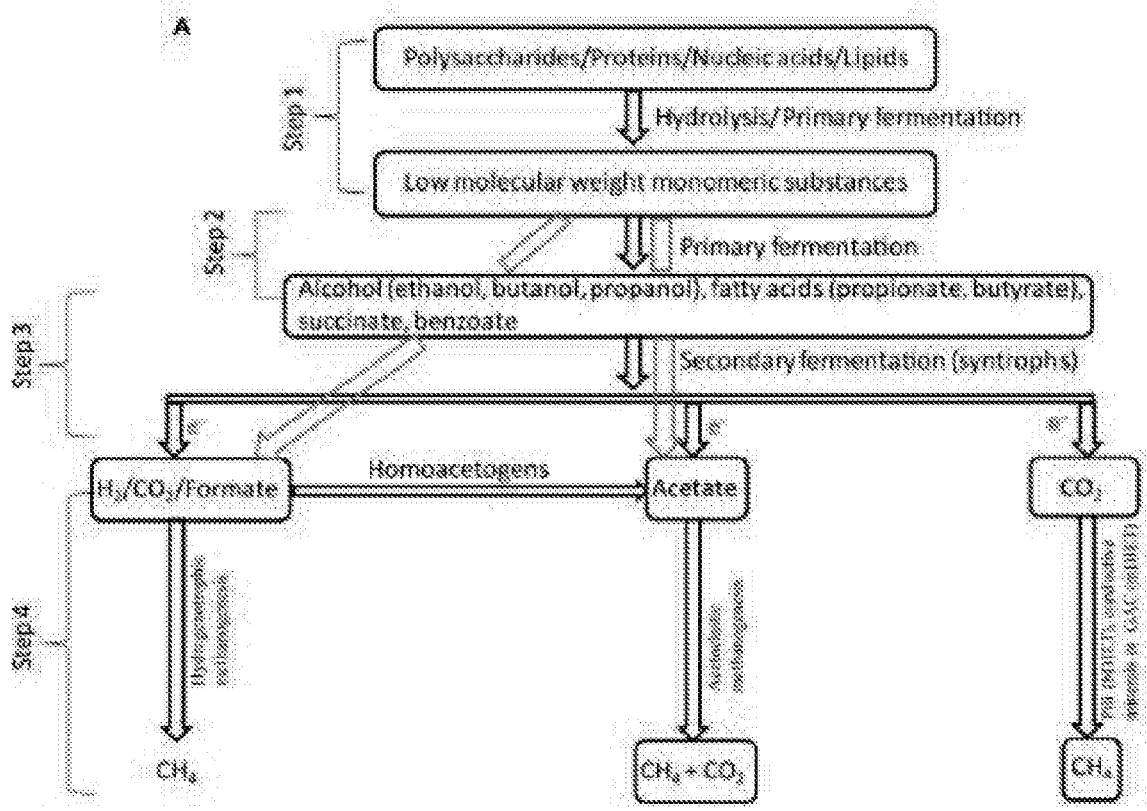

24. The pathways are selected by free ammonia.

a. Free ammonia is toxic to bacteria, but each has a different MIC (minimum inhibition concentration).

b. The DIET pathway (Direct Interspecies Electron Transfer) is particularly susceptible to free ammonia inhibition.

c. For the DIET pathway to be dominant, free ammonia must be low.

d. Temperature, pH and mass of total ammonia nitrogen (TAN) control free ammonia.

i. Rising produced gas strips $NH_3$-N from the brine, lowering TAN ii. Stripped $NH_3$-N consumes $OH^-$, lowering pH $NH_4^+ + OH^- \rightarrow NH_3 \uparrow + H_2O$ iii. Coldest water at bottom iv. Colder water = lower $NH_3$-N v. Intermediate VFA (volatile fatty acid) reduces pH e. Lower pH reduces free ammonia, reducing ammonia stripping and raising pH.

$$NH_3\text{-}N = TAN/(1+10^{(pKa-pH)})$$

$$pKa = .0918 + [2,729.92/(Temp\ (°C) + 273.15)]$$

f. New $CaCO_3$ seeds are formed at the biogas bubble/supernatant interface, also removing free ammonia.

i. The pH can be <6.5 in this reaction.

ii. $Ca^{2+} + H_2O + [2NH_3 + CO_2]_{gas} \rightarrow 2NH_4^+ + CaCO_3$ iii. This is the propagation reaction because new seeds form @ pH <6.5

The biochemistry, with an aerobic bottom, such as a natural lake is slightly different:

1. Microalgae convert alkalinity and sunlight into DO and algal mass.
2. Zooplankton predators consume microalgae, creating a balanced system that controls pH, DO and TSS.
3. Algal DO supports an aerobic community that consumes dead algae and any other detritus that accumulates on the pond floor ("detritovores").
4. The water column clears.
5. Worms feed head down/tails up.

6. Worms shoot castings (including non digestible ash) up into the water column where they exit as part of the effluent stream.
7. TSS increases slightly.
8. There is no visible sludge in the downstream section of the terminal pond.

Ammonia removal is a more complex algorithm.

1. Ammonia enters the system as free ammonia, as protein or embedded in TSS.
2. When ancient sludge inventory is digested in situ, ~5% of the biosolids mass becomes ammonia.
3. Ammonia dissociates into volatile free ammonia ($NH_3$) and protonated ammonia ($NH_4^+$).
    a. The equilibrium is determined by temperature, pH and salinity.
    b. Free ammonia is toxic; protonated ammonia is not.
4. Free ammonia can be mechanically stripped out of the system by produced gas.
    a. At normal municipal pH, temperature and salinity, the free ammonia is a tiny percent of the total ammonia.
5. Intentional cavitation removes 50% of the ammonia.
    a. Hypothesis:
        i. Cavitation creates micro hot spots that vaporize free ammonia (see section on "The Blue Frog Circulator")
    b. When the BF circulator operates in series (in a CSTR), there is a serial 50% reduction step for each repetition.
        i. 1BF/CSTR = -50%
        ii. 2BF/CSTR = -75%
        iii. 3BF/CSTR = -87.5%
6. Some regulations require ammonia levels lower than can be achieved by gas stripping alone.
7. Nitrification autotrophs do not compete favorably with carbon removing heterotrophs.
8. Nitrification has to occur late in the process when most of the CBOD is gone.
9. The carbon source for autotrophs (alkalinity) is the same as for algae growth.

a. Thus algae and nitrifiers compete for the same alkalinity.

b. Controlling algae leaves sufficient alkalinity for nitrification.

10. The BFS clarifies the upper part of the water column, so that there are very few MLSS organisms.

a. Upstream pond levels may drop as upstream TSS falls (viscosity and density are reduced).

i. In fixed pipe/gravity transfers, head pressure (upstream pond elevation) drops to balance higher flow from thinner water to reestablish equilibrium.

11. To biologically reduce ammonia, the Yellow Frog aerator is surrounded by 17 x 10' floating spokes, each of which has about 30 inches of submerged attached growth matrix.

a. The shaded matrix is populated with nitrifiers (after one warm summer to initiate colonization) that oxidize ammonia to nitrate.

b. Grazers (e.g. chironomids and worms) clean the matrix and keep the autotrophs in exponential growth.

12. The worms slough off the nitrifiers that then flow downstream.

13. The nitrifiers attach to microalgae for shade, dissolved oxygen and diurnal migration up and down the water column (0 to about 7ft).

14. When linear adjacent circulators with aerated spokes are spaced at about 48ft centerline-to-centerline distance, extended parallel hydraulic walls form equidistant between adjacent circulators. The hydraulic walls "recycle" equal and opposite horizontal vector flow back to the circulator inlet, leaving only vertical (downstream) flow vectors. This means downstream flow resembles plug flow.

15. Plug flow reactions have an exponential decay of reagent concentration. For example, ammonia, dissolved oxygen and alkalinity all decline exponentially. Any or a combination of reagents may become rate limiting. In fact, when the aerator/attached growth/plug flow regime is repeated, different reagents can be rate limiting in different plug flow reactors.

16. In the first plug flow reactor, dissolved oxygen is usually rate-limiting. The second plug flow reactor gets a fresh dose of oxygen. By the third in-series plug flow reactors (with added DO at the start of each reactor), ammonia is usually rate limiting.

17. Alkalinity is often rate limiting in the prior art because so much carbon is tied up as sludge (it takes 7.14pounds of alkalinity to convert one pound of ammonia into nitrate). In the inventive embodiment, sludge carbon is converted into methane and alkalinity so there is always excess alkalinity. This distinguishes this invention over prior art nitrogen removal processes.

18. Denitrification cannot happen after nitrification without a fresh influx of carbon. Carbon had to be reduced to allow nitrifiers to compete successfully and now new carbon is needed in anoxic conditions to convert nitrate into $N_2$ and $NO_x$ gases.

19. Dead algae are an available cheap form of carbon. Microalgae live and die in the top 7ft of the water column. Algae below 7ft die from lack of light and fall to the bottom of the water column.

20. Normally microalgae rise to the surface and receive light energy and release occluded oxygen. By releasing occluded gas, the now-heavy microalgae sink to the 7ft level where they digest the light energy and alkalinity to produce algal mass and more oxygen. As oxygen waste gas is expressed, the increasingly gassy alga rises and the cycle repeats.

21. Granules digest dead algae into carbon, more ammonia and electrolytes. This carbon is the carbon used by heterotrophs in an anoxic environment. The oxygen the heterotrophs need is tied up in nitrate ($NO_3^-$).

22. Algae growth can be manipulated to reduce ammonia in other ways. In winter, algae grow slowly but sequester ammonia as algal protein. TSS increases. In summer algae grow rapidly increasing TSS dramatically (algae bloom). The GF can rupture half the algae, lowering TSS, but increasing ammonia. At warm temperature biological nitrifiers will convert ammonia into nitrate. Thus the GF on (warm)/off (cold) is an ammonia removal control tool.

23. Further included in this disclosure is a method to reduce the mortality of animals in a Confined Area Feeding Operation (CAFO) by biologically lowering the pH of water flushed over a surface using anaerobic water that has passed through a cavitating circulator in perimeter flow. The idea is that the selected facultative bacteria will make acid and this will lower the pH and thus lower ammonia volatility. The animals then do not have to live in a high ammonia environment.

24. In CAFOs with flush alleys, lagoon water is recirculated back to wash feces off the flush alley surface back to the lagoon. Prior art flush water is foul and completely anaerobic. When the anaerobes are exposed to oxygen in the thin film coating the flush alley, they die and produce an odor. When the flush return water is pulled from a treatment zone with reversing circulators and hydraulic walls, the anaerobes are mixed with facultative bacteria. When the mixed bacteria water flushes the alleys, the anaerobes die as before, but the facultative bacteria grow 5x faster in the thin aerobic film over the flush alley. The facultative bacteria consume dead anaerobes for carbon and produce acid. The acid lowers the flush alley surface pH below the pH of the flush return water. The lower pH reduces the volatility of ammonia and animal mortality (hogs) is reduced 50%.

25. Clarification improves in the natural lake section. Without wishing to be bound, it is believed that cavitation by the water circulators, such as BFs and GFs, is used to mechanically tear off flagella from slow-to-settle flagella-bearing bacteria.

What is claimed is:

1. A method of removing carbon, nitrogen and phosphorous from a liquid, comprising:
   a. inflowing the liquid into a first cell of a lagoon, wherein the first cell comprises at least one circulator forming a zone of cavitation flow,
   b. inflowing the liquid from the first cell into a second cell of the lagoon, wherein the second cell comprises at least five circulators, wherein each of the at least five circulators is placed at a vertex of a series of imaginary adjacent, substantially equilateral triangles, wherein each one of the adjacent triangles shares one side and two vertices with a triangle adjacent thereto in the series of imaginary triangles, wherein a set of at least two circulators is arranged in a substantially straight line that is substantially perpendicular to net flow, wherein each of the circulators cause a hydraulic wall to form between each of the circulators, and wherein a distance between the at least five circulators is about 25 ft to about 70 feet; and
   c. inflowing the liquid from the second cell into a third cell of the lagoon, wherein the third cell comprises at least one circulator forming a perimeter flow in at least a portion of the third cell, the perimeter flow causing a reduction in a number of living, floating algae in the third cell.

2. The method of claim 1, wherein the zone of cavitation flow is formed by three or more circulators.

3. The method of claim 1, wherein a partial depth baffle separates the first cell of the lagoon and the second cell of the lagoon.

4. The method of claim 1, wherein a quiescent zone is formed in at least one of the second cell of the lagoon and the third cell of the lagoon.

5. The method of claim 4, wherein the quiescent zone comprises a zone of gas flow that stratifies a portion of the at least one of the second cell of the lagoon and the third cell of the lagoon into a plurality of layers.

6. The method of claim 5, wherein granules are formed by the at least five circulators and are configured to rise and fall vertically in the lagoon between the plurality of layers and configured to form a gas bubble comprising methane, ammonia, and carbon dioxide.

7. The method of claim 6, wherein the bubble comprising methane and carbon dioxide exits the lagoon through an upper surface of the lagoon.

8. The method of claim 5, wherein the plurality of layers comprise
   a first aerobic layer comprising microalgae;
   a second layer of bubble cavitation vertically deeper than the first layer
   a third facultative layer of facultative hydrolysis and anaerobic gas formation vertically deeper than the second layer; and
   a fourth anaerobic layer vertically deeper than the third facultative layer.

9. The method of claim 1, wherein the method further comprises inflowing the liquid from the lagoon to a second lagoon, wherein the second lagoon comprises two cells.

10. The method of claim 9, wherein the second lagoon further comprises a baffle upstream of a set of circulators.

11. The method of claim 1, wherein the method further comprises inflowing the liquid from the lagoon to a second lagoon, wherein the second lagoon comprises three cells and comprises two sets of at least two circulators each arranged in a substantially straight line that are substantially perpendicular to net flow.

12. The method of claim 11, wherein the second lagoon further comprises two baffles, each baffle upstream of each of the set of circulators in the second lagoon.

13. The method of claim 1, wherein a distance between each of the circulators of the second cell is about 40 ft to about 60 feet.

14. The method of claim 1, wherein a distance between each of the circulators of the second cell is about 44 ft to about 52 feet.

15. The method of claim 1, wherein a distance between each of the circulators of the second cell is about 48 feet.

16. The method of claim 11, wherein a distance between the two sets in the second lagoon is between about 10 feet to about 400 feet.

17. The method of claim 11, wherein a distance between the two sets in the second lagoon is between about 200 feet to about 300 feet.

18. The method of claim 11, wherein a distance between the two sets in the second lagoon is between about 230 feet to about 270 feet.

19. The method of claim 11, wherein a distance between the two sets is between about 250 feet.

20. The method of claim 9, wherein each of the circulators comprises a structure to support nitrifier bacteria that oxidize ammonia to nitrate.

21. The method of claim 20, wherein a perimeter flow of the second lagoon increases the number of non-living microalgae in the second lagoon.

22. The method of claim 21, wherein the non-living microalgae is a source of carbon to heterotrophic bacteria in the second lagoon.

23. The method of claim 22, wherein the heterotrophic bacteria reduce nitrate to a gas comprising nitrogen.

24. The method of claim 9, wherein the second lagoon comprises an alum circulator configured to receive a solution of alum.

25. The method of claim 24, wherein the alum circulator comprises an annular space in the vicinity of a shaft of the alum circulator, wherein the solution of alum is received by a high pressure side of an impeller attached to the shaft.

26. The method of claim 1, wherein the second cell comprises at least seven circulators, wherein the at least seven circulators are arranged in two or more rows, wherein the circulators of a first row are offset from the circulators of an adjacent row such that one circulator of the first row and two circulators of the adjacent row are each placed at a vertex of a series of imaginary, adjacent, substantially equilateral triangles, wherein each one of the adjacent triangles shares one side and two vertices with a triangle adjacent thereto in the series of imaginary triangles.

27. A method of reducing a concentration of phosphorous in a lagoon, the method comprising:
   operating at least five circulators, wherein each of the at least five circulators is placed at a vertex of a series of imaginary adjacent, substantially equilateral triangles, wherein each one of the adjacent triangles shares one side and two vertices with a triangle adjacent thereto in the series of imaginary triangles, each of the circulators configured to receive a solution of alum, wherein operating the circulators forms a zone of cavitation flow, wherein the circulators cause a hydraulic wall to form between the circulators, and wherein a distance between each of the circulators is about 25 ft to about 70 feet.

28. The method of claim 27, wherein each of the at least five circulators comprises an annular space in the vicinity of a shaft of each of the at least five circulators, wherein the solution of alum is received by a high pressure side of an impeller attached to the shaft.

29. The method of claim 28, wherein the solution of alum is directed by the impeller to contact water of the lagoon and form a solid comprising phosphorous.

30. The method of claim 29, wherein the solid is denser than water.

31. The method of claim 27, wherein the lagoon comprises at least seven circulators, wherein the at least seven circulators are arranged in two or more rows, wherein the circulators of a first row are offset from the circulators of an adjacent row such that one circulator of the first row and two circulators of the adjacent row are each placed at a vertex of a series of imaginary, adjacent, substantially equilateral triangles, wherein each one of the adjacent triangles shares one side and two vertices with a triangle adjacent thereto in the series of imaginary triangles.

32. A method of removing nitrogen from a liquid in a lagoon, the lagoon comprising a cell, wherein the cell comprises at least five circulators, wherein each of the at least five circulators is placed at a vertex of a series of imaginary adjacent, substantially equilateral triangles, wherein each one of the adjacent triangles shares one side and two vertices with a triangle adjacent thereto in the series of imaginary triangles, wherein a set of at least two circulators, wherein the at least two circulators are arranged in a substantially straight line that is substantially perpendicular to a net flow, the method comprising:
operating each of the circulators, wherein operating each of the circulators forms a zone of cavitation flow, wherein the circulators cause a hydraulic wall to form between each of the circulators, and wherein a distance between each of the circulators is about 25 ft to about 70 feet.

33. The method of claim 32, wherein the cell further comprises a baffle upstream of the set of circulators.

34. The method of claim 32, wherein the lagoon comprises three cells and comprises two sets of at least two circulators, wherein the at least two circulators are arranged in a substantially straight line that are substantially perpendicular to net flow.

35. The method of claim 34, wherein the lagoon further comprises two baffles, each baffle upstream of each of the set of circulators.

36. The method of claim 32, wherein a distance between each of the circulators of the cell is about 40 ft to about 60 feet.

37. The method of claim 32, wherein a distance between each of the circulators of the second cell is about 44 ft to about 52 feet.

38. The method of claim 32, wherein a distance between each of the circulators of the second cell is about 48 feet.

39. The method of claim 34, wherein a distance between the two sets is between about 10 feet to about 400 feet.

40. The method of claim 34, wherein a distance between the two sets is between about 200 feet to about 300 feet.

41. The method of claim 34, wherein a distance between the two sets is between about 230 feet to about 270 feet.

42. The method of claim 34, wherein a distance between the two sets is between about 250 feet.

43. The method of claim 32, wherein each of the circulators comprises a structure to support nitrifier bacteria that oxidize ammonia to nitrate.

44. The method of claim 32, wherein the cell comprises at least seven circulators, wherein the at least seven circulators are arranged in two or more rows, wherein the circulators of a first row are offset from the circulators of an adjacent row such that one circulator of the first row and two circulators of the adjacent row are each placed at a vertex of a series of imaginary, adjacent, substantially equilateral triangles, wherein each one of the adjacent triangles shares one side and two vertices with a triangle adjacent thereto in the series of imaginary triangles.

45. A method of removing carbon from a liquid in a lagoon, comprising:
inflowing the liquid into a first cell of the lagoon, wherein the first cell comprises at least five circulators, wherein each of the at least five circulators is placed at a vertex of a series of imaginary adjacent triangles, wherein each one of the adjacent triangles shares one side and two vertices with a triangle adjacent, substantially equilateral thereto in the series of imaginary triangles forming a zone of cavitation flow, wherein the circulators cause a hydraulic wall to form between each of the circulators, and wherein a distance between each of the circulators is about 25 ft to about 70 feet.

46. The method of claim 45, wherein lagoon has at least 3 cells.

47. The method of claim 45, wherein the cavitation flow is formed by three or more circulators.

48. The method of claim 46, wherein a partial depth baffle separates the first cell of the lagoon and a second cell of the lagoon.

49. The method of claim 46, wherein a quiescent zone is formed in at least one of a second cell of the lagoon and a third cell of the lagoon.

50. The method of claim 49, wherein the quiescent zone comprises a zone of gas flow that stratifies a portion of the at least one of the second cell of the lagoon and the third cell of the lagoon into a plurality of layers.

51. The method of claim 50, wherein granules formed by the at least five circulators are configured to rise and fall vertically in the lagoon between the plurality of layers and configured to form a gas bubble comprising methane and carbon dioxide.

52. The method of claim 51, wherein the bubble comprising methane and carbon dioxide exits the lagoon through an upper surface of the lagoon.

53. The method of claim 50, wherein the plurality of layers comprise
a first aerobic layer comprising microalgae
a second layer of bubble cavitation vertically deeper than the first layer
a third facultative layer of facultative hydrolysis and anaerobic gas formation vertically deeper than the second layer; and
a fourth anaerobic layer vertically deeper than the third facultative layer.

54. The method of claim 45, wherein the cell comprises at least seven circulators, wherein the at least seven circulators are arranged in two or more rows, wherein the circulators of a first row are offset from the circulators of an adjacent row such that one circulator of the first row and two circulators of the adjacent row are each placed at a vertex of a series of imaginary, adjacent, substantially equilateral triangles, wherein each one of the adjacent triangles shares one side and two vertices with a triangle adjacent thereto in the series of imaginary triangles.

55. A lagoon comprising a plurality of layers comprising:
a first aerobic layer comprising microalgae;
a second layer of bubble cavitation vertically deeper than the first layer;
a third facultative layer, wherein facultative hydrolysis and anaerobic gas formation occurs in the third facultative layer, wherein the third facultative layer is vertically deeper than the second layer; and a fourth anaerobic layer vertically deeper than the third facultative layer, wherein the lagoon further comprises at least five circulators, wherein each of the at least five circulators is placed at a vertex of a series of imaginary adjacent, substantially equilateral triangles, wherein each one of the adjacent triangles shares one side and two vertices with a triangle adjacent thereto in the series of imaginary triangles, wherein the circulators cause a hydraulic wall to form between the circulators, and wherein a distance between each of the circulators is about 25 ft to about 70 feet.

56. The lagoon of claim 55, wherein the lagoon comprises at least seven circulators, wherein the at least seven circulators are arranged in two or more rows, wherein the circulators of a first row are offset from the circulators of an adjacent row such that one circulator of the first row and two circulators of the adjacent row are each placed at a vertex of a series of imaginary, adjacent, substantially equilateral triangles, wherein each one of the adjacent triangles shares one side and two vertices with a triangle adjacent thereto in the series of imaginary triangles.

* * * * *